(12) United States Patent
Huang et al.

(10) Patent No.: US 8,280,601 B2
(45) Date of Patent: *Oct. 2, 2012

(54) ADAPTIVE VEHICLE CONTROL SYSTEM WITH INTEGRATED MANEUVER-BASED DRIVING STYLE RECOGNITION

(75) Inventors: Jihua Huang, Sterling Heights, MI (US); William C. Lin, Birmingham, MI (US); Yuen-Kwok Chin, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1104 days.

This patent is subject to a terminal disclaimer.

(21) Appl. No.: 12/179,314

(22) Filed: Jul. 24, 2008

(65) Prior Publication Data
US 2010/0023183 A1   Jan. 28, 2010

(51) Int. Cl.
G06G 7/76 (2006.01)
(52) U.S. Cl. ............ 701/70; 701/1; 701/29.1; 701/32.1; 701/74; 701/117
(58) Field of Classification Search .................... None
See application file for complete search history.

(56) References Cited

U.S. PATENT DOCUMENTS

| | | | |
|---|---|---|---|
| 5,612,882 A * | 3/1997 | LeFebvre et al. | 701/423 |
| 5,983,161 A | 11/1999 | Lemelson et al. | |
| 6,223,117 B1 * | 4/2001 | Labuhn et al. | 701/93 |
| 6,275,773 B1 | 8/2001 | Lemelson et al. | |
| 6,438,472 B1 * | 8/2002 | Tano et al. | 701/29.6 |
| 6,449,572 B1 * | 9/2002 | Kurz et al. | 702/94 |
| 6,487,500 B2 | 11/2002 | Lemelson et al. | |
| 6,675,081 B2 * | 1/2004 | Shuman et al. | 701/48 |
| 6,711,493 B1 * | 3/2004 | Andrews et al. | 701/117 |
| 6,771,176 B2 | 8/2004 | Wilkerson | |
| 6,832,157 B2 | 12/2004 | Egami | |
| 6,873,911 B2 * | 3/2005 | Nishira et al. | 701/301 |
| 6,909,947 B2 | 6/2005 | Douros et al. | |
| 6,931,309 B2 | 8/2005 | Phelan et al. | |
| 6,968,260 B2 | 11/2005 | Okada et al. | |
| 6,982,647 B2 | 1/2006 | Kuge et al. | |
| 7,006,917 B2 | 2/2006 | Hijikata | |
| 7,382,274 B1 * | 6/2008 | Kermani et al. | 340/901 |
| 7,444,311 B2 * | 10/2008 | Engstrom et al. | 706/20 |
| 7,765,058 B2 * | 7/2010 | Doering | 701/123 |
| 7,809,487 B2 * | 10/2010 | Syed et al. | 701/70 |
| 2002/0091473 A1 * | 7/2002 | Gardner et al. | 701/35 |
| 2002/0120374 A1 | 8/2002 | Douros et al. | |
| 2003/0065432 A1 * | 4/2003 | Shuman et al. | 701/48 |

(Continued)

*Primary Examiner* — Khoi Tran
*Assistant Examiner* — Jonathan L Sample
(74) *Attorney, Agent, or Firm* — John A. Miller; Miller IP Group, PLC

(57) ABSTRACT

A vehicle control system that classifies a driver's driving style based on characteristic maneuvers. The system includes a plurality of vehicle sensors that detect various vehicle parameters. A maneuver identification processor receives the sensor signals to identify a characteristic maneuver of the vehicle and provides a maneuver identifier signal of the maneuver. A style characterization processor receives the maneuver identifier signals, sensor signals from the vehicle sensors and the traffic and road condition signals, and classifies driving style based on the signals to classify the style of the driver driving the vehicle. The classification of the driver style can be provided for a level-1 combination that combines the classification results from different maneuver type classifiers for a single maneuver, a level-2 combination that combines the classification results from multiple maneuvers that are of the same type and a level-3 combination that combines the classification results from different types of characteristic maneuvers.

17 Claims, 20 Drawing Sheets

U.S. PATENT DOCUMENTS

| | | |
|---|---|---|
| 2003/0236602 A1 | 12/2003 | Kuge et al. |
| 2004/0083041 A1 | 4/2004 | Skeen et al. |
| 2004/0225557 A1 | 11/2004 | Phelan et al. |
| 2004/0243301 A1* | 12/2004 | Kim .............................. 701/201 |
| 2004/0252027 A1* | 12/2004 | Torkkola et al. .............. 340/576 |
| 2005/0116829 A1 | 6/2005 | Koenig et al. |
| 2005/0131597 A1* | 6/2005 | Raz et al. ........................ 701/29 |
| 2005/0159851 A1* | 7/2005 | Engstrom et al. ................. 701/1 |
| 2005/0228578 A1* | 10/2005 | Burzio ........................... 701/117 |
| 2005/0256635 A1* | 11/2005 | Gardner et al. ................ 701/201 |
| 2006/0195231 A1* | 8/2006 | Diebold et al. .................... 701/1 |
| 2007/0112500 A1* | 5/2007 | Ogawa ............................. 701/96 |
| 2007/0124027 A1* | 5/2007 | Betzitza et al. .................... 701/1 |
| 2007/0268158 A1* | 11/2007 | Gunderson et al. ........... 340/933 |
| 2008/0275618 A1* | 11/2008 | Grimm et al. ................... 701/96 |
| 2009/0271101 A1* | 10/2009 | Relyea et al. .................. 701/118 |
| 2012/0078445 A1* | 3/2012 | Krupansky et al. ................ 701/3 |

\* cited by examiner

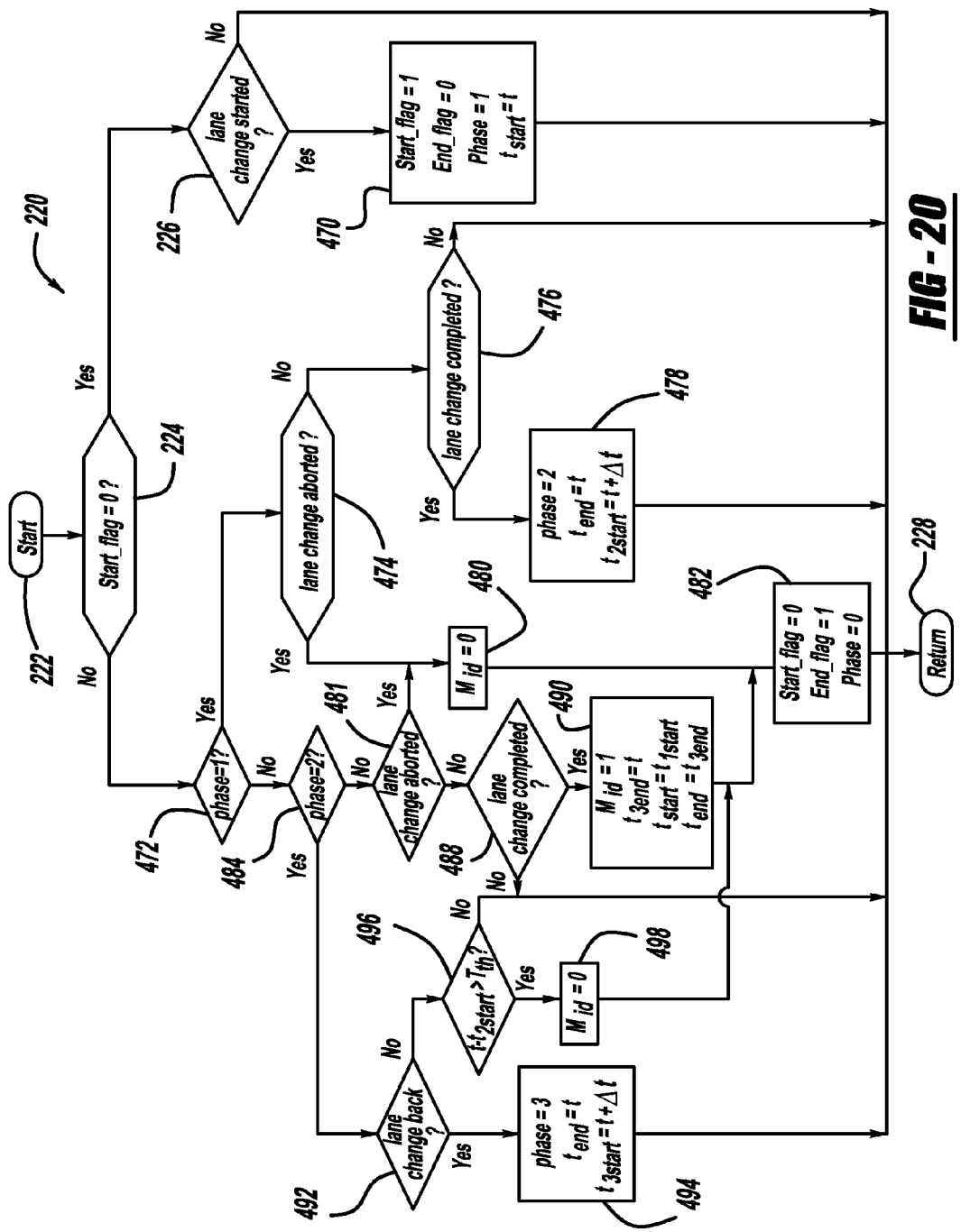

ADAPTIVE VEHICLE CONTROL SYSTEM WITH INTEGRATED MANEUVER-BASED DRIVING STYLE RECOGNITION

BACKGROUND OF THE INVENTION

1. Field of the Invention

This invention relates generally to an adaptive vehicle control system that includes driving style recognition and, more particularly, to an adaptive vehicle control system that provides driver assistance by identifying a driver's driving style in terms of driving sportiness and employs classification of driving style for different levels including one or more of combining the classification results from different maneuver type classifiers for a single maneuver, combining the classification results from multiple maneuvers that are of the same type and combining the classification results from different types of maneuvers.

2. Discussion of the Related Art

Driver assistance systems and vehicle active safety systems are becoming an integral part of vehicle design and development in an attempt to reduce driving stress and to enhance vehicle/roadway safety. For example, adaptive cruise control (ACC) systems are known that relieve drivers from routine longitudinal vehicle control by keeping the vehicle a safe distance away from a preceding vehicle. Also, lane changing departure warning systems are know that alert the vehicle driver whenever the vehicle tends to depart from the traveling lane.

These systems employ various sensors and detectors that monitor vehicle parameters, and controllers that control vehicle systems, such as active front and rear wheel steering and differential braking. Although such systems have the potential to enhance driver comfort and safety, their success depends not only on their reliability, but also on driver acceptance. For example, considering an ACC system, studies have shown that although shortening headway distances between vehicles can increase traffic flow, it can also cause stress to some drivers because of the proximity to a preceding vehicle. Therefore, it may be desirable to enhance such systems by adapting the vehicle control in response to a driver's driving style to meet the needs of different drivers.

SUMMARY OF THE INVENTION

In accordance with the teachings of the present invention, an adaptive vehicle control system is disclosed that classifies a driver's driving style based on characteristic maneuvers and road and traffic conditions. The system includes a plurality of vehicle sensors that detect various vehicle parameters. A maneuver identification processor receives the sensor signals to identify a characteristic maneuver of the vehicle and provides a maneuver identifier signal of the maneuver. The system also includes a traffic and road condition recognition processor that receives the sensor signals, and provides traffic condition signals identifying traffic conditions and road condition signals identifying road conditions. In one non-limiting embodiment, the road condition signals identify road type, such as rural or urban, road surface condition, such as moderate or rough, and ambient conditions, such as light level, rain or snow, and fog. The system also includes a data selection processor that receives the sensor signals, the maneuver identifier signals and the traffic and road condition signals, and stores data for each of the characteristic maneuvers and the traffic and road conditions. A style characterization processor receives the maneuver identifier signals, the stored data from the data selection processor and the traffic and road condition signals, and classifies driving style based on the signals to classify the style of the driver driving the vehicle.

The classification of the driver style can be combined at different levels, such as a level-1 combination that combines the classification results for the same single maneuver provided by different classifiers designed for a specific type of maneuver, a level-2 combination that combines the classification results for multiple maneuvers that are of the same type and a level-3 combination that combines the classification results for different types of maneuvers.

Additional features of the present invention will become apparent from the following description and appended claims, taken in conjunction with the accompanying drawings.

BRIEF DESCRIPTION OF THE DRAWINGS

FIG. 20 is a flow chart diagram showing a process that can be used by the maneuver identification processor in the systems of FIGS. 2, 3 and 4 for identifying a passing maneuver, according to an embodiment of the present invention;

DETAILED DESCRIPTION OF THE EMBODIMENTS

Figure 1:
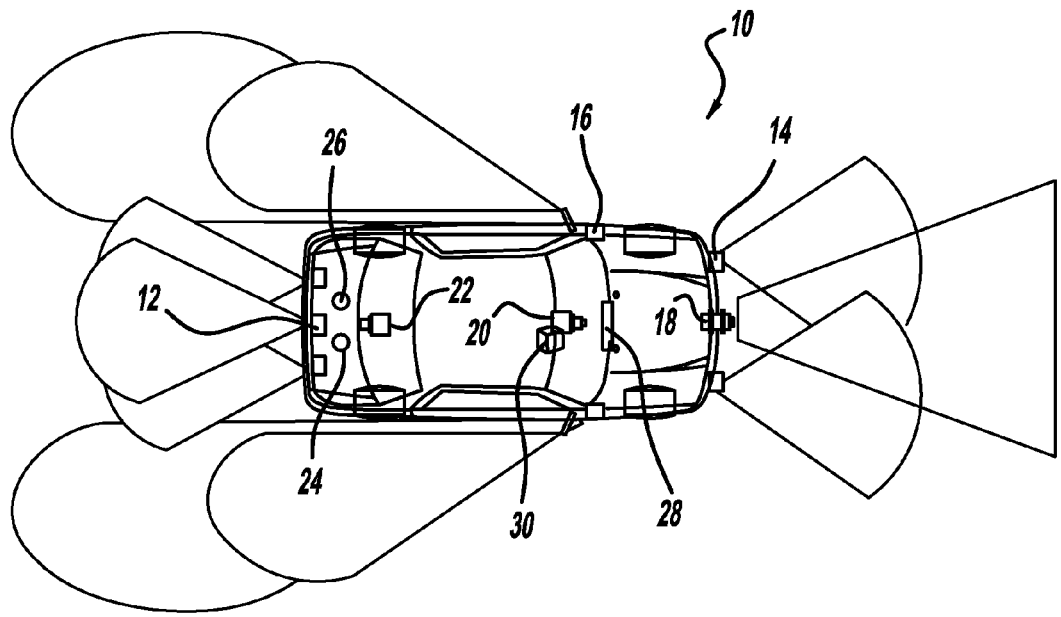
FIG. 1 is a plan view of a vehicle employing various vehicle sensors, cameras and communications systems.

The following discussion of the embodiments of the invention directed to an adaptive vehicle control system that considers driving style and employs classification of driving style for different levels is merely exemplary in nature, and is in no way intended to limit the invention or its applications or uses.

The present invention provides various embodiments for an adaptive vehicle control system that adapts to one or both of driving environment and the driver's driving characteristics. Typical adaptive control systems consist of control adaptation algorithms. The present invention addresses driving style environment and a driver's driving characteristics to recognize a driver's driving style based on his/her driving behavior, as well as vehicle control adaptation to the recognized driving style to provide the most desirable vehicle performance to the driver. In order to provide a vehicle driver with the most desirable performance tailored to a specific driving characteristic, vehicle control adaptation can be realized in various ways. For example, these techniques include using differential braking or rear wheel steering to augment vehicle dynamic response during various vehicle maneuvers. In the present invention, the control adaptation of an active front steering (AFS) variable gear ratio (VGR) system can be used.

In one non-limiting embodiment, the invention provides an adaptive control system for VGR steering, where the vehicle steering ratio varies not only with vehicle speed, but also with driving conditions as typically indicated by the vehicle hand-wheel angle. Further, the control adaptation takes into account the driver's driving style or characteristics. The resulting adaptive VGR provides tailored vehicle performance to suit a wide range of driving conditions and driver's driving characteristics.

To enable control adaptation for driving characteristics, the present invention provides an innovative process that recognizes a driver's driving characteristics based on his/her driving behavior. In particular, the present invention shows how driving style can be characterized based on the driver's control input and vehicle motion during various vehicle maneuvers. The driving style recognition provides an assessment of a driver's driving style, especially the level of sportiness/assertiveness of the driver, which can be incorporated in various vehicle control and driver assistance systems, including the adaptive AFS VGR system.

The steering gear ratio of a vehicle represents a proportional factor between the steering wheel angle and the road wheel angle. Conventional steering systems have a fixed steering gear ratio where the steering wheel ratio remains substantially constant except for minor variations due to vehicle suspension geometry. To improve vehicle handling, VGR steering systems have been developed. With a VGR steering system, the gear ratio varies with vehicle speed so that the number of steering wheel turns is reduced at low speeds and the high-speed steering sensitivity is suppressed. However, current AFS VGR systems mainly focus on on-center handling where the steering wheel angle is relatively small and the tires are in their linear region. Moreover, the design is a compromise to meet the needs of all types of drivers with one single speed/VGR curve. Nevertheless, many drivers, especially sporty type drivers, expect electric aids to enhance their driving experience even in situations that an average driver would never encounter.

The AFS VGR adaptive control system of the invention includes an enhanced VGR that alters the steering ratio according to vehicle speed and the steering angle to suit different driving conditions, and an adaptive VGR that adjusts the steering ratio based on a driver's preference/style and skill level.

As mentioned above, known VGR systems alter the steering ratio based on vehicle speed only. However, the corresponding steady-state vehicle yaw rate gain is mainly for on-center handling where the vehicle tires are operating in their linear region. When the hand-wheel angle gets relatively large, the steady-state rate gain drops due to tire non-linearity.

To compensate for the effects of tire non-linearity and to provide an approximately uniform yaw rate gain at each vehicle speed, the present invention proposes an enhanced VGR that is extended to be a function of both vehicle speed a and the vehicle hand-wheel angle $\delta_{HWA}$. The enhanced VGR has the same value as a conventional VGR if the hand-wheel angle $\delta_{HWA}$ is smaller than a threshold $\delta_{th}$, and decreases as the hand-wheel angle $\delta_{HWA}$ increases beyond the threshold $\delta_{th}$. The threshold $\delta_{th}$ is the critical steering angle and steering angles larger than the threshold $\delta_{th}$ result in vehicle tires operating in their non-linear region.

To accommodate the various needs of different drivers, the adaptive VGR system of the present invention incorporates driving style and skill levels, together with the vehicle speed v and the hand-wheel angle $\delta_{HWA}$, to determine the variable gear ratio. The adaptive VGR $r_{adaptive}$ can be calculated by:

$$r_{adaptive} = f_{adaptive}(v, \delta_{HWA}, P, S) \quad (1)$$

Where P represents driving style, such as P=1-5 where 1 represents a conservative driver and 5 represents a very sporty driver, and S represents driving skill level, such as S=1-5 where 1 represents a low skill driver and 5 represents a high skill driver.

The adaptive VGR $r_{adaptive}$ can be further derived from the enhanced VGR as:

$$\begin{aligned} r_{adaptive} &= f_{adaptive}(v, \delta_{HWA}, P, S) \\ &= k(v, \delta_{HWA}, P, S) \times f_{enhanced}(v, \delta_{HWA}) \end{aligned} \quad (2)$$

Where $k(v, \delta_{HWA}, P, S)$ is a scaling factor.

The vehicle speed v and the hand-wheel angle $\delta_{HWA}$ can be measured by in-vehicle sensors, such as wheel speed sensors and a steering angle sensor. Driving style and skill level can be set by the driver or characterized by algorithms based on vehicle sensor information.

Because sporty drivers typically prefer the vehicle to be more responsive, a lower gear ratio is preferred to yield a higher yaw rate gain. On the other hand, drivers need to have the capability to control the vehicle as it becomes more sensitive with a lower gear ratio, especially at higher speeds. In other words, a low gear ratio at higher speeds will only be available to skillful drivers. Therefore, the scaling factor k is smaller for drivers with a higher skill level.

In order to facilitate control adaptation based on driving style, the present invention further proposes a method and system for achieving an in-vehicle characterization of a driver's driving style. The characterization result can be used in various vehicle control algorithms that adapt to a driver's driving style. However, such control algorithms are neither prerequisites nor components for the in-vehicle characterization system of the invention.

FIG. 1 is a plan view of a vehicle 10 including various sensors, vision systems, controllers, communications systems, etc., one or more of which may be applicable for the adaptive vehicle control systems discussed below. The vehicle 10 includes mid-range sensors 12, 14 and 16 at the back, front and sides, respectively, of the vehicle 10. A front vision system 20, such as a camera, provides images towards the front of the vehicle 10 and a rear vision system 22, such as a camera, provides images towards the rear of the vehicle 10. A GPS or a differential GPS system 24 provides GPS coordinates, and a vehicle-to-infrastructure (V2X) communications system 26 provides communications between the vehicle 10 and other structures, such as other vehicles, roadside systems, etc., as is well understood to those skilled in the art. The vehicle 10 also includes an enhanced digital map (EDMAP) 28 and an integration controller 30 that provides surround sensing data fusion.

Figure 2:
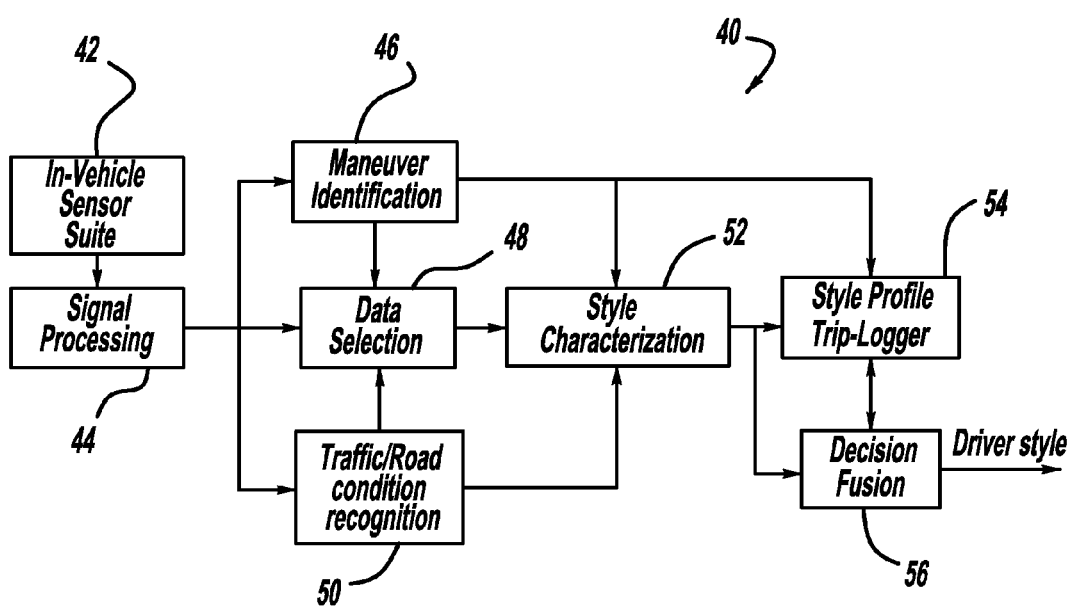
FIG. 2 is a block diagram of a system providing in-vehicle characterization of driving style, according to an embodiment of the present invention.

FIG. 2 is a block diagram of an adaptive control system 40 that provides in-vehicle characterization of a driver's driving style, according to an embodiment of the present invention. The system 40 has application for characterizing a driver's driving style based on various types of characteristic maneuvers, such as curve-handling maneuvers, vehicle launching maneuvers, left/right turns, U-turns, highway on/off-ramp maneuvers, lane changes, etc.

The system 40 employs various known vehicle sensors identified as an in-vehicle sensor suite 42. The sensor suite 42 is intended to include one or more of a hand-wheel angle sensor, a yaw rate sensor, a vehicle speed sensor, wheel speed sensors, longitudinal accelerometer, lateral accelerometer, headway distance sensors, such as a forward-looking radar-lidar or a camera, a throttle opening sensor, a brake pedal position/force sensor, etc., all of which are well known to those skilled in the art. The sensor signals from the sensor suite 42 are provided to a signal processor 44 that processes the sensor measurements to reduce sensor noise and sensor biases. Various types of signal processing can be used by the processor 44, many of which are well known to those skilled in the art.

The processed sensor signals from the signal processor 44 are provided to a maneuver identification processor 46, a data selection processor 48 and a traffic/road condition recognition processor 50. The maneuver identification processor 46 identifies various types of characteristic maneuvers performed by the driver. Such characteristic maneuvers include, but are not limited to, vehicle headway control, vehicle launching, highway on/off-ramp maneuvers, steering-engaged maneuvers, which may be further separated into curve-handling maneuvers, lane changes, left/right turns and U-turns. Details of using those types of characteristic maneuvers for style characterization will be discussed below. Maneuver identification is provided because specific methodologies used in style characterization may differ from one type of characteristic maneuver to another. For example, characterization based on headway control behaviors during vehicle following use headway distance and closing speed from a forward-looking radar, while characterization based on curve-handling maneuvers involves yaw rate and lateral acceleration. Therefore, the type of maneuvers conducted by the driver need to be identified. When the maneuver identification processor 46 identifies a particular type of maneuver of the vehicle 10, it will output a corresponding identification value to the data selection processor 48.

Not all maneuvers can be easily identified from in-vehicle motion sensor measurements. Further, some maneuvers reveal driving style better than others. Such maneuvers that help distinguish driving style are referred to as characteristic maneuvers. Consequently, only data corresponding to characteristic maneuvers is selected and stored for the style characterization. The maneuver identification processor 16 identifies characteristic maneuvers based on any combination of in-vehicle sensors, such as a vehicle speed sensor, a longitudinal acceleration sensor, a steering wheel angle sensor, a steering angle sensor at the wheels, a yaw rate sensor, a lateral acceleration sensor, a brake pedal position sensor, a brake pedal force sensor, an acceleration pedal position sensor, an acceleration pedal force sensor, a throttle opening sensor, a suspension travel sensor, a roll rate sensor, a pitch rate sensor, as well as long-range and short-range radars, cameras, GPS or DGPS map information, and vehicle-to-infrastructure/vehicle communication. The maneuver identification processor 16 may further utilize any combination of information processed from the measurements from those sensors, including the derivatives and integrated signals. Once the maneuver identification processor 16 detects a characteristic maneuver, it informs the data selection processor 48 to start recording data. The maneuver identification processor 16 also identifies the end of the maneuver so that the data selection processor 48 stops recording. The traffic information from the recognition processor 50 may also be incorporated in the recording process to determine whether the maneuver contains adequate information for style characterization.

The traffic/road condition recognition processor 50 uses the sensor signals to recognize traffic and road conditions. Traffic conditions can be evaluated based on traffic density. Roadway conditions include at least two types of conditions, specifically, roadway type, such as freeway/highway, city streets, winding roads, etc., and ambient conditions, such as dry/wet road surfaces, foggy, rainy, etc. Systems that recognize road conditions based on sensor input are well known to those skilled in the art, and need not be described in detail herein.

The style characterization processor 52 receives information of a characteristic maneuver from the maneuver identification processor 46, the traffic and road condition information from the traffic/road condition recognition processor 50 and the recorded data from the data selection processor 48, and classifies driving style based on the information. As the maneuver identifier processor 46 determines the beginning and the end of a maneuver, the data selection processor 48 stores the corresponding data segment based on the variables Start_flag, End_flag, $t_{start}$ and $t_{end}$.

The output from the style characterization processor 52 is a value that identifies a driving style over a range of values, such as a one for a conservative driving up to a five for sporty driving. The particular style characterization value is stored in a style profile trip-logger 54 for each particular characteristic maneuver identified by the identification processor 46. The trip-logger 54 can be a simple data array where each entry array contains a time index, the maneuver information, such as maneuver identifier $M_{id}$, traffic/road condition information, such as traffic index and road index, and the corresponding characterization result. To enhance the accuracy and robustness of the characterization, a decision fusion processor 56 integrates recent results with previous results stored in the trip-logger 54.

Figure 3:
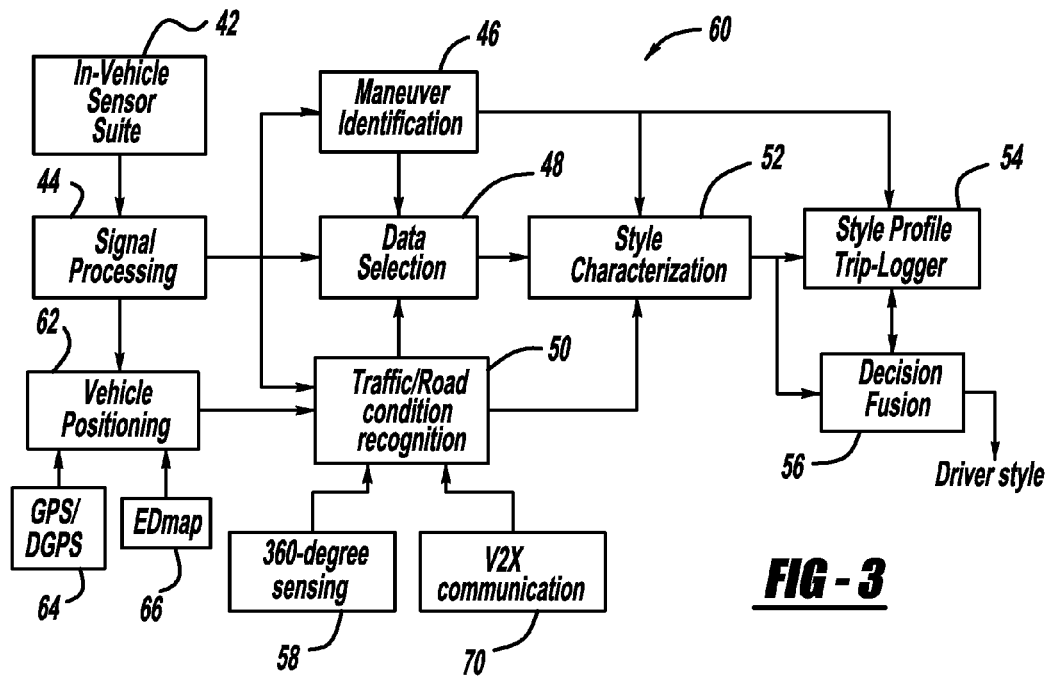
FIG. 3 is a block diagram of a system providing in-vehicle characterization of driving style, according to another embodiment of the present invention.

FIG. 3 is a block diagram of an adaptive control system 60 that provides in-vehicle characterization of driving style, according to another embodiment of the present invention, where like elements to the system 40 are identified by the same reference numeral. In the system 60, a vehicle positioning processor 62 is included that receives the processed sensor measurement signals from the signal processor 44. In addition, the system 60 includes a global positioning system (GPS) or differential GPS 64, such as the GPS 24, and an enhanced digital map 66, such as the EDMAP 28. Information from the vehicle positioning processor 62 is provided to the traffic/road condition recognition processor 50 to provide vehicle location information. Additionally, the system 60 includes a surround sensing unit 68, which comprises long-range and short-range radars/lidars at the front of the vehicle 10, short-range radars/lidars on the sides and/or at the back of the vehicle 10, or cameras around the vehicle 10, and a vehicle-to-vehicle/infrastructure communication system 70 that also provides information to the traffic/road condition recognition processor 50 for additional information concerning traffic and road conditions.

The vehicle positioning processor 62 processes the GPS/DGPS information, as well as information from vehicle motion sensors, to derive absolute vehicle positions in earth inertial coordinates. Other information, such as vehicle heading angle and vehicle speed, may also be derived. The vehicle positioning processor 62 further determines vehicle location with regard to the EDMAP 66 and retrieves relevant local road/traffic information, such as road curvature, speed limit, number of lanes, etc. Various techniques for GPS/DGPS based positioning and vehicle locating are well-known to those skilled in the art. Similarly, techniques for surround sensing fusion and vehicle-to-vehicle/infrastructure (V2X) communications are also well known to those skilled in the art. Thus, by using this information, the traffic/road condition recognition processor 50 has a stronger capability of more accurately recognizing traffic and road conditions.

Figure 4:
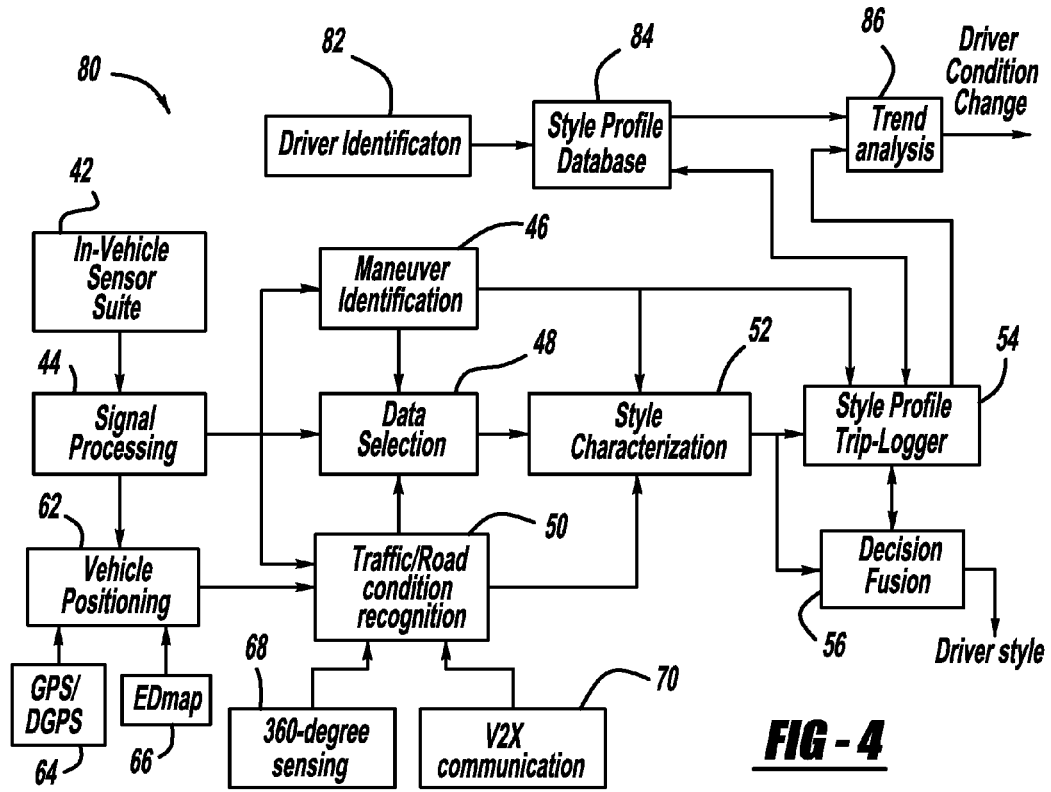
FIG. 4 is a block diagram of a system providing in-vehicle characterization of driving style, according to another embodiment of the present invention.

FIG. 4 is a block diagram of an adaptive control system 80 similar to the control system 60, where like elements are identified by the same reference numeral, according to another embodiment of the present invention. In this embodiment, the system 80 is equipped with a driver identification unit 82, a style profile database 84 and a trend analysis processor 86 to enhance system functionality. The driver identification unit 82 can identify the driver by any suitable technique, such as by pressing a key fob button. Once the driver is identified, his or her style profile during each trip can be stored in the style profile database 84. Further, a history separate style profile can be built up for each driver over multiple trips, and can be readily retrieved to be fused with information collected during the current vehicle trip. Further, a deviation of the style exhibited in the current trip from that in the profile history may imply a change in driver state. For example, a conservative driver driving aggressively may indicate that he or she is in a hurry or under stress. Similarly, a sporty driver driving conservatively may indicate that he or she is tired or drowsy.

As mentioned above, various characteristic maneuvers can be used in the style characterization, such as vehicle headway control, vehicle launching, highway on/off ramp maneuvers, and steering-engaged maneuvers, which referred to maneuvers that involve a relatively large steering angle as and/or a relatively large vehicle yaw rate. The steering-engaged maneuvers may be further broken down into sub-categories, such as lane changes, left/right turns, U-turns and curve-handling maneuvers where a vehicle is negotiating a curve. Further discussions of identifying those specific sub-categories have special types of steering-engaged maneuvers will be included together with the corresponding illustration.

In one embodiment, the steering-engaged maneuvers are treated as one type of characteristic maneuver. Accordingly, the reliable indicators of a steering-engaged maneuver include a relatively large vehicle yaw rate and/or a relatively large steering angle. In one embodiment, the yaw rate is used to describe the operation of the maneuver identification processor 46, where a steering-angle based data selector would work in a similar manner. To maintain the data integrity of the associated steering-engaged maneuver, a certain period, such as T=2 s, of data before and after the steering-engaged maneuver is also desired.

Figure 5:
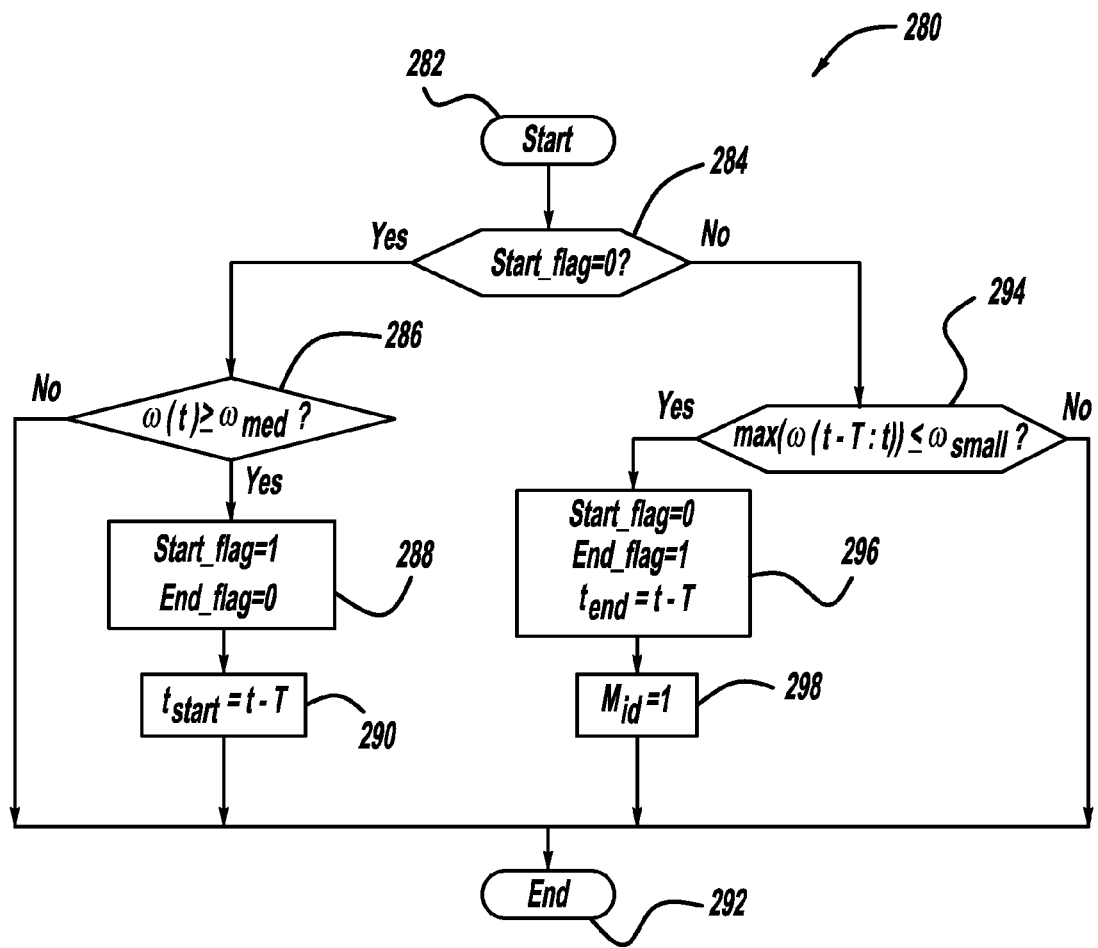
FIG. 5 is a flow chart diagram showing a process for determining a steering-engaged maneuver in the maneuver identification processor shown in the systems of FIGS. 2, 3 and 4, according to an embodiment of the present invention.

FIG. 5 is a flow chart diagram 280 showing a process that can be used by the maneuver identification processor 46 to determine steering-engaged maneuvers. The maneuver identifier value $M_{id}$ is used to identify the type of the characteristic maneuver, as will be discussed in further detail below. Each of these discussions will use a maneuver identifier value $M_{id}$ of 0, 1 or 2 to identify the maneuver. This is merely for illustration purposes in that a system that incorporated maneuver detection for all of the various maneuvers would use a different value for the maneuver identifier value $M_{id}$ for each separate maneuver based on the type of specific characteristic maneuver.

At box 282, the maneuver identification algorithm begins by reading the filtered yaw rate signal ω from the signal processor 44. The algorithm then proceeds according to its operation states denoted by two Boolean variables Start_flag and End_flag, where Start_flag is initialized to zero and End- _flag is initialized to one. At block 284, the algorithm determines whether Start_flag is zero.

If Start_flag is zero, meaning that the vehicle 10 is not in a steering-engaged maneuver, the algorithm determines if the vehicle 10 has started a steering-engaged maneuver based on the yaw rate signal ω at decision diamond 286 by determining whether $\omega(t) \geq \omega_{med}$, where $\omega_{med}$ is 5° per second in one non-limiting embodiment. If this condition is met, meaning that the vehicle 10 has started a steering-engaged maneuver, the algorithm sets Start_flag to one and End_flag to zero at box 288, and starts a timer $t_{start}=t-T$ at box 290. If the condition of the decision diamond 286 has not been met, meaning that the vehicle 10 has not started a steering-engaged maneuver, then the algorithm returns and waits for the next sensor measurement at block 292.

If Start_flag is not zero at the block 284, meaning that the vehicle 10 is in a steering-engaged maneuver, the algorithm determines whether the steering-engaged maneuver is completed by determining whether the yaw rate signal ω has been reduced to near zero at block 294 by $\max(\omega(t-T:t)) \leq \omega_{small}$, where $\omega_{small}$ is 2° per second in one non-limiting embodiment. If this condition is not met, meaning that the vehicle 10 is still in the steering-engaged maneuver, the algorithm returns to the block 292 to collect the next cycle of data. If the condition of the block 294 has been met, meaning that the vehicle 10 has completed the steering-engaged maneuver, the algorithm sets Start_flag to zero, End_flag to one and the timer $t_{end}=t-T$ at box 296. The algorithm then sets the maneuver identifier value $M_{id}$ to one at box 298 meaning that a steering-engaged maneuver has just occurred, and is ready to be classified.

The traffic/road condition recognition processor 50 detects traffic conditions. The traffic conditions can be classified based on traffic density, for example, by using a traffic density condition index $Traffic_{index}$. The higher the index $Traffic_{index}$, the higher the traffic density. Such a traffic index can also be derived based on measurements from sensors, such as radar-lidar, camera and DGPS with inter-vehicle communication.

As an example, the processor 50 can be based on a forward-looking radar as follows. The detection process involves two steps, namely, inferring the number of lanes and computing the traffic index $Traffic_{index}$. Usually, radar measurements are processed to establish and maintain individual tracks for moving objects. Such information is stored in a buffer for a short period of time, such as five seconds, the current road geometry can be estimated by fitting individual tracks with the polynomials of the same structure and parameters except their offsets. The estimated offsets can be used to infer the number of lanes, as well as the relative position of the lane occupied by the subject vehicle.

With the estimate of the number of lanes, the traffic index $Traffic_{index}$ can be determined as:

$$Traffic_{index} = f(N_{lane}, N_{track}, R, v) \quad (3)$$

Where $N_{lane}$ is the number of lanes, $N_{track}$ is the number of vehicles being tracked, R is the range to the preceding vehicle and v is the speed of the subject vehicle.

An alternative and also more objective choice is to use the average range between vehicles in the same lane and the average speed on the road. However, the computation of such variables would be more complicated.

An example of the function of equation (3) can be given as:

$$Traffic_{index} = \begin{cases} a\frac{N_{track}}{N_{lane}} + b\frac{v}{R}, & N_{track} > 0 \\ 0, & N_{track} = 0 \end{cases} \quad (4)$$

Thus, the larger $N_{track}/N_{lane}$ and v/R, the larger the traffic index $Traffic_{index}$, i.e., the density of traffic. For the situation where there is no preceding or forward vehicle i.e., $N_{track}$ equals zero, the traffic index $Traffic_{index}$ is set to zero.

It is noted that in the cases where there are multiple lanes, but no vehicles in the adjacent lanes, the number of lanes will be estimated as one, which is incorrect. However, in such cases, the driver has more freedom to change lanes instead of following close to the preceding vehicle. Consequently v/R should be small and so should the traffic index $Traffic_{index}$.

A second embodiment for recognizing traffic conditions in terms of traffic density is based on DGPS with inter-vehicle communication. With the position and motion information of surrounding vehicles from inter-vehicle communication, the subject vehicle can assess the number of surrounding vehicles within a certain distance, as well as the average speed of those vehicles. Further, the subject vehicle can determine the number of lanes based on the lateral distance between itself and its surrounding vehicles. To avoid counting vehicles and lanes for opposing traffic, the moving direction of the surrounding vehicles should be taken into consideration. With this type of information, the traffic index $Traffic_{index}$ can be determined by equation (4).

While the equations (3) and (4) used the vehicles headway distance $R_{hwd}$ to the preceding vehicle as the range value R, it can be more accurate to use a weighted range variable based on the longitudinal gaps between vehicles in the same lane as the range variable R when situations permit. With a side-view sensor to detect a passing vehicle, the relative speed Δv between the passing vehicle and the subject vehicle can be detected to provide timing ΔT between one vehicle and another. Therefore, the ith occurrence of the gap $R_{gap}$ between vehicles in adjacent lanes can be estimated as:

$$R_{gap}(i) = \Delta v \cdot \Delta T \quad (5)$$

The range variable R can be estimated as a weighted average between the headway distance $R_{hwd}$ and the running average of the adjacent lane vehicle gaps as:

$$R = aR_{hwd} + (1-a)\frac{\sum_{1}^{N} R_{gap}(i)}{N} \quad (6)$$

Where a is a parameter between 0 and 1.

When a rear-looking sensor is available, the trailing vehicle distance $R_{trail}$ can be measured. This measurement can further be incorporated for range calculation, such as:

$$R = \frac{a}{2}(R_{hwd} + R_{trail}) + (1-a)\frac{\sum_{1}^{N} R_{gap}(i)}{N} \quad (7)$$

Traffic density can further be assessed using vehicle-to-vehicle (V2V) communications with the information of GPS location communicated among the vehicles. While the vehicle-to-vehicle communications equipped vehicle penetration is not 100%, the average distances between vehicles can be estimated based on the geographic location provided by the GPS sensor. However, the information obtained through vehicle-to-vehicle communications needs to be qualified for further processing. First, a map system can be used to check if the location of the vehicle is along the same route as the subject vehicle by comparing the GPS detected location of the object vehicle with the map data base. Second, the relative speed of this vehicle and the subject vehicle is assessed to make sure the vehicle is not traveling in the opposite lane. Similar information of the object vehicle so relayed through multiple stages of the vehicle-to-vehicle communications can be analyzed the same way. As a result, a collection of vehicle distances to each of the vehicle-to-vehicle communications equipped vehicles can be obtained. Average distances $D_{V2V}$ of these vehicles can be computed for an indication of traffic density.

The traffic index $Traffic_{index}$ can further be improved by:

$$Traffic_{index} = pC_1 D_{V2V} + C_2 Traffic_{index\_raw} \qquad (8)$$

Where, $traffic_{indexraw}$ is based on equation (4), p is the percentage penetration of the vehicle-to-vehicle communications equipped vehicles in certain locale determined by a database and GPS sensing information, and where $C_1$ and $C_2$ are weighting factors.

The traffic index $Traffic_{index}$ can be computed using any of the above-mentioned approaches. However, it can be further rationalized for its intended purposes by using this index to gauge driver's behavior to assess the driving style in light of the traffic conditions. For this purpose, the traffic index $Traffic_{index}$ can further be modified based on its geographic location reflecting the norm of physical traffic density as well as the average driving behavior.

Statistics can be established off-line to provide the average un-scaled traffic indices based on any of the above calculations for the specific locations. For example, a crowded city as opposed to a metropolitan area or even a campus and everywhere else in the world. This information can be stored in an off-sight installation or infrastructure accessible through vehicle-to-infrastructure communications. When such information is available, the traffic index $Traffic_{index}$ can be normalized against the statistical mean of the specific location, and provide a more accurate assessment of the driving style based on specific behavior over certain detected maneuvers.

The traffic/road condition recognition processor 50 also recognizes road conditions. Road conditions of interest include roadway type, road surface conditions and ambient conditions. Accordingly, three indexes can be provided to reflect the three aspects of the road conditions, particularly $road_{type}$, $road_{surface}$ and $road_{ambient}$, respectively.

Figure 6:
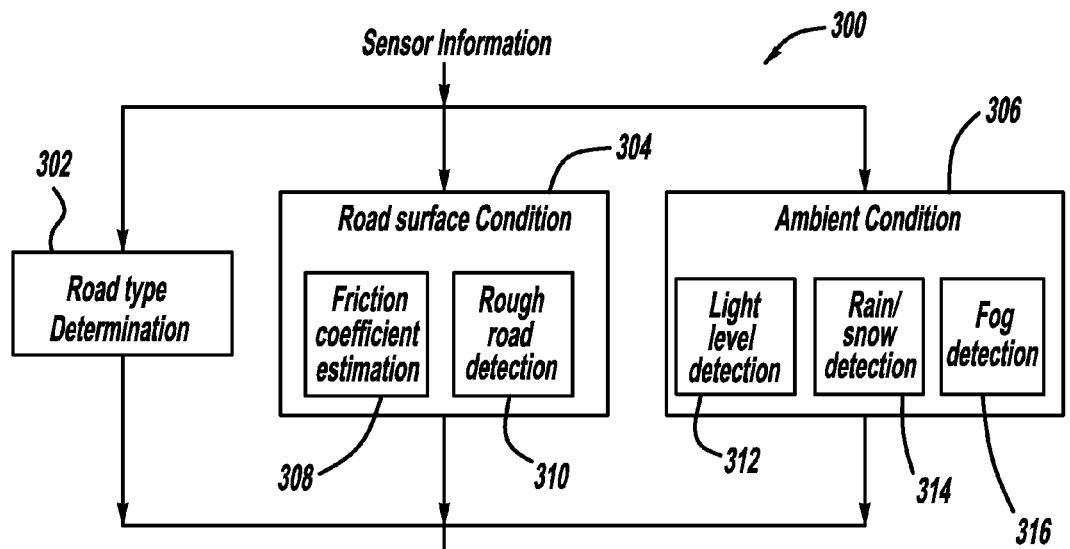
FIG. 6 is a block diagram of a system for integrating road condition signals in the traffic/road condition recognition processor in the systems shown in FIGS. 2, 3 and 4, according to an embodiment of the present invention.

FIG. 6 is a block diagram of a system 300 that can be used to recognize and integrate these three aspects of the road condition. The system 300 includes a road type determination processor 302 that receives sensor information from various sensors in the vehicle 10 that are suitable to provide roadway type. The output of the road type determination processor 302 is the roadway condition index $road_{type}$. The roadway types can be categorized in many different ways. For driving characterization, the interest is in how much freedom the roadway provides to a driver. Therefore, it is preferable to categorize roadways according to their speed limit, the typical throughput of the roadway, the number of lanes in each travel direction, the width of the lanes, etc. For example, the present invention categorizes roadways in four types, namely, urban freeway, urban local, rural freeway and rural local. The two freeways have a higher speed than the two local roadways. The urban freeway typically has at least three lanes in each travel of direction and the rural freeway typically has one to two lanes in each direction. The urban local roadways have wider lanes and more traffic controlled intersections than the rural local roadway. Accordingly, the roadway type can be recognized based on the following road characteristics, namely, the speed limit, the number of lanes, the width of the lanes and the throughput of the road if available.

For systems of this embodiment of the invention, the images from a forward-looking camera can be processed to determine the current speed limit based on traffic sign recognition, the number of lanes and the lane width. In other embodiments, the vehicles can be equipped with a GPS or DGPS with enhanced digital map or GPS or DGPS with vehicle-to-vehicle infrastructure communications, or both. If an EDMAP is available, the EDMAP directly contains the road characteristics information. The EDMAP may even contain the roadway type, which can be used directly. If vehicle-to-infrastructure communications is available, the vehicle will be able to receive those road characteristics and/or the roadway type in the communication packets from the infrastructure.

With this information, the processor 302 categorizes the roadway type based on the road characteristics, or the vehicle may directly use the roadway type from the EDMAP 28 with the communications.

Figure 7:
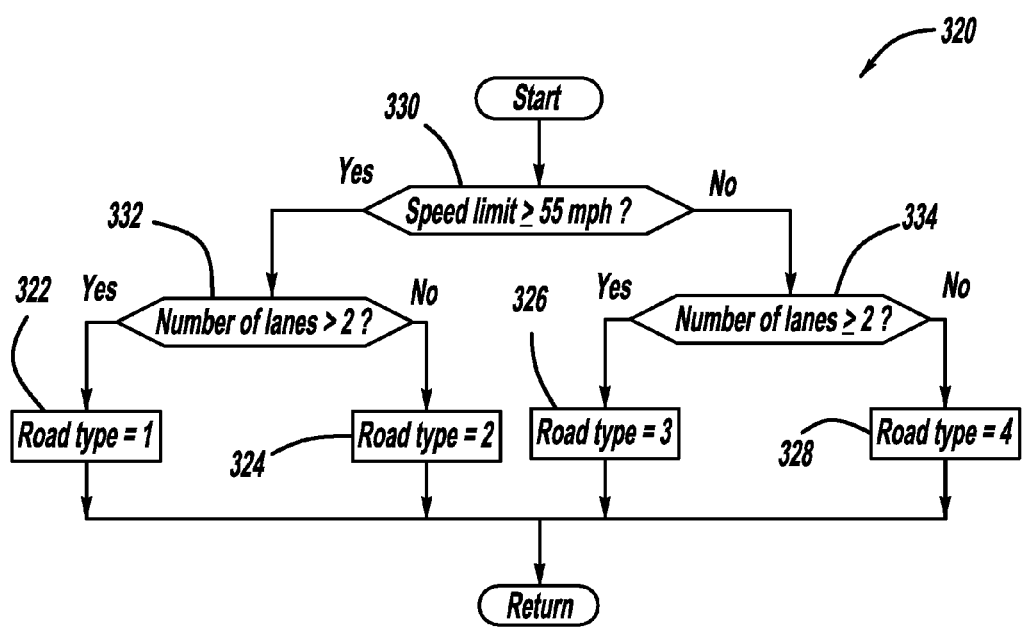
FIG. 7 is a flow chart diagram showing a processor for identifying roadway type for use in the traffic/road condition recognition processor in the systems of FIGS. 2, 3 and 4, according to an embodiment of the present invention.

FIG. 7 is a flow chart diagram 320 showing a process to provide roadway type recognition in the processor 302, according to one non-limiting embodiment of the present invention. In this example, the roadway type condition index $road_{type}$ is identified as 1 at box 322, as 2 at box 324, as 3 at box 326 and as 4 at box 328, where index 1 is for an urban freeway, index 2 is for a rural freeway, index 3 is for an urban local road and index 4 is for a rural local road. The roadway type recognition starts with reading the four characteristics. If the current speed limit is above 55 mph at block 330, the roadway is regarded to be either an urban freeway or a rural freeway. The process then determines whether the number of lanes is greater than two at block 332, and if so, the roadway is a road type 1 for an urban freeway at the box 322, otherwise the roadway is a rural freeway type 2 having more than two lanes at the box 324. If the speed limit is less than 55 mph at the block 330, the algorithm determines whether the number of lanes is greater than or equal to 2 at block 334. If the number of lanes is at least two, the road is considered to be an urban local roadway type 3 at the box 326, otherwise it is a rural local roadway of type 4 at the box 328.

The roadway surface affects the ease of the control of a vehicle. For example, a low-coefficient surface has limited capability in providing longitudinal and lateral tire forces. As a result, a driver needs to be more careful driving on a low coefficient of friction surface than on a high coefficient or friction surface. Similarly, the disturbance generated by a rough surface makes the ride less comfortable and puts a higher demand on the drivers control over the vehicle. Such factors usually cause a driver to be more conservative. Because both the detection of the friction coefficients of a road surface and the detection of rough roads using in-vehicle sensors are well-known to those skilled in the art, a more detailed discussion is not needed herein.

The present invention uses the detection results to generate the road surface condition index $road_{surface}$ to reflect the condition of the road surface. For example, a road surface condition index $road_{surface}$ of zero represents a good surface that has a high coefficient of friction and is not rough, a road surface condition index $road_{surface}$ of one represents a moderate-condition surface that has a medium coefficient of friction and is not rough, and a road surface condition index road$_{surface}$ of 2 represents a bad surface that has a low coefficient or is rough. Returning to FIG. 6, the system 300 includes a road surface condition processor 304 that receives the sensor information, and determines whether the road surface condition index road$_{surface}$ is for a moderate coefficient road surface at box 308 or a rough coefficient at box 310.

The ambient conditions mainly concern factors that affect visibility, such as light condition (day or night), weather condition, such as fog, rain, snow, etc. The system 300 includes an ambient condition processor 306 that provides the road ambient condition index road$_{ambient}$. The ambient condition processor 306 includes a light level detection box 312 that provides an indication of the light level, a rain/snow detection box 314 that provides a signal of the rain/snow condition and a fog detection box 316 that provides a detection of whether fog is present, all of which are combined to provide the road ambient condition index road$_{ambient}$.

The sensing of the light condition by the box 312 can be achieved by a typical twilight sensor that senses light level as seen by a driver for automatic headlight control. Typically, the light level output is a current that is proportional to the ambient light level. Based on this output, the light level can be computed and the light condition can be classified into several levels, such as 0-2 where zero represents bright daylight and two represents a very dark condition. For example, light$_{level}$=0 if the computed light level is higher than the threshold L$_{high}$, where L$_{high}$=300 lux, light$_{level}$=1 if the light level is between thresholds L$_{high}$ and L$_{low}$, where L$_{low}$ can be the headlight activation threshold or 150 lux, and light$_{level}$=2 if the light level is lower than the threshold L$_{low}$.

The rain/snow condition can be detected by the box 314 using an automatic rain sensor that is typically mounted on the inside surface of the windshield and is used to support the automatic mode of windshield wipers. The most common rain sensor transmit an infrared light beam at a 45° angle into the windshield from the inside near the lower edge, and if the windshield is wet, less light makes it back to the sensor. Some rain sensors are also capable of sensing the degree of the rain so that the wipers can be turned on at the right speed. Therefore, the rain/snow condition can be directly recognized based on the rain sensor detection. Moreover, the degree of the rain/snow can be determined based by either the rain sensor or the windshield wiper speed. Alternatively, the rain/snow condition can be detected solely based on whether the windshield wiper has been on for a certain period of time, such as 30 seconds. The rain/snow condition can be categorized into 1+N levels with rain$_{level}$=0 representing no rain and rain$_{level}$=i with i indicating the speed level of the windshield wiper since most windshield wipers operate at discrete speeds. Alternatively, if the vehicle is equipped with GPS or DGPS and a vehicle-to-infrastructure communication, the rain/snow condition can also be determined based on rain/snow warnings broadcast from the infrastructure.

The fog condition can be detected by the box 316 using a forward-looking camera or lidar. The images from the camera can be processed to measure the visibility distance, such as the meteorological visibility distance defined by the international commission on illumination as the distance beyond which a black object of an appropriate dimension is perceived with a contrast of less than 5%. A lidar sensor detects fog by sensing the microphysical and optical properties of the ambient environment. Based on its received fields of view, the lidar sensor is capable of computing the effective radius of the fog droplets in foggy conditions and calculates the extinction coefficients at visible and infrared wavelengths. The techniques for the fog detection based on a camera or lidar are well-known to those skilled in the art, and therefore need not be discussed in significant detail herein. This invention takes results from those systems, such as the visibility distance from a camera-based fog detector or, equivalently, the extension coefficients at visible wavelengths from a lidar-based fog detection system, and classifies the following condition accordingly. For example, the foggy condition can be classified into four levels 0-3 with 0 representing no fog and 3 representing a high-density fog. The determination of the fog density level based on the visibility distance can be classified as:

$$fog_{level} = \begin{cases} 0, & \text{if } visibility \geq visibility_{high} \\ 1, & \text{if } visibility_{med} \leq visibility < visibility_{high} \\ 2, & \text{if } visibility_{low} \leq visibility < visibility_{med} \\ 3, & \text{if } visibility < visibility_{low} \end{cases} \quad (9)$$

Where exemplary values of the thresholds can be visibility$_{high}$=140 m, visibility$_{med}$=70 m and visibility$_{low}$=35 m. Alternatively, if the vehicle 10 is equipped with GPS or DGPS and vehicle-to-infrastructure communications, the foggy condition may also be determined based on the fog warnings broadcast from the infrastructure.

The road ambient condition index Road$_{ambient}$ then combines the detection results of the light condition, the rain/snow condition, and the foggy condition. The simplest way is to let Road$_{ambient}$=[light$_{level}$ rain$_{level}$ fog$_{level}$]$^T$.

Alternatively, the road ambient condition index Road$_{ambient}$ could be a function of the detection results such as:

$$Road_{ambient} = f_{ambient}(light_{level}, rain_{level}, fog_{level}) \quad (10)$$
$$= \alpha_1 \times light_{level} + \alpha_2 \, rain_{level} + \alpha_3 \times fog_{level}$$

Where $\alpha_1$, $\alpha_2$, and $\alpha_3$ are weighting factors that are greater than zero. Note that the larger each individual detection result is, the worse the ambient condition is for driving. Consequently, the larger the ambient road condition index Road$_{ambient}$ the worse the ambient condition is for driving.

The three road condition indexes, Road$_{type}$, Road$_{surface}$, Road$_{ambient}$, are then combined by the system 300 to reflect the road condition. The combination can be a simple combination, such as Road$_{index}$=[road$_{type}$ road$_{surface}$ road$_{ambient}$]$^T$, or a function, such as Road$_{index}$=f$_{road}$(road$_{type}$ road$_{surface}$ road$_{ambient}$), which could be a look-up table.

Thus, recognized traffic/road conditions can be used in the style characterization processor 52 in two ways. First, the data selection processor 48 determines the portion of data to be recorded for style classification based on the maneuver identifier value M$_{id}$ and the recognized traffic/road conditions. Second, the style classification processor 52 classifies driving style based on driver inputs and vehicle motion, as well as the traffic/road conditions. That is, the traffic/road condition indexes are part of the discriminant features (discussed below) used in the style classification.

Not all data measured during driving is useful. In fact it would be unnecessary and uneconomic to record all of the data. In the present invention, information regarding the maneuver type and the traffic/road conditions help determine whether the current driving behavior is valuable for the characterization. If so, the data is recorded by the data selection processor 48. For example, if the traffic is jammed, it may be meaningless to characterize the style based on lane-change maneuvers. In such cases, the data should not be stored. On the other hand, if the traffic is moderate, the data should be recorded that the maneuver is a characteristic maneuver. To maintain the completeness of the recording, a short period of data is always recorded and refreshed.

Figure 8:
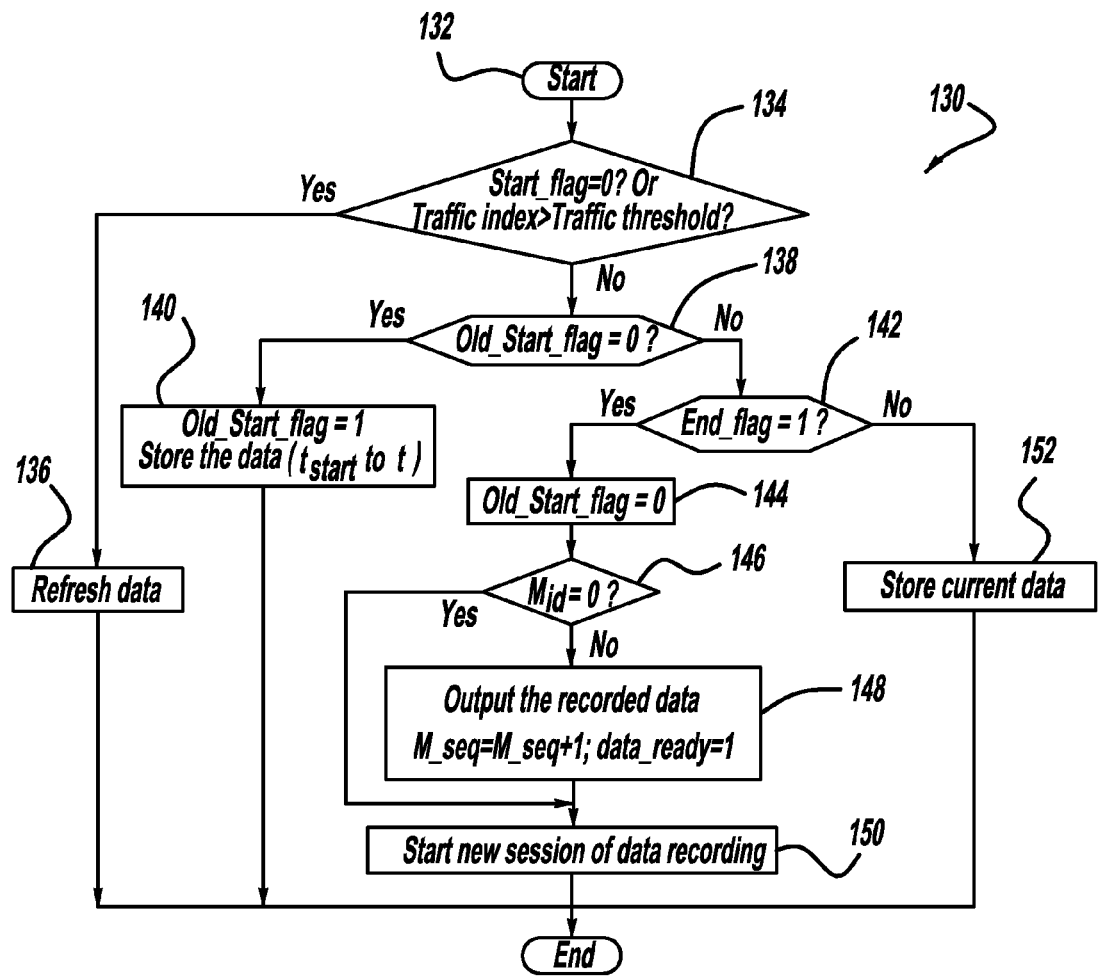
FIG. 8 is a flow chart diagram showing a process for providing data selection in the data selection processor in the systems shown in FIGS. 2, 3 and 4, according to an embodiment of the present invention.

FIG. 8 is a flow chart diagram 130 showing a process used by the data selection processor 48 for storing the data corresponding to a particular characteristic maneuver. This process for the data selection processor 48 can be employed for various characteristic maneuvers, including, but not limited to, a vehicle passing maneuver, a left/right-turn maneuver, a lane-changing maneuver, a U-turn maneuver, vehicle launching maneuver and an on/off-ramp maneuver, all discussed in more detail below. At start block 132, the algorithm used by the data selection processor 48 reads the Boolean variables Start_flag and End_flag from the maneuver identifier processor 46. If Start_flag is zero or the traffic index $Traffic_{index}$ is greater than the traffic threshold $\delta_{th}$ at decision diamond 134, the data selection processor 48 simply keeps refreshing its data storage to prepare for the next characteristic maneuver at block 136.

If either of the conditions of the decision diamond 134 is not met, then the algorithm determines whether a variable old_Start_flag is zero at block 138. If old_Start_flag is zero at the block 138, the algorithm sets old_Start_flag to one, and starts recording by storing the data between time $t_{start}$ and the current time t at box 140. The data can include vehicle speed, longitudinal acceleration, yaw rate, steering angle, throttle opening, range, range rate and processed information, such as traffic index and road condition index.

If old_Start_flag is not zero at the block 138, the data selection processor 48 is already in the recording mode, so it then determines whether the maneuver has been completed. Particularly, the algorithm determines whether End_flag is one at block 142 and, if so, the maneuver has been completed. The algorithm then resets old_Start_flag to zero at box 144, and determines whether the maneuver identifier value $M_{id}$ is zero at decision diamond 146. If the maneuver value $M_{id}$ is not zero at the decision diamond 146, then the data selection processor 48 outputs the recorded data, including the value $M_{id}$, and increases the maneuver sequence index $M_{seq}=M_{seq}+1$ at box 148. The data selection processor 48 also stores the data between the time $t_{start}$ and the time $t_{end}$ together with the values $M_{seq}$ and $M_{id}$, and sets a variable data_ready=1 to inform the style characterization processor 52 that the recorded data is ready. The algorithm then begins a new session of data recording at box 150.

If End_flag is not one at the block 142, the maneuver has not been completed, and the data selection processor 48 continues storing the new data at box 152.

The collected data is then used to determine the driving style, where the Boolean variable data will be used by the style characterization processor 52 to identify a classification process.

According to one embodiment of the present invention, the style characterization processor 52 classifies a driver's driving style based on discriminant features. Although various classification techniques, such as fuzzy logic, clustering, neural networks (NN), self-organizing maps (SOM), and even simple threshold-base logic can be used, it is an innovation of the present invention to utilize such techniques to characterize a driver's driving style. To illustrate how the style characterization processor 52 works, an example of style classification based on fuzzy C-means (FCM) can be employed.

Figure 9:
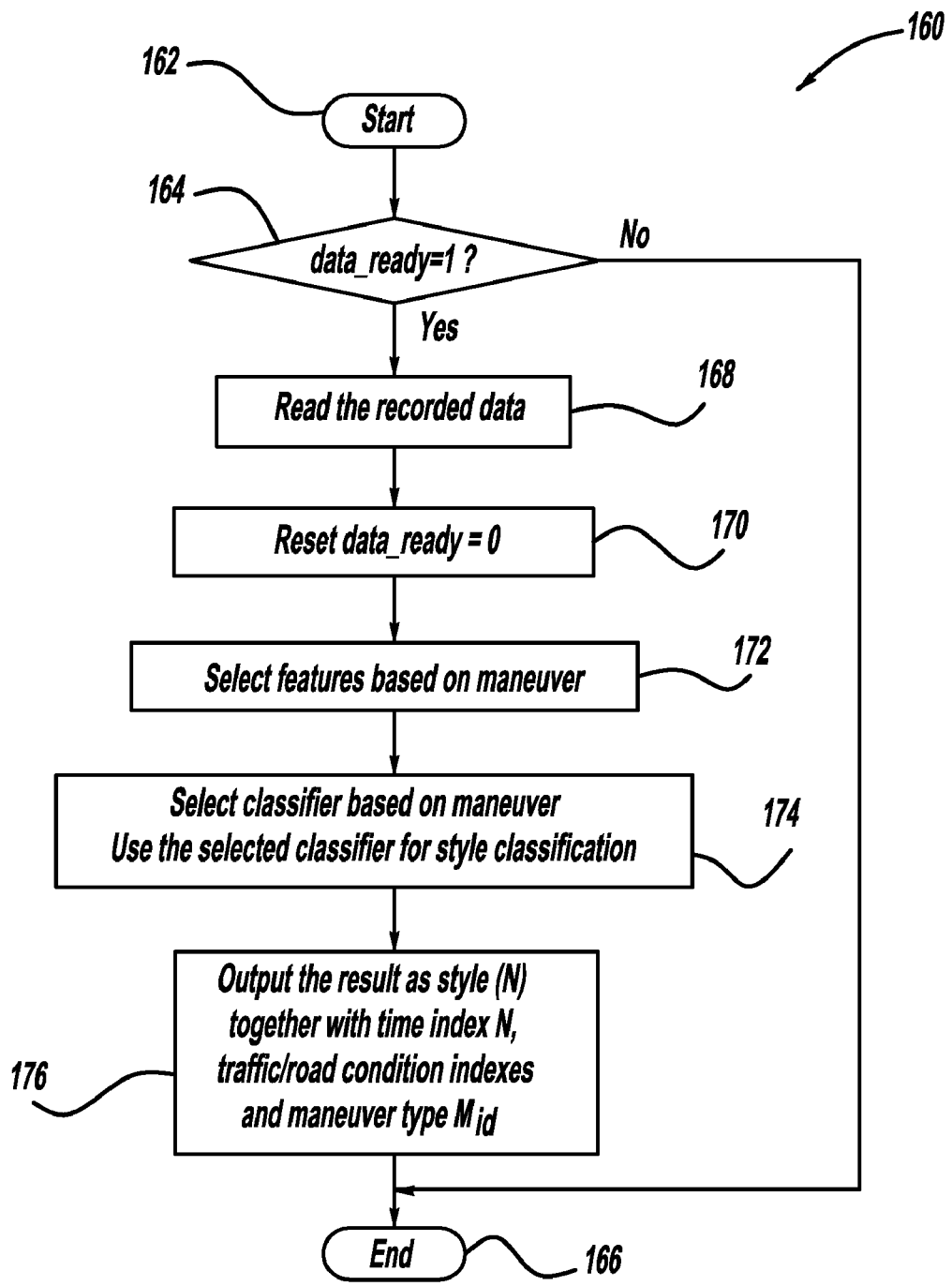
FIG. 9 is a flow chart diagram showing a process for providing style classification in the style characterization processor of the systems shown in FIGS. 2, 3 and 4, according to an embodiment of the present invention.

FIG. 9 is a flow chart diagram 160 showing such a fuzzy C-means process used by the style characterization processor 52. However, as will be appreciated by those skilled in the art, any of the before mentioned classification techniques can be used for the style classification. Alternatively, the discriminants can be further separated into smaller sets and classifiers can be designed for each set in order to reduce the dimension of the discriminant features handled by each classifier.

Data is collected at box 162, and the algorithm employed in the style characterization processor 52 determines whether the variable data_ready is one at decision diamond 164, and if not, the process ends at block 166. If data_ready is one at the decision diamond 164, the algorithm reads the recorded data from the data selection processor 48 at box 168 and changes data ready to zero at box 170. The algorithm then selects discriminant features for the identified maneuver at box 172. The process to select discriminate features can be broken down into three steps, namely, deriving/generating original features from the collected data, extracting features from the original features, and selecting the final discriminate features from the extracted features. The algorithm then selects the classifier for the particular maneuver and uses the selected classifier to classify the maneuver at box 174. The processor then outputs the style (N) value, the time index N, the traffic index $Traffic_{index}$, the road condition index $Road_{index}$ and the maneuver identifier value $M_{id}$ at box 176.

The traffic and road conditions can be incorporated in the style characterization processor 52 using three different incorporation schemes. These schemes include a tightly-coupled incorporation that includes the traffic and road conditions as part of the features used for style classification, select/switch incorporation where multiple classifiers come together with feature extraction/selection designed for different traffic and road conditions and classifiers selected based on the traffic and road conditions associated with the maneuver to be identified, and decoupled-scaling incorporation where generic classifiers are designed regardless of traffic and road conditions and the classification results are adjusted by multiplying scaling factors. Tightly-coupled incorporation and selected/switch incorporation are carried out in the style characterization processor 52 and the decoupled-scaling incorporation can be included in either the style characterization processor 52 or the decision fusion processor 56.

Figure 10:
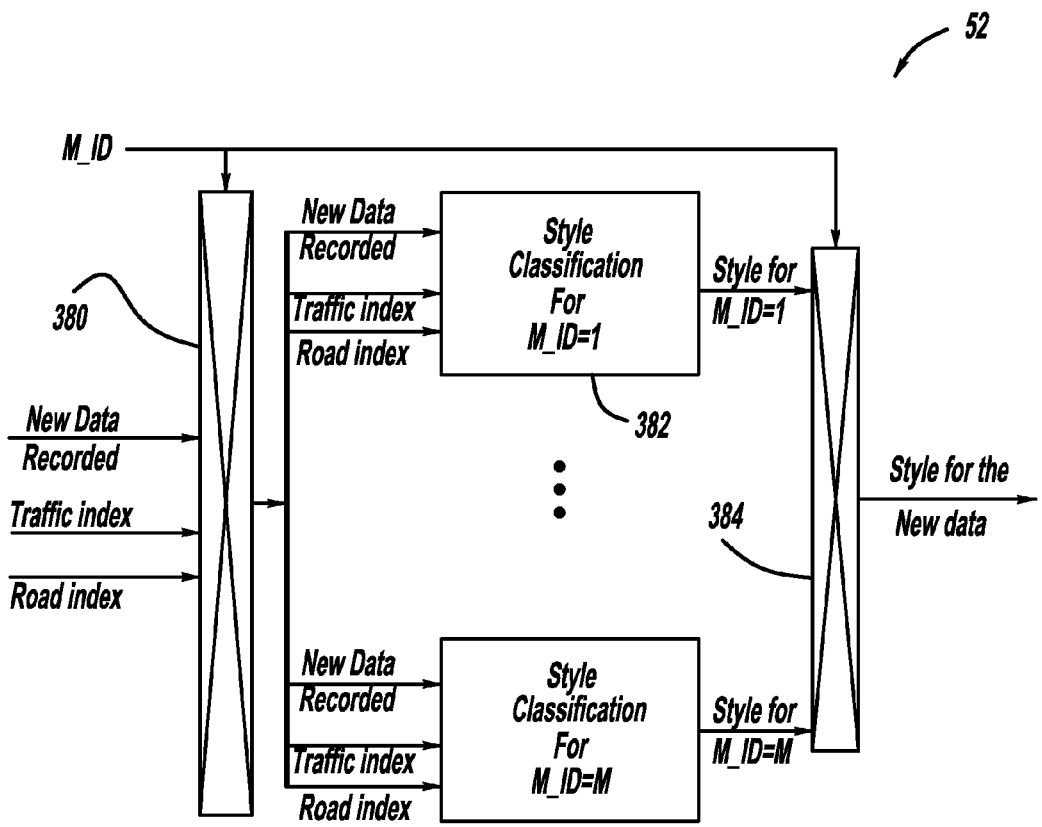
FIG. 10 is a block diagram of a style characterization processor that can be used in the systems shown in FIGS. 2, 3 and 4, according to an embodiment of the present invention.

FIG. 10 is a block diagram of the style characterization processor 52, according to one embodiment of the present invention. The maneuver identifier value $M_{id}$ from the maneuver identification processor 46 is applied to a switch 380 along with the recorded data from the data selection processor 48, and the traffic condition index $Traffic_{index}$ and the road condition index $Road_{index}$ from the traffic/road condition recognition processor 50. The switch 380 identifies a particular maneuver value $M_{id}$, and applies the recorded data, the traffic index $Traffic_{index}$ and the road condition index $Road_{index}$ to a style classification processor 382 for that particular maneuver. Each style classification processor 382 provides the classification for one particular maneuver. An output switch 384 selects the classification from the processor 382 for the maneuvers being classified and provides the style classification value to the style profile trip-logger 54 and the decision fusion processor 56, as discussed above.

Figure 11:
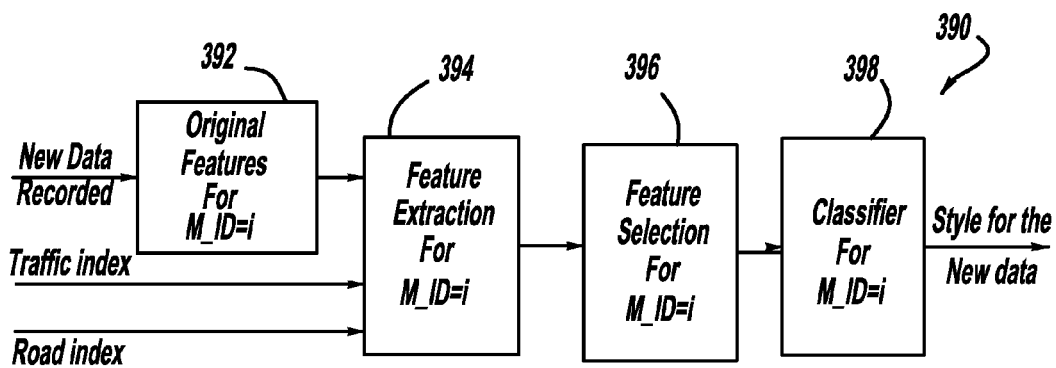
FIG. 11 is a block diagram of a style classification processor that can be used in the systems shown in FIGS. 2, 3 and 4, according to another embodiment of the present invention.

FIG. 11 is a block diagram of a style classification processor 390 that employs the tightly-coupled incorporation, and can be used for the style classification processors 382, according to an embodiment of the present invention. In this maneuver classifying scheme, the traffic index $Traffic_{index}$ and the road condition index $Road_{index}$ are included as part of the original feature vector. The processor 390 includes an original feature processor 390 that receives the recorded data from the data selection processor 48 and identifies the original features from the recorded data. The original features, the traffic index $Traffic_{index}$ and the road condition index $Road_{in-}$ $_{dex}$ are sent to a feature extraction processor 394 that extracts the features. When the features are extracted for the particular maneuver, certain of the features are selected by feature selection processor 396 and the selected features are classified by a classifier 398 to identify the style.

Figure 12:
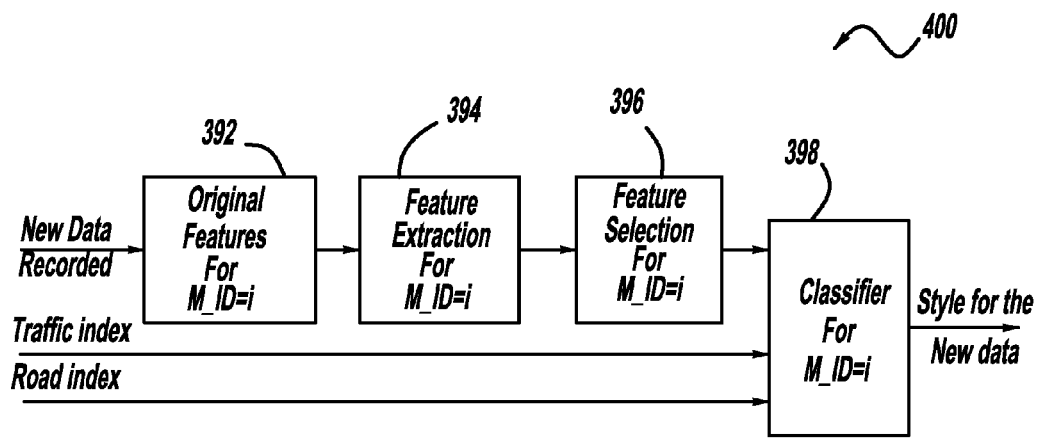
FIG. 12 is a block diagram of a style classification processor that can be used in the systems shown in FIGS. 2, 3 and 4, according to another embodiment of the present invention.

FIG. 12 is a block diagram of a style classification processor 400 similar to the classification processor 390 which can be used as the style classification processors 382, where like elements are identified by the same reference numeral, according to another embodiment of the present invention. In this embodiment, the traffic index Traffic$_{index}$ and the road condition index Road$_{index}$ are applied directly to the classifier 398 and not to the feature extraction processor 394. The difference between the classification processor 390 and the classification processor 400 lies in whether the traffic index Traffic$_{index}$ and the road condition index Road$_{index}$ are processed through feature extraction and selection. The design process of the feature extraction/selection in the classifiers remains the same regardless of whether the traffic index Traffic$_{index}$ and the road condition index Road$_{index}$ are included or not. However, the resulting classifiers are different, and so is the feature extraction/selection if those indexes are added to the original feature vector.

Figure 13:
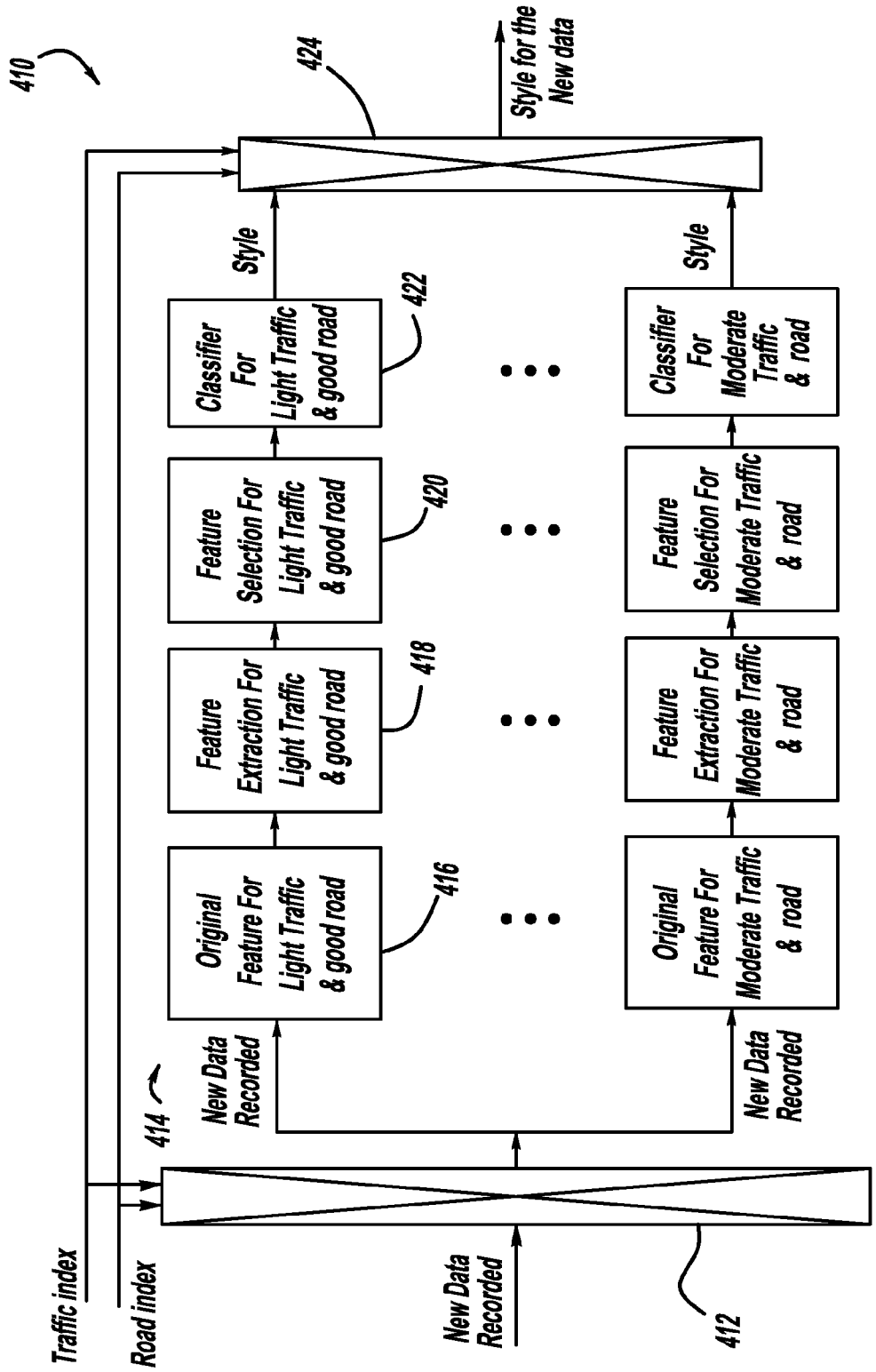
FIG. 13 is a block diagram of a style classification processor that can be used in the systems shown in FIGS. 2, 3 and 4, according to another embodiment of the present invention.

FIG. 13 is a block diagram of a style classification processor 410 that employs the select/switch incorporation process, and can be used for the style classification processor 382, according to another embodiment of the present invention. In this embodiment, the classifier used for feature extraction/selection is not only maneuver-type specific, but also traffic/road condition specific. For example, the traffic conditions can be separated into two levels, light traffic and moderate traffic, and the road conditions can be separated into good condition and moderate condition. Accordingly, four categories are created for the traffic and road conditions and a specific style classification is designed for each combination of the maneuver type and the four traffic-road condition categories. Once the maneuver has been identified, the style classification processor 410 selects the appropriate classification based on the traffic/road conditions. The classification includes the selection of the original features, feature extraction/selection and classifiers to classify the recorded maneuver.

In the style classification processor 410, the traffic index Traffic$_{index}$, the road condition index Road$_{index}$ and the recorded data from the data selection processor 48 for a particular maneuver are sent to an input switch 412. The recorded data is switched to a particular channel 414 depending on the traffic and road index combination. Particularly, the combination of the traffic index Traffic$_{index}$ and the road condition index Road$_{index}$ applied to the input switch 14 will select one of four separate channels 414, including a channel for light traffic and good road conditions, light traffic and moderate road condition, moderate traffic and good road conditions, and moderate traffic and moderate road conditions. For each traffic/road index combination, an original features processor 416 derives original features from the data associated with the maneuver, which is collected by the data selection module 48, a feature extraction processor 418 extracts the features from these original features, a feature selection processor 420 further selects the features and a classifier 422 classifies the driving style based on the selected features. An output switch 424 selects the style classification for the particular combination of the traffic/road index.

In the select/switch incorporation scheme, the design of the style characterization processor 52 is both maneuver-type specific and traffic/road condition specific. Therefore, the maneuvers used for the design, which are collected from vehicle testing, are first grouped according to both the maneuver type and the traffic/road condition. For each group of maneuvers, i.e., maneuvers of the same type and with the same traffic/road condition, the style classification, including selection of original features, feature extraction/selection and the classifiers, is designed. Since the style classification is designed for specific traffic/road conditions, the traffic and road information is no longer included in the features. Consequently, the design process would be exactly the same as the generic design that does not take traffic/road conditions into consideration. However, the resulting classification will be different because the maneuvers are traffic/road condition specific. Moreover, the number of classifiers is four times that of the generic classifiers. As a result, the select/switch incorporation would require a larger memory to store the classifiers.

For the decoupled-scaling incorporation, the style classification design does not take traffic and road conditions into consideration. In other words, maneuvers of the same type are classified using the same original features, the same feature extraction/selection and the same classifiers. The original features do not include traffic/road conditions. In other words, the style classification is generic to traffic/road conditions. The classification results are then adjusted using scaling factors that are functions of the traffic/road conditions. For example, if the style classification of the Nth maneuver is style (N), where style (N) is a number representing a level of sporty driving, the adjusted style can be:

$$\text{Style}_{adjust}(N) = \text{style}(N)\kappa(\text{Traffic}_{index}(N), \text{Road}_{index}(N)) \quad (11)$$

Where $\kappa(\text{Traffic}_{index}, \text{Road}_{index})$ is the scaling factor related to traffic/road conditions.

Alternatively, the affects of the traffic and road conditions may be decoupled, for example by:

$$\kappa(\text{Traffic}_{index}, \text{Road}_{index}) = \alpha(\text{Traffic}_{index})\beta(\text{Road}_{index}) \quad (12)$$

The adjusted style is:

$$\text{Style}_{adjust}(N) = \text{Style}(N)\alpha(\text{Traffic}_{index}(N))\beta(\text{Road}_{index}(N)) \quad (13)$$

The scaling factors are designed so that the sportiness level is increased for maneuvers under a heavier traffic and/or worse road condition. For example, if the sportiness is divided into five levels with 1 representing a conservative driving style and 5 representing a very sporty driving style, than Style(N) ∈ {0, 1, 2, 3, 4, 5} with 0 representing hard-to-decide patterns. Therefore, one possible choice for the scaling factors can be:

$$\alpha(\text{Traffic}_{index}) = \begin{cases} 1, & \text{for } \text{Traffic}_{index} \leq \text{Traffic}_{light} \\ 1.5 \times \dfrac{\text{Traffic}_{index} - \text{Traffic}_{light}}{\text{Traffic}_{heavy} - \text{Traffic}_{light}}, & \text{for } \text{Traffic}_{light} < \text{Traffic}_{index} < \text{Traffic}_{heavy} \end{cases} \quad (14)$$

$$\beta(\text{Road}_{index}) = \begin{cases} 1, & \text{for } \text{Road}_{index} \geq \text{Road}_{good} \\ 1.5 \times \dfrac{\text{Road}_{good} - \text{Road}_{index}}{\text{Road}_{good} - \text{Road}_{bad}}, & \text{for } \text{Road}_{bad} < \text{Road}_{index} < \text{Road}_{good} \end{cases} \quad (15)$$

Note that if style(N)=0, style$_{adjust}$(N) remains zero.

Equation (14) or (15) will also work if the style characterization of the Nth maneuver outputs a confidence vector instead of a scalar style(N)=[conf(0) conf(1) ... conf(k)]$^T$, where conf(i) is the confidence the classifier has in that input pattern belongs to the class $c_i$. In this case, the scaling factors in equations (14) and (15) are no longer scalars, but matrixes.

The style characterization processor 52 can also use headway control behaviors to utilize the data corresponding to three of the five maneuvers, particularly, vehicle following, another vehicle cutting in, and preceding vehicle changing lanes. The other two maneuvers, no preceding vehicle and the subject vehicle changing lanes, are either of little concern or involve more complicated analysis.

The vehicle following maneuver can be broken down into three types of events based on the range rate, i.e., the rate change of the following distance, which can be directly measured by a forward-looking radar or processed from visual images from a forward-looking camera. Three types of events are a steady-state vehicle following where the range rate is small, closing in, where the range rate is negative and relatively large, and falling behind, where the range rate is positive and relatively large. Thus, the data for vehicle following can be portioned accordingly based on the range rate.

During steady-state vehicle following, the driver's main purpose in headway control is to maintain his or her headway distance of headway time, i.e., the time to travel the headway distance. Therefore, the acceleration and deceleration of the subject vehicle mainly depends on the acceleration and deceleration of the preceding vehicle, while the headway distance/time is a better reflection of the driver's driving style. Hence, the average headway distance, or headway time, the average velocity of the vehicle, the traffic index $Traffic_{index}$ and the road condition index $Road_{index}$, including the road type index and ambient condition index, are used as the original features in the classification. With these original features, various feature extraction and feature selection techniques can be applied so that the resulting features can best separate patterns of different classes. Various techniques can be used for feature extraction/selection and are well know to those skilled in the art. Since the original features, and thus the extracted features, consist of only five features, all features can be selected in the feature selection process. A neural network can be designed for the classification where the network has an input layer with five input neurons corresponding to the five discriminants, a hidden layer and an output layer with 1 neuron. The output of the net ranges from 1-5, with 1 indicating a rather conservative driver, 3 a typical driver and 5 a rather sporty driver. The design and training of the neural network is based on vehicle test data with a number of drivers driving under various traffic and road conditions.

During the closing-in period, the signals used for classification are the range rate, the time to close the following distance, i.e., the range divided by the range rate, vehicle acceleration/deceleration and vehicle speed. The decrease of the following distance may be due to the deceleration of the preceding vehicle or the acceleration of the subject vehicle. Therefore, the style index should be larger if it is due to the acceleration of the subject vehicle. Because all of these signals are time-domain series, data reduction is necessary in order to reduce the complexity of the classifier. One selection of original features includes the minimum value of the headway distance, the minimum value of the range rate because the range rate is now negative, the minimum value of the time to close the gap, i.e., the minimum headway distance/range rate, the average speed, the average longitudinal acceleration, and the traffic and road indexes. Similarly, a neural network can be designed with six neurons in the input layer and one in the output layer. Again, the design and training of the neural network is based on vehicle test data with drivers driving under various traffic and road conditions.

The falling-behind event usually occurs when the subject vehicle has not responded to the acceleration of the preceding vehicle or the subject vehicle simply chooses to decelerate to have a larger following distance. The former case may not reflect the drivers style while the second case may not add much value since the larger following distance will be used in vehicle following. Hence, no further processing is necessary for this event.

Another vehicle cutting in and preceding vehicle changing lanes are two maneuvers that induce a sudden change in the headway distance/time where the driver accelerates or decelerates so that the headway distance/time returns to his or her desired value. The acceleration and deceleration during such events can reflect driving style.

When another vehicle cuts in, the subject vehicle usually decelerates until the headway distance/time reaches the steady-state headway distance/time referred by the driver. A more conservative driver usually decelerates faster to get back to his/her comfort level quicker, while a sportier driver has a higher tolerance of the shorter distance and decelerates relatively slowly. Factors that contribute to the driver's decision of how fast/slow to decelerate include the difference between a new headway distance/time and his/her preferred headway distance/time, as well as vehicle speed and road conditions. An exemplary selection of original features consists of the difference between the new headway time, which is the headway time at the instant the cut-in occurs, and the driver preferred headway time, i.e., an average value from the vehicle-following maneuver, the time to reach the preferred headway time, which can be determined by the settling of the headway time and range rate, the maximum range rate, the maximum braking force, the maximum variation in speed ((average speed-minimum speed)/average speed), average speed and the road condition index. Similarly, neural networks can be used for the classification.

When the preceding vehicle changes lanes, the following distance suddenly becomes larger. A sportier driver may accelerate quickly and close the gap faster, while a more conservative driver accelerates slowly and gradually closes the gap. Similar to the case above, the original features include the difference between the new headway time, which is the headway time at the instance the preceding vehicle changes out of the lane, and the driver's preferred headway time, the time to reach the preferred headway time, the maximum range rate, the maximum throttle, the maximum variation and speed ((maximum speed-average speed)/average speed), average speed, and the road condition index $Road_{index}$. Again, neural networks can be designed for this classification.

It is noted that although neural networks can be used as the classification technique, the style characterization processor 52 can easily employ other techniques, such as fuzzy logic, clustering, simple threshold-base logic, etc.

The maneuvers related to drivers headway control behavior show that the characteristic maneuvers can be properly identified given various in-vehicle measurements, including speed, yaw rate, lateral acceleration, steering profile and vehicle track using GPS sensors. Once a characteristic maneuver is identified, key parameters can be established to describe such a maneuver and the intended path can be reconstructed. With this information available, the intended path can be provided to a process maneuver model where human commands of a typical driver can be generated. The maneuver model can be constructed based on a dynamic model of a moderate driver. One example of a construction and use of such a dynamic model is disclosed U.S. patent application Ser. No. 11/398,952, titled Vehicle Stability Enhancement Control Adaptation to Driving Skill, filed Apr. 6, 2006, assigned to the assignee of this application and herein incorporated by a reference.

Figure 14:
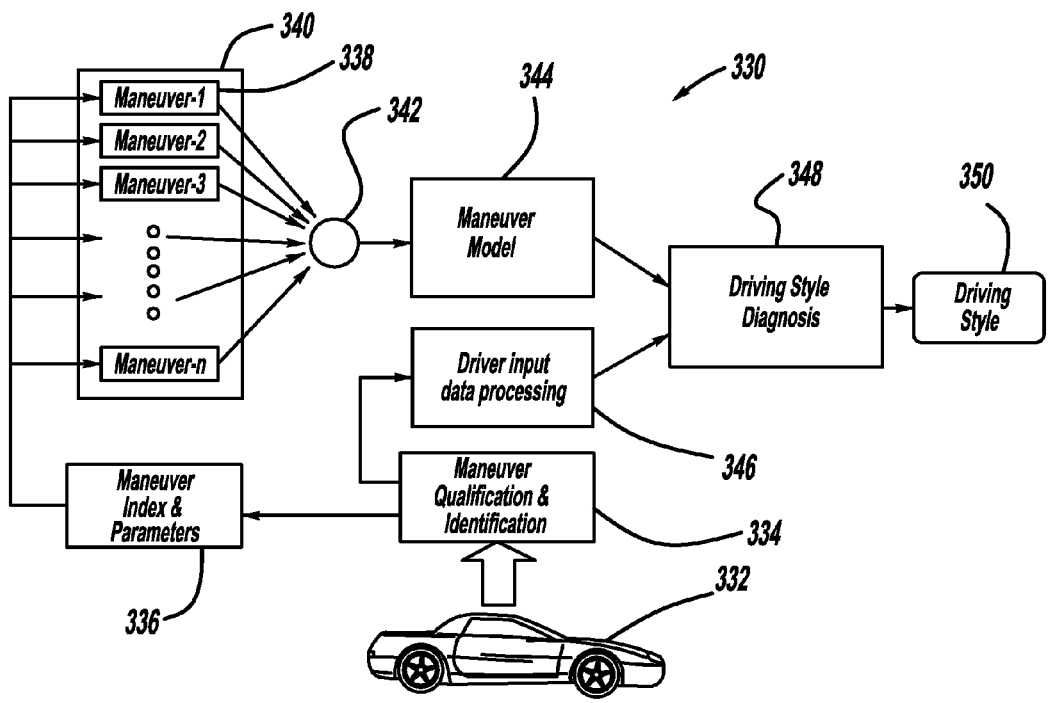
FIG. 14 is a block diagram of a process maneuver model system that can be employed in the style characterization processor of the systems shown in FIGS. 2, 3 and 4 for providing headway control, according to an embodiment of the present invention.

FIG. 14 is a system 330 showing an example of such a process maneuver model. Vehicle data from a vehicle 332 is collected to be qualified and identified by a maneuver qualification and identification processor 334. Once the data is qualified and the maneuver is identified, a maneuver index and parameter processor 336 creates an index and further identifies relevant parameters for the purpose of reconstruction of the intended path. These parameters can include the range of yaw rate, lateral acceleration the vehicle experienced through the maneuver, vehicle speed, steering excursion and the traffic condition index $Traffic_{index}$. The maneuver index processor 336 selects the appropriate maneuver algorithm 338 in a path reconstruction processor 340 to reproduce the intended path of the maneuver without considering the specificities of driver character reflected by the unusual steering agility or excessive oversteer or understeer incompatible with the intended path. The one or more maneuvers are summed by a summer 342 and sent to a maneuver model processor 344. Driver control command inputs including steering, braking and throttle controls are processed by a driver input data processor 346 to be synchronized with the output of the maneuver model processor 344, which generates the corresponding control commands of steering, braking and throttle controls of an average driver. The control signal from the maneuver model processor 344 and the driver input data processor 346 are then processed by a driver style diagnosis processor 348 to detect the driving style at box 350.

Figure 15:
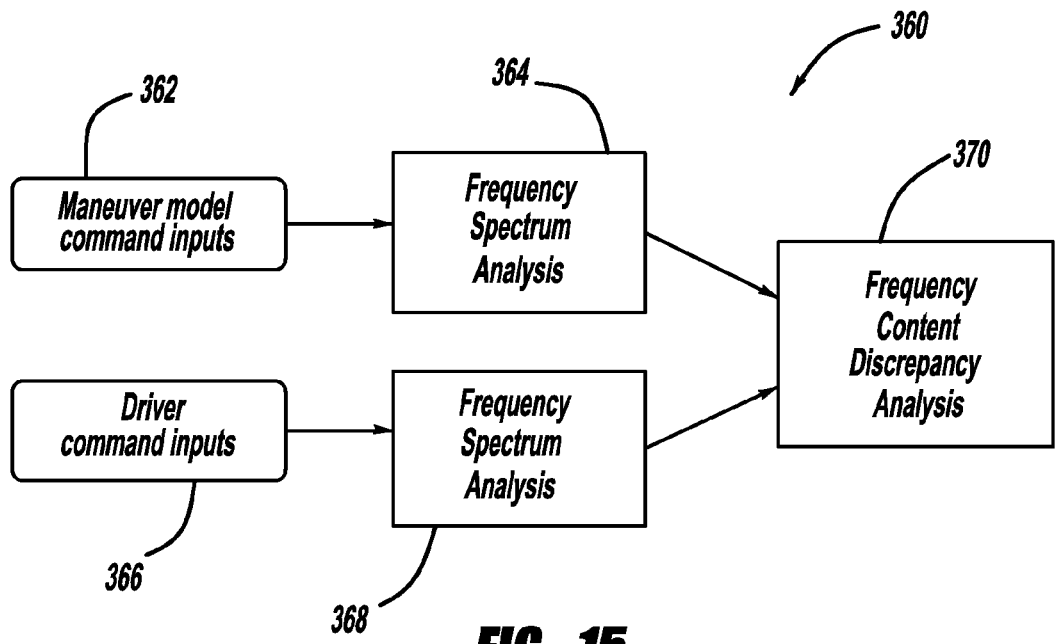
FIG. 15 is a block diagram of the driving style diagnosis processor shown in the system of FIG. 14, according to an embodiment of the present invention.

FIG. 15 is a block diagram of a system 360 showing one embodiment as to how the driving style diagnosis processor 348 identifies the differences between the driver's behavior and an average driver. The maneuver model command inputs at box 362 for the maneuver model processor 344 are sent to a frequency spectrum analysis processor 364, and the driver command inputs at box 366 from the driver input data processor 346 are sent to a frequency spectrum analysis processor 368. The inputs are converted to the frequency domain by the frequency spectrum analysis processors 364 and 368, which are then sent to a frequency content discrepancy analysis processor 370 to determine the difference therebetween. However, it is noted that other methodologists can be applied to identify the difference between the model and the commands besides frequency domain analysis.

Figure 16:
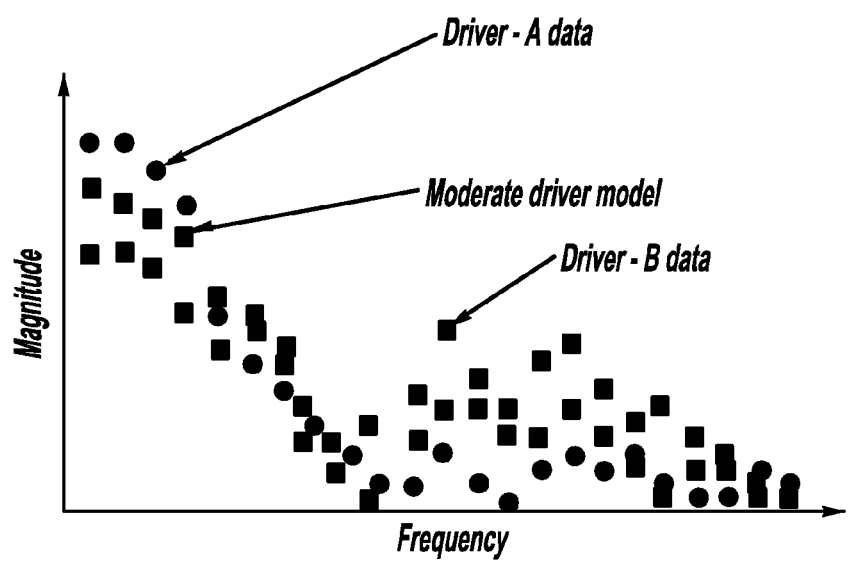
FIG. 16 is a graph with frequency on the horizontal axis and magnitude on the vertical axis illustrating behavioral differences of various drivers.

FIG. 16 is a graph with frequency on the horizontal axis and magnitude on the vertical axis illustrating a situation where behavioral differences are identified through the variation of the frequency spectrum. Given a headway control maneuver, the driver may apply the brake in different ways according to a specific driving style. While an average driver results in the spectrum in one distribution, another driver, such as driver-A, shows a higher magnitude in the low-frequency area and lower magnitude in the high-frequency area. Driver-B shows the opposite trend. The differences in these signal distributions can be used to determine the driving style of the specific driver.

The difference in the frequency spectrum distribution can be used as inputs to a neural network where properly trained persons can identify the proper style of the driver. The art of using neural networks to identify the driving style given the differences of the frequency spectrum distribution is well-known to those skilled in the art, and need not be discussed in further detail here. In this illustration, a properly trained neural network classifier can successfully characterize driver-A as conservative and driver-B as aggressive if the difference is on the spectrum distribution is determined to have completed a predetermined threshold.

The style characterization processor 52 classifies driving style based on every single characteristic maneuver and the classification results are stored in a data array in the style profile trip-logger 54. In addition, the data array also contains information such as the time index of the maneuver $M_{seq}$, the type of maneuver identified by the identifier value $M_{id}$, the traffic condition index $Traffic_{index}$ and the road condition index $Road_{index}$. The results stored in the trip-logger 54 can be used to enhance the accuracy and the robustness of the characterization. To fulfill this task, the decision fusion processor 56 is provided. Whenever a new classification result is available, the decision fusion processor 56 integrates the new result with previous results in the trip-logger 54. Various decision fusion techniques, such as a Bayesian fusion and Dempster-Shafer fusion, can be used and applied in the decision fusion processor 56. To demonstrate how this works, a simple example of weighted-average based decision is given below.

The decision fusion based on a simple weighted average can be given as:

$$Style_{fused}(N) = \sum_{i=N-k}^{N} \alpha(Traffic_{index}(i))\beta(Road_{index}(i))\gamma(M\_ID(i))\lambda^{N-i}style(i) \quad (16)$$

Or equivalently:

$$Style_{fused}(N) = \alpha(Traffic_{index}(N))\beta(Road_{index}(N))\gamma(M\_ID(N))style(N) + \lambda Style_{fused}(N-1) \quad (17)$$

Where N is the time index of the most recent maneuver, style(i) is the style classification result based on the ith maneuver, i.e., M_seq=i, $\alpha(Traffic_{index}(i))$ is a traffic-related weighting, $\beta(Road_{index}(i))$ is a road condition related weighting, $\gamma(M\_ID(i))$ is a maneuver-type related weighting, $\lambda$ is a forgetting factor ($0 < \lambda \leq 1$) and k is the length of the time index window for the decision fusion.

In one embodiment, traffic and road conditions have already been considered in the style classification process, the decision fusion may not need to incorporate their effect explicitly. Therefore, $\alpha(Traffic_{index}(i))$ and $\beta(Road_{index}(i))$ can be chosen as 1. Moreover, if the classification results from different maneuvers are compatible with one another, $\gamma(M\_ID(i))$ can also be chosen as 1. The decision fusion can then be simplified as:

$$Style_{fused}(N) = style(N) + \lambda Style_{fused}(N-1) \quad (18)$$

Recommended values for the forgetting factors $\lambda$ are between 0.9 and 1, depending on how much previous results are valued. Of course, the decision fusion can also take into consideration traffic, road and maneuver types and use the form of equation (16).

As discussed above, the maneuver identification processor 46 recognizes certain maneuvers carried out by the vehicle driver. In one embodiment, the style classification performed in the style characterization processor 52 is based on a vehicle lane-change maneuver identified by the processor 46. Lane-change maneuvers can be directly detected or identified if a vehicles in-lane position is available. The in-lane position can be derived by processing information from the forward-looking camera 20, or a DGPS with sub-meter level accuracy together with the EDMAP 28 that has lane information. Detection of lane changes based on vehicle in-lane position is well-known to those skilled in the art, and therefore need not be discussed in significant detail herein. Because forward-looking cameras are usually available in luxury vehicles and mid-range to high-range DGPS are currently rare in production vehicles, the present invention includes a technique to detect lane change based on common in-vehicle sensors and GPS. Though the error in a GPS position measurement is relatively large, such as 5-8 meters, its heading angle measurement is much more accurate, and can be used for the detection of lane changes.

In a typical lane-change maneuver, a driver turns the steering wheel to one direction, then turns towards the other direction, and then turns back to neutral as he/she completes the lane change. Since the vehicle yaw rate has an approximately linear relationship with the steering angle in the linear region, it exhibits a similar pattern during a lane change. Mathematically, the vehicle heading direction is the integration of vehicle yaw rate. Therefore, its pattern is a little different. During the first half of the lane change when the steering wheel is turning to one direction, the heading angle increases in the same direction. During the second half of the lane-change maneuver, the steering wheel is turned to the other direction and the heading angle decreases back to approximately its initial position.

Theoretically, lane-change maneuvers can be detected based on vehicle yaw rate or steering angle because the heading angle can be computed from vehicle yaw rate or steering angle. However, the common in-vehicle steering angle sensors or yaw rate sensors usually have a sensor bias and noise that limit the accuracy of the lane-change detection. Therefore, vehicle heading angle is desired to be used together with the steering angle or yaw rate. It can be recognized that a lane change is a special type of a steering-engaged maneuver. To keep the integrity of the data associated with an identified maneuver, the system keeps recording and refreshing a certain period of data, such as T=2 s.

Figure 17:
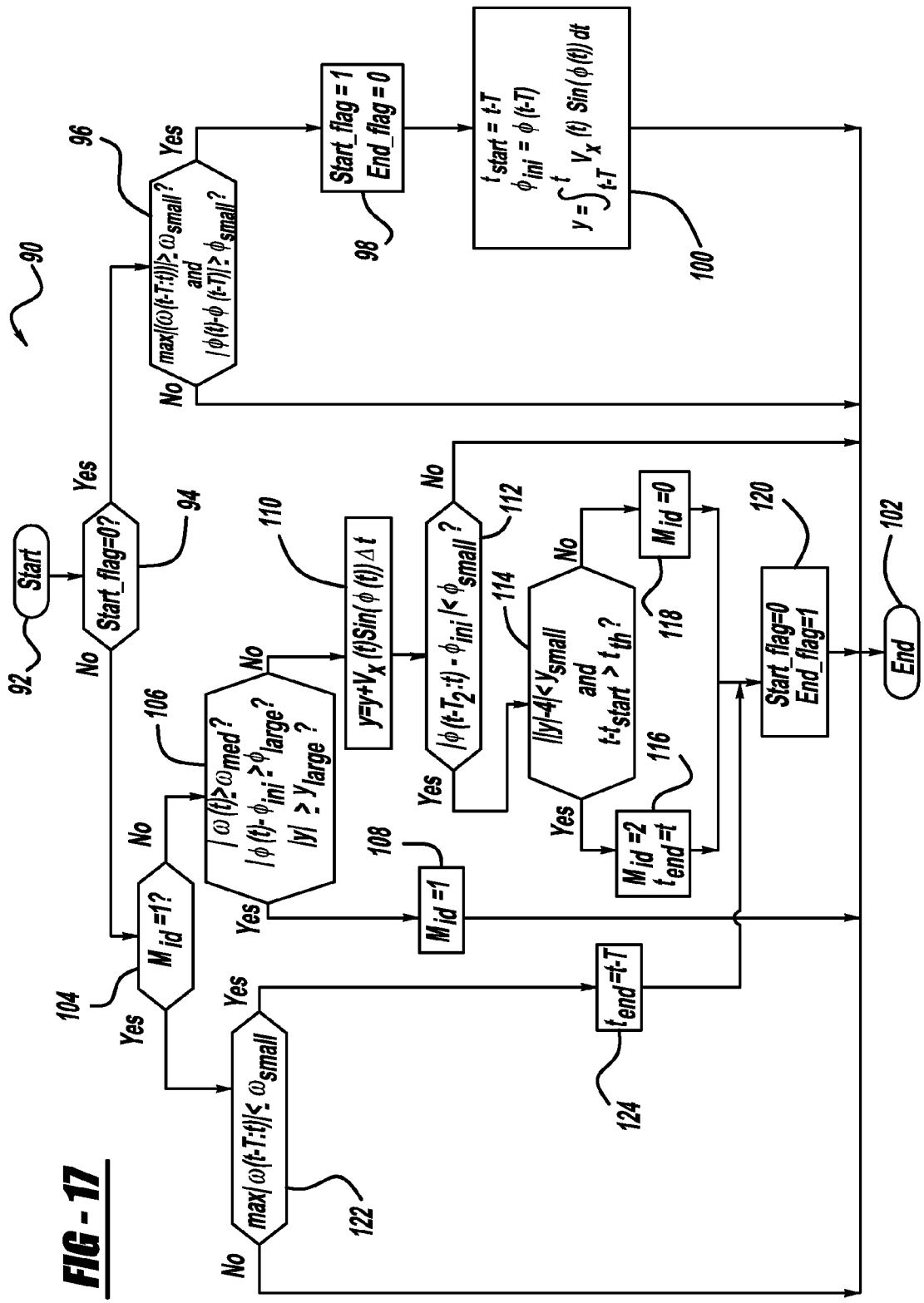
FIG. 17 is a flow chart diagram showing a process that can be used by the maneuver identification processor in the systems of FIGS. 2, 3 and 4 for detecting a lane-changing maneuver, according to an embodiment of the present invention.

FIG. 17 is a flow chart diagram 90 showing an operation of the maneuver identification processor 46 for detecting lane-change maneuvers, according to an embodiment of the present invention. At a start block 92, the maneuver identifying algorithm begins by reading the filtered vehicle speed signal v, the filtered vehicle yaw rate signal $\omega$ and the filtered vehicle heading angle $\Phi$ from the signal processor 44. The algorithm then proceeds according to its operation states denoted by two Boolean variables Start_flag and End_flag, where Start_flag is initialized to zero and End_flag is initialized to one. The algorithm then determines whether Start_flag is zero at block 94, and if so, the vehicle 10 is not in a steering-engaged maneuver. The algorithm then determines if any steering activities have been initiated based on certain conditions at block 96, particularly:

$$\max|\omega(t-T:t)| \geq \omega_{small} |\Phi(t-T)| \geq \Phi_{small} \quad (19)$$

If the conditions of the block 96 are met, the algorithm sets Start_flag to one and End_flag to zero at box 98. The algorithm then sets a starting time $t_{start}$ of the maneuver, and defines the initial heading angle $\Phi_{ini}$ and an initial lateral position y at box 100 as:

$$\Phi_{ini} = \Phi(t-T) \quad (20)$$

$$y = \int_{t-T}^{t} v_x(\tau) * \mathrm{Sin}(\Phi(\tau)) \, d\tau \quad (21)$$

If the conditions of the block 96 are not met, then the vehicle 10 is not involved in a steering-engaged maneuver and Start_flag remains zero, where the process ends at block 102.

The algorithm then returns to the start block 92. If Start_flag is one at the block 94, as set at the block 98, the vehicle 10 is now in a steering-engaged maneuver. If the vehicle 10 is in a steering-engaged maneuver, i.e., Start_Flag=1, the algorithm then determines whether the maneuver has been determined to be a curve-handling maneuver. To do this, the algorithm determines whether the maneuver identifier value $M_{id}$ is one at block 104. If the value $M_{id}$ is not one at the block 104, then the maneuver has not been determined to a curve-handling maneuver yet. The algorithm then determines if the maneuver is a curve-handling maneuver at block 106 by examining whether:

$$|\omega(t)| \geq \omega_{med} |y| \geq y_{large} |\Phi(t) - \Phi_{ini}| \geq \Phi_{large} \quad (22)$$

In one non-limiting embodiment, $\omega_{med}$ is $15°$ $\Phi_{large}$ is $45°$ and $y_{large}$ is 10 m.

If all of the conditions at block 106 are met, then the maneuver is a curve-handling maneuver and not a lane-changing maneuver. The algorithm then will set the maneuver identifier value $M_{id}$ equal to one at block 108 to indicate a curve-handling maneuver.

If all of the conditions are not met at the block 106, then the algorithm updates the vehicle lateral position y at block 110 as:

$$y = y + v_x(t) * \sin(\Phi(t)) * \Delta t \quad (23)$$

Where $\Delta t$ is the sampling time.

The algorithm then determines whether the maneuver is complete at block 112 by:

$$|\Phi(t-T_2:t) - \Phi_{ini}| < \Phi_{small} \quad (24)$$

Where if $T_2 \leq T$ the maneuver is regarded as being complete.

If the condition of block 112 is satisfied, then the algorithm determines whether the following condition is met at block 114:

$$||y|-4| < y_{small} \quad (25)$$

Where $y_{small}$ is 4 m in one non-limiting embodiment to allow an estimation error and $t-t_{start} > t_{th}$. If the condition of the block 114 is met, the maneuver is identified as a lane-change maneuver, where the value $M_{id}$ is set to two and the time is set to $t_{end}$ at box 116. Otherwise, the maneuver is discarded as a non-characteristic maneuver, and the value $M_{id}$ is set to zero at box 118. Start_flag is then set to zero and End_flag is set to one at box 120.

If the maneuver identifier value $M_{id}$ is one at the block 104, the maneuver has been identified as a curve-handling maneuver and not a lane-change maneuver. The algorithm then determines at box 122 whether:

$$\max|\omega(t-T:t)| \leq \omega_{small} \quad (26)$$

If this condition has been met, then the curve-handling maneuver has been completed, and the time is set to $t_{end}$ at box 124, Start_flag is set to zero and End_flag is set to one at the box 120. The process then returns to the start box 92.

It is noted that the maneuver identifier processor 46 may not detect some lane changes if the magnitude of the corresponding steering angle/yaw rate or heading angle is small, such as for some lane changes on highways. The missed detection of these types of lane changes will not degrade the lane-change based style characterization since they resemble straight-line driving.

As discussed herein, the present invention provides a technique utilizing sensor measurements to characterize a driver's driving style. Lane-change maneuvers involve both vehicle lateral motion and longitudinal motion. From the lateral motion point of view, the steering angle, yaw rate, lateral acceleration and lateral jerk can all reflect a drivers driving style. The values of those signals are likely to be larger for a sporty driver than those for a conservative driver. Similarly, from the perspective of longitudinal motion, the distance it takes to complete a lane change, the speed variation, the deceleration and acceleration, the distance the vehicle is to its preceding vehicle, and the distance the vehicle is to its following vehicle after a lane change also reflects the drivers driving style. These distances are likely to be smaller for a sporty driver than those for a conservative driver. Consequently, these sensor measurements can be used to classify driving style. However, those signals are not suitable to be used directly for classification for the following reasons. First, a typical lane change usually lasts more than five seconds. Therefore, the collected data samples usually amount to a considerable size. Data reduction is necessary in order to keep the classification efficient and economic. Second, the complete time trace of the signals is usually not effective for the classification because it usually degrades the classification performance because a large part of it does not represent the patterns and is simply noise. In fact, a critical design issue in classification problems is to derive/extract/select discriminant features, referred to as discriminants which best represent individual classes. As a result, the style characterization processor 52 includes two major parts, namely a feature processor and a style classifier, as discussed above.

The feature processor derives original features based on the collected data, extracts features from the original features, and then selects the final features from the extracted features. The main objective of deriving original features is to reduce the dimension of data input to the classifier and to derive a concise representation of the pattern for classification. With these original features, various feature extraction and feature selection techniques can be used so that the resulting features can best separate patterns of different classes. Various techniques can be used for feature extraction/selection and are well know to those skilled in the art. However, the derivation of original features typically relies on domain knowledge. The present invention derives the original features based on engineering insights. However, the discussion below of deriving the original features, or original discriminates, should not limit the invention as described herein.

The following original features/discriminants for classifying a lane-change maneuver are chosen based on engineering insights and can be, for example:

1. The maximum value of the yaw rate $\max(|\omega(t_{start}:t_{end})|)$;
2. The maximum value of the lateral acceleration $\max(|a_y(t_{start}:t_{end})|)$;
3. The maximum value of the lateral jerk $\max(|\dot{a}_y(t_{start}:t_{end})|)$;
4. The distance for the lane change to be completed $$\int_{t_{start}}^{t_{end}} v_x(t)\,dt;$$

5. The average speed $\text{mean}(v_x(t_{start}:t_{end}))$;
6. The maximum speed variation $\max(v_x(t_{start}:t_{end})) - \min(v_x(t_{start}:t_{end}))$;
7. The maximum braking pedal force/position (or the maximum deceleration);
8. The maximum throttle percentage (or the maximum acceleration);
9. The minimum distance (or headway time) to its preceding vehicle (e.g., from a forward-looking radar/lidar or camera, or from GPS with V2V communications);
10. The maximum range rate to its preceding vehicle if available (e.g., from a forward-looking radar/lidar or camera, or from GPS together with V2V communications); and
11. The minimum distance (or distance over speed) to the following vehicle at the lane the vehicle changes to, if it is available e.g., from a forward-looking radar/lidar or camera, or from GPS with V2V communications).

Variations of the discriminant features listed above may be known to those skilled in the art. Because the system 40 only has access to information related to the discriminants 1-10 identified above, the corresponding classifier uses only discriminants 1-10. Other embodiments, such as the systems 60 and 80, can use all of the discriminants.

Feature extraction and feature selection techniques can then be applied to the original features/discriminants to derive the final features/discriminates, which will be discussed in further detail below. One vector $X_i[x_{i1} x_{i2} \ldots x_{iN}]$ for the final discriminants can be formed corresponding to each lane-change maneuver where i represents the ith lane-change maneuver and N is the dimension of the final discriminants. This discriminate vector will be the input to the classifier. As mentioned before, various techniques can be used to design the classifier, for example, fuzzy C-means (FCM) clustering. In FMC-based classification, each class consists of a cluster. The basic idea of the FCM-based classification is to determine the class of a pattern, which is represented by a discriminant vector, based on its distance to each pre-determined cluster center. Therefore, the classifier first calculates the distances:

$$D_{ik} = \|X_i - V_k\|_A^2 = (X_i - V_k)A(X_i - V_k)^T, 1 \leq k \leq C \quad (27)$$

Where Vk is the center vector of cluster k, A is an N×N matrix that accounts for the shape of the pre-determined clusters, C is the total number of pre-determined clusters, such as C=3~5 representing the different levels of sporty driving. The cluster centers Vk and the matrix A are determined during the design phase.

Based on the distances, the algorithm further determines the membership degree of the curved discriminant vector as:

$$\mu_{ik} = \frac{1}{\sum_{j=1}^{C}(D_{ik}/D_{ij})^{2/(m-1)}}, \ 1 \leq k \leq C \quad (28)$$

Where m is a weighting index that is two in one non-limiting embodiment.

The corresponding lane-change maneuvers are classified as class j if:

$$\mu_{ij} = \max(\mu_{ik})(1 \leq k \leq C) \quad (29)$$

Alternatively, the classifier can simply use a hard partition and classify the corresponding lane-change maneuver as the class that yields the smallest distance, such as:

$$\begin{cases} \mu_{ij} = 1, & \text{if } D_{ij} = \min(D_{ik}, 1 \leq k \leq C) \\ \mu_{ij} = 0, & \text{if } D_{ij} > \min(D_{ik}, 1 \leq k \leq C) \end{cases} \quad (30)$$

For the style characterization processor 52 to operate properly, the cluster center Vx and the matrix A need to be predetermined. This can be achieved during the design phase based on vehicle test data with a number of drivers driving under various traffic and road conditions. The lane changes of each participating driver can be recognized as described in the maneuver identifier processor 46 and the corresponding data can be recorded by the data selection processor 48. For each lane change, the discriminant vector $X_i=[x_{i1}\ x_{i2} \ldots x_{iN}]$ can be derived.

Combining all of the discriminant vectors into a discriminant matrix X gives:

$$X = \begin{bmatrix} x_{11} & x_{12} & \cdots & x_{1N} \\ x_{21} & x_{22} & \cdots & x_{21} \\ \vdots & \vdots & \ddots & \vdots \\ x_{M1} & x_{M2} & \cdots & x_{MN} \end{bmatrix} \quad (31)$$

The matrix A can be an N×N matrix that accounts for difference variances in the direction of the coordinate axes of X as:

$$A = \begin{bmatrix} (1/\sigma_1)^2 & 0 & \cdots & 0 \\ 0 & (1/\sigma_2)^2 & \cdots & 0 \\ \vdots & \vdots & \ddots & \vdots \\ 0 & 0 & \cdots & (1/\sigma_N)^2 \end{bmatrix} \quad (32)$$

The cluster center can be determined by minimizing an objective function referred to as C-means functional as:

$$J(X; U, V) = \sum_{k=1}^{c} \sum_{i=1}^{M} (\mu_{ik})^m \|X_i - V_k\|_A^2 \quad (33)$$

The minimization of such a function is well known, and need not be described in further detail herein. It is noted that although fuzzy clustering is used as the classification technique in this embodiment for classifying the lane-change maneuver, the present invention can easily employ other techniques, such as fuzzy logic, neural networks, SOM, or threshold-based logic.

The maneuver identification processor 46 can identify other types of characteristic maneuvers. According to another embodiment of the present invention, the maneuver identification processor 46 identifies left/right-turn maneuvers, which refer to maneuvers where a vehicle turns from one road to another that is approximately perpendicular. Left/right-turns usually occur at intersections and a vehicle may or may not be fully stopped depending on the intersection traffic. Left/right-turn maneuvers can be identified based on the drivers steering activity and the corresponding change in vehicle heading direction.

Figure 18:
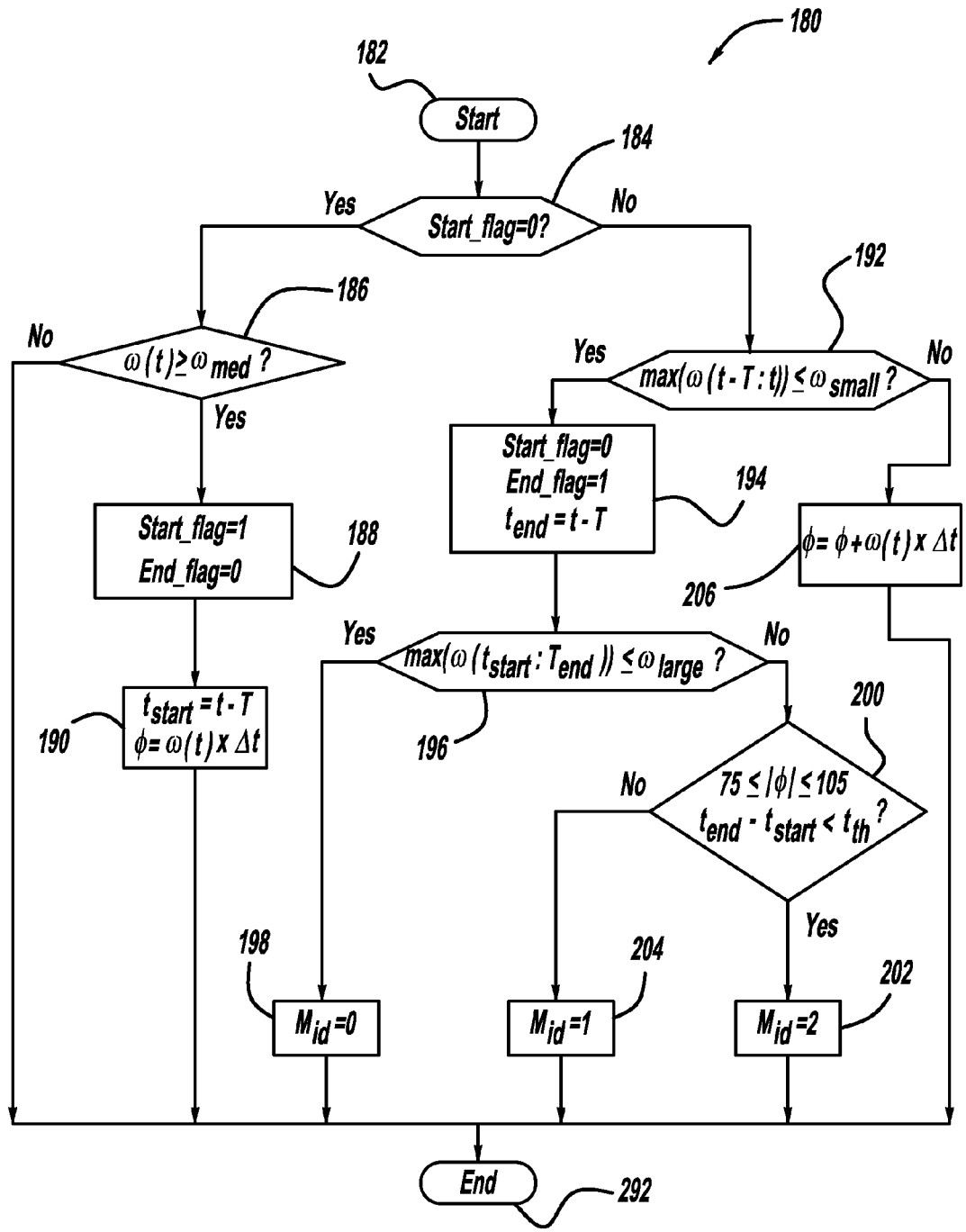
FIG. 18 is a flow chart diagram showing a process that can be used by the maneuver identification processor in the systems of FIGS. 2, 3 and 4 for identifying a left/right turn maneuver, according to an embodiment of the present invention.

FIG. 18 is a flow chart diagram 180 showing a process performed by the maneuver identification processor algorithm to identify a left/right-turn maneuver. In this non-limiting example, left/right-turns are regarded as a special type of steering-engaged maneuvers where left/right-turns are accompanied with a relatively large maximum yaw rate or steering angle and an approximately 90° change in vehicle heading direction. To keep the integrity of the data associated with the maneuver, the system keeps recording and refreshing at a certain period, for example, T=2 s, of data.

In FIG. 18, the maneuver identifier algorithm begins with reading the filtered vehicle speed signal v and the filtered yaw rate signal ω from the signal processor 44 at block 182. The algorithm then proceeds according to its operation states denoted by the two Boolean variables Start_flag and End_flag, where Start_flag is initialized to zero and End-flag is initialized to one. If Start_flag is zero, then the vehicle 10 is not performing a steering-engaged maneuver. The algorithm determines whether Start_flag is zero at block 84 and, if so, determines whether $\omega(t) \geq \omega_{med}$ at decision diamond 186, where $\omega_{med}$ is 2° per second in one non-limiting embodiment. If this condition is met, then the vehicle 10 is likely entering a curve or starting a turn, so Start_flag is set to one and End_flag is set to zero at box 188. The algorithm then sets timer $t_{start}=t-T$, and computes the heading angle $\Phi=\omega((t)\times\Delta t)$ at box 190, where $\Delta t$ is the sampling time.

If Start_flag is not zero at the block 184 meaning that the vehicle 10 is in a steering-engaged maneuver, the algorithm then determines whether the maneuver has been completed. Upon completion of the steering-engaged maneuver, the algorithm determines whether the steering-engaged maneuver was a left/right-turn or a curve-handling maneuver at block 192 by determining whether $\max(\omega(t-T:t)) \leq \omega_{small}$, where $\omega_{small}$ is 1° in one non-limiting embodiment. If this condition has been met, the steering-engaged maneuver has been completed, so the algorithm sets Start_flag to zero, End_flag to one and time $t_{end}=t-T$ at box 194.

The algorithm then determines whether $\max(|\omega(t_{start}:t_{end})|) \geq \omega_{large}$ at block 196 and, if not, sets the identifier value $M_{id}$ to zero at box 198 because the yaw rate is too small indicating either the curve is too mild or the vehicle 10 is turning very slowly. Thus, the corresponding data may not reveal much of a driving style, so the data is discarded. In one non-limiting embodiment, $\omega_{large}$ is 7° per second. If the condition of the block 196 is met, meaning that the curve is significant enough, the algorithm determines whether $75° \leq |\Phi| \leq 105°$ and determines whether time $t_{end}-t_{start} < t_{th}$ at the decision diamond 200. In one non-limiting embodiment, time threshold $t_{th}$ is 15 seconds. If both of these conditions are met, then the algorithm determines that a left/right-turn has been made and sets the maneuver value $M_{id}$ to 2 at box 202.

If either of these conditions has not been met at the decision diamond 200, then the algorithm determines that the maneuver is a curve-handling maneuver and not a left/right-turn maneuver, and thus sets the maneuver value $M_{id}$ to 1 at box 204 indicating the curve-handling maneuver.

If the condition of block 192 has not been met, the vehicle 10 is still in the middle of a relatively large yaw motion or turn, and thus, the algorithm updates the heading angle at box 206 as $\Phi=\Phi+\omega(t)\times\Delta t$. As the maneuver identification processor 46 determines the beginning and end of the maneuver, the data selection processor 48 stores the corresponding data segment based on the variables Start_flag, End_flag, $t_{start}$ and $t_{end}$.

The style classification consists of two processing steps, namely feature processing that derives discriminant features based on the collected data and classification that determines the driving style based on the discriminants. The first step, feature processing, reduces the dimension of the data so as to keep the classifier efficient and the computation economic. Feature processing is also critical because the effectiveness of the classification depends heavily on the selection of the right discriminants. These discriminants are then used as the input to the classifier. Various classification techniques, such as fuzzy logic, neural networks, self-organizing maps, and simple threshold-based logic can be used for the style classification. The discriminants are chosen based on engineering insights and decision tree based classifiers are designed for the classification.

In this embodiment for classifying a left/right-turn maneuver, the style characterization processor 52 receives the maneuver value $M_{id}$ as two from the maneuver identification processor 46 and the style classification processor 52 selects the corresponding process classification to process this information. As above, the style characterization processor 52 includes two processing steps. The left/right-turn maneuver involves both lateral motion and longitudinal motion. The lateral motion is generally represented by the steering angle, the yaw rate and the lateral acceleration. Typically, the sportier a driver is, the larger these three signals are. The longitudinal motion is usually associated with the throttle and braking inputs and the longitudinal acceleration. Similarly, the sportier the driver is, the larger these three signals can be. Therefore, all six signals can be used for style classification. Accordingly, the following original features/discriminants can be chosen for classifying a left/right-turn maneuver:

1. The maximum lateral acceleration $a_{y\ max} = \max(a_y(t_{start}:t_{end}))$;
2. The maximum yaw rate $\omega_{max} = \max(\omega(t_{start}:t_{end}))$;
3. The maximum longitudinal acceleration $a_{x\ max} = \max(a_x(t_{start}:t_{end}))$;
4. The maximum throttle opening $Throttle_{max} = \max(Throttle(t_{start}:t_{end}))$; and
5. The speed at the end of the turn $v_x(t_{end})$.

If the vehicle 10 starts turning without stopping fully (min$(v_x(t_{start}:t_{end}))$)<2 m/s, the maximum braking force/position $Braking_{max} = \max(Braking(t_{start}:t_{end}))$ and the minimum speed $\min(v_x(t_{start}:t_{end}))$ during the turn are included as the original features/discriminants.

For simplicity, the feature extraction and feature selection processes can be removed and the original features can be used directly as the final features/discriminates. These discriminants can be input to a decision tree for style classification by the processor 52. Decision trees are classifiers that partition the feature data on one feature at a time. A decision tree comprises many nodes connected by branches where nodes that are at the end of branches are called leaf nodes. Each node with branches contains a partition rule based on one discriminant and each leaf represents the sub-region corresponding to one class. The feature data representing the left/right turns used for classification is labeled according to the leaves it reaches through the decision tree. Therefore, decision tress can be seen as a hierarchical way to partition the feature data.

Figure 19:
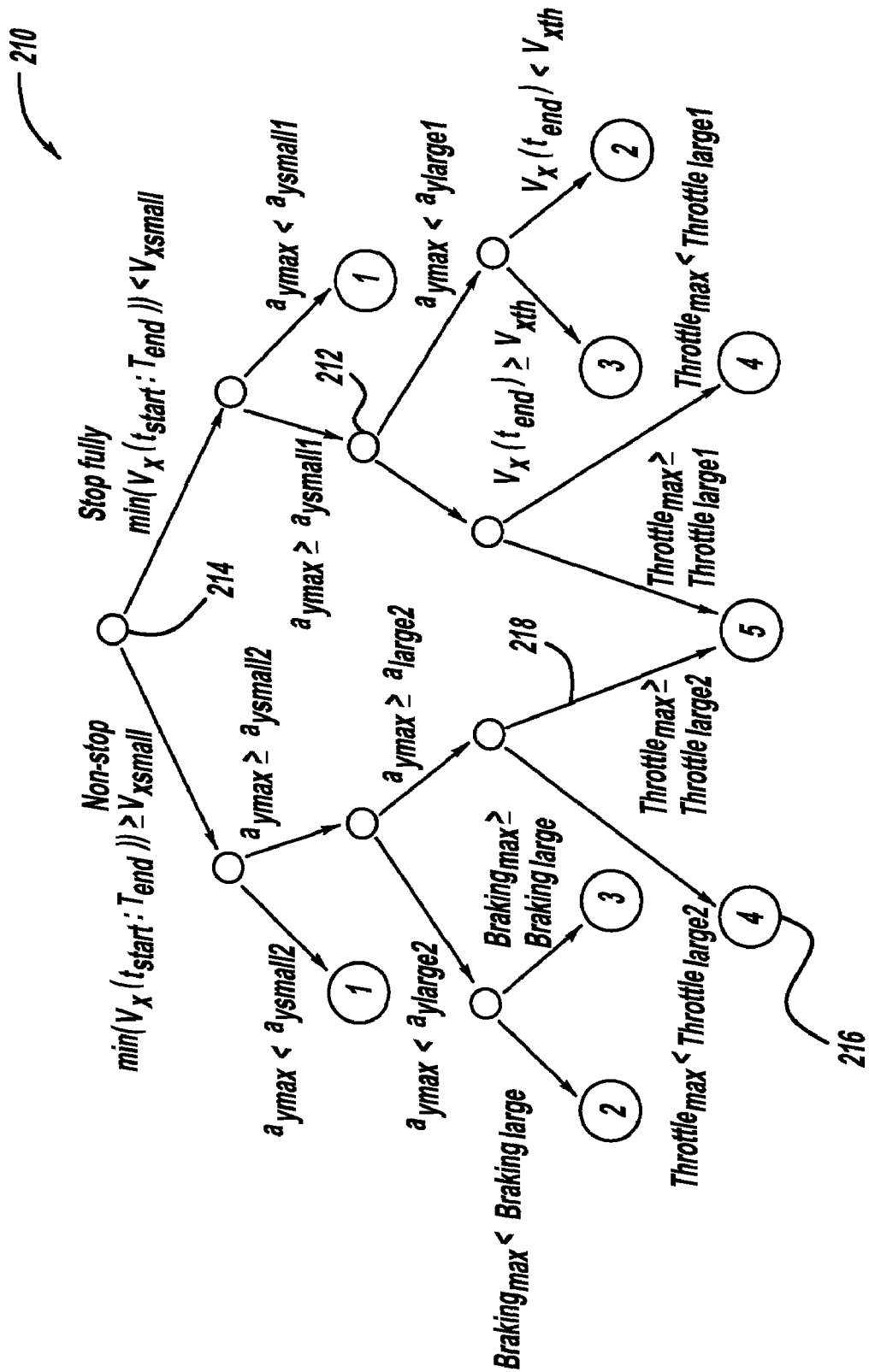
FIG. 19 is a diagram of a classification decision tree that can be used by the style characterization processor in the systems of FIGS. 2, 3 and 4, according to an embodiment of the present invention.

FIG. 19 shows a classification decision tree 210 including nodes 212. A root node 214 of the tree has two branches, one for turns from a stop and the other for turns without a stop. For turns from a stop, the subsequent nodes employ the following partition rules $a_{ymax} < a_{ysmall1}, a_{ymax} \geq a_{ylarge1}$, $Throttle_{max} \geq Throttle_{large1}$ and $a_{ymax} \geq a_{ylarge2}$, and for turns without a full stop, the partition rules are $a_{ymax} < a_{ysmall2}$, $a_{ymax} \geq a_{ylarge2}$, $Throttle_{max} \geq Throttle_{large2}$ and $Braking_{max} \geq Braking_{large}$. The leaf nodes 216 at the end of the branches 218 represent five driving classes labeled from 1 to 5 in the order of increasing driving aggressiveness. Note that all of the discriminants mentioned in the feature extraction are used in the exemplary decision tree 210. Further, the decision tree can be expanded to include more discriminants.

The thresholds in the partition rules are predetermined based on vehicle test data with a number of drivers driving under various traffic and road conditions. The design and tuning of decision-tree based classifiers are well-known to those skilled in the art and further details need not be provided for a proper understanding. It is noted that although the decision tree is used as the classification technique for classifying a left/right-turn maneuver, the present invention can easily employ other techniques, such as fuzzy logic, clustering and threshold-based logic to provide the classification.

According to another embodiment of the present invention, the maneuver identification processor 46 identifies a U-turn maneuver. A U-turn maneuver refers to performing a 180° rotation in order to reverse direction of traffic. According to the traffic or geometric design, U-turn maneuvers can be roughly divided into three types, namely, a U-turn from a near-zero speed, continuous U-turns at the end of straight-line driving and interrupted U-turns at the end of straight-line driving. The first type usually happens at intersections where U-turns are allowed. The vehicle first stops at the intersection and then conducts a continuous U-turn to reverse direction. Because the vehicle starts from a near-zero speed and the U-turn is a rather tight maneuver, such a U-turn may not be affective in providing a driver's driving style.

The second type usually occurs when there is no traffic sign and the opposite lane is available. This type of U-turn can reveal a drivers driving style through the drivers braking control and the vehicle deceleration right before the U-turn and the vehicle yaw and lateral acceleration during the U-turn. To perform a U-turn of the third type, the vehicle would turn about 90° and then wait until the opposite lanes become available to continue the U-turn.

The third type of U-turn may or may not be useful in reviewing the drivers driving style depending on the associated traffic scenarios. For example, if the opposite traffic is busy, the vehicle may need to wait in line and move slowly during the large portion of the U-turn. In such situations, even a sporty driver will be constrained to drive conservatively.

The present invention focuses mainly on the second type of U-turn, i.e., a continuous U-turn at the end of straight-line driving. However, similar methodologies can be easily applied to the other types of U-turns for the style characterization. A U-turn maneuver can be identified based on the drivers steering activity in the corresponding change in the vehicle heading direction.

An example of the recognition of a vehicle U-turn maneuvers, together with recognition of curve-handling maneuvers can also be provided by the flow chart diagram 180. In this example, the U-urn maneuver is regarded as a special type of left/right-turn maneuver where the U-turn is accompanied with a relatively large maximum yaw rate or steering angle and an approximately 180° change in the vehicle heading direction. To keep the integrity of the data associated with an identified maneuver, the system keeps recording and refreshing a certain period, for example, T=2 s, of data.

As with the left/right-turn maneuver discussed above, the maneuver value $M_{id}=0$ represents a non-characteristic maneuver that will not be used for style characterization, $M_{id}=1$ is for a curve-handling maneuver and $M_{id}=2$ is for a U-urn maneuver. Instead of the range of 75°-105° for the heading angle Φ for the left/right-urn maneuver at decision diamond 200, it is determined whether the heading angle Φ is between 165° and 195° for the U-turn maneuver.

As discussed above, the style characterization processor 52 receives the maneuver identifier value $M_{id}$ from the processor 46. A U-turn maneuver involves both lateral motion and the longitudinal motion. The lateral motion is generally represented by the steering angle, the yaw rate and the lateral acceleration. Typically, the sportier the driver is, the larger these three signals can be. The longitudinal motion is usually associated with throttle and braking inputs and the longitudinal acceleration. Similarly, the sportier the driver, the larger these signals typically are. Therefore, all six signals can be used for style characterization in the processor 52.

The collected data is typically not suitable to be used directly for style characterization because the collected data consist of the time trace of those signals, which usually results in a fair amount of data. For example, a typical U-turn maneuver lasts more than five seconds. Therefore, with a 10 Hz sampling rate, more than 50 samples of each signal would be recorded. Therefore, data reduction is necessary in order to keep the classification efficient. Also, the complete time trace of those signals is usually not effective for the characterization. In fact, a critical design issue in classification problems is to derive/extract/select discriminative features that best represent individual classes.

Thus, the style characterization processor 52 includes a feature processor and a style classifier. As mention above, the feature processor derives original features based on the collected data, extracts features from the original features and then selects the final features from the extracted features. Feature extraction tries to create new features based on transformations or combinations of the original features and the feature selection selects the best subset of the new features derived through feature extraction. The original features are usually derived using various techniques, such as time-series analysis and frequency-domain analysis. These techniques are well-known to those skilled in the art. The present invention describes a straight forward way to derive the original discriminant features based on engineering insights.

For the six signals referred to above, the original discriminants for classifying a U-turn maneuver can be chosen as:
1. The maximum lateral acceleration $a_{y\,max}=\max(a_y(t_{start}:t_{end}))$;
2. The maximum yaw rate $\omega_{max}=\max(\omega(t_{start}:t_{end}))$;
3. The speed at the beginning of the U-turn $v_x(t_{start})$;
4. The minimum speed during the U-turn $v_{x\,min}=\min(v_x(t_{start}:t_{end}))$;
5. The speed at the end of the U-turn $v_x(t_{end})$;
6. The maximum braking force/position $Braking_{max}=\max(Braking(t_{start}:t_{end}))$;
7. An array of braking index $BI_{braking}=[BI_1 \ldots BI_i \ldots BI_N]$ based on the distribution of the brake pedal position/force;
8. The maximum longitudinal acceleration $a_{x\,max}=\max(a_x(t_{start}:t_{end}))$;
9. The maximum throttle opening $Throttle_{max}=\max(Throttle(t_{start}:t_{end}))$; and
10. An array of throttle index $TI_{throttle}=[TI_1 \ldots TI_i \ldots TI_N]$, based on the distribution of the throttle opening.

Each braking index $BI_i$ is defined as the percentage of the time when the braking pedal position/force is greater than a threshold $B_{thi}$. That is, if the U-turn maneuver takes time $T_{total}$ seconds and during that period of time the braking pedal position/force is greater than $B_{thi}$ for $T_i$ seconds, then the braking index $BI_i=T_i/T_{total}$. Alternatively, the time $T_{total}$ can be defined as a time when the braking is greater than the braking threshold ($Braking>B_{th}$), where the threshold $B_{th}$ is smaller than the threshold $B_{thi}$. Similarly, each throttle index $TI_i$ is defined as the percentage of the time when the throttle opening $\alpha$ is greater than a threshold $a_{thi}$. Suitable examples of the threshold $a_{thi}$ can be 20%, 30%, 40%, 50% and 60% or from 10% to 90% with a 10% interval in-between. In summary, the total number of discriminants for a U-turn maneuver can be n=8+2N or more if additional discriminants, such as traffic and road indexes, are included.

For each recognized vehicle U-turn maneuver, one set of the original features is derived. This set of original features can be represented as an original feature vector x, an n-dimension vector with each dimension representing one specific feature. This original feature vector serves as the input for further feature extraction and feature selection processing. Feature extraction tries to create new features based on transformations or combination of the original features (discriminants), while feature selection selects the best subset of the new features derived through feature extraction.

Various feature extraction methods can be used for classifying a U-turn maneuver, such as Principle Component Analysis (PCA), Linear Discriminant Analysis (LDA), Kernel PCA, Generalized Discriminant Analysis (GDA), etc. In one non-limiting embodiment, LDA is used, which is a linear transformation where $y=U^T x$, and where U is an n-by-n matrix and y is an n-by-1 vector with each row representing the value of the new feature. The matrix U is determined off-line during the design phase. Note that the LDA transformation does not reduce the dimension of the features.

To further reduce the feature dimension for improved classification efficiency and effectiveness, various feature selection techniques, such as Exhaustive Search, Branch-and-Bound Search, Sequential Forward/Backward Selection and Sequential Forward/Backward Floating Search, can be used. The subset that yields the best performance is chosen as the final features to be used for classification. For example, the resulting subset may consist of m features corresponding to the $\{i_1\, i_2\, \ldots\, i_m\}(1 \leq i_1 \leq i_2 \leq \ldots \leq i_m \leq n)$ row of the feature vector y. By writing the matrix U as $u=[u_1 u_2 \ldots u_n]$ with each vector being an n-by-1 vector, and then selecting only the vectors corresponding to the best subset, yields $W=[u_{i1}\, u_{i2} \ldots u_{im}]$, an M-by-N matrix. Combining the feature extraction and feature selection, the final features corresponding to the original feature vector x can be derived as $z=W^T x$.

The style characterization processor 52 then classifies the driver's driving style for the U-turn maneuver based on the discriminant feature vector z. Classification techniques, such as fuzzy logic, clustering, neural networks (NN), support vector machines (SVM), and simple threshold-based logic can be used for style classification. In one embodiment, an SVM-based classifier is used. The standard SVM is a two-class classifier, which tries to find an optimal hyperplane, i.e., the so-called decision function, that correctly classifies training patterns as much as possible and maximizes the width of the margin between the classes. Because the style classification involves more than two classes, a multi-class SVM can be employed to design the classifier. A K-class SVM consists of K hyper-planes: $f_k(z)=w_k z+b_k$, k=1,2, ... ,k where $w_k$ and $b_k$ are determined during the design phase based on the test data. The class label c for any testing data is the class whose decision function yields the largest output as:

$$c = \underset{k}{\mathrm{argmax}}\, fx(z) = \underset{k}{\mathrm{argmax}}\,(w_k z + b_k), \quad (34)$$
$$k = 1, 2, \ldots, K$$

The feature extraction, feature selection and the K-class SVM are designed off-line based on vehicle test data. A number of drivers were asked to drive several instrumented vehicles under various traffic conditions and the sensor measurements were collected for the classification design. For every vehicle U-turn maneuver, an original vector x can be constructed. All of the feature vectors corresponding to vehicle U-turn maneuvers are put together to form a training matrix $X=[y_1\, y_2 \ldots y_L]$, where L is the total number of vehicle U-turn maneuvers. Each row of the matrix X represents the values of one feature variable while each column represents the feature vector of a training pattern. The training matrix X is then used for the design of the style classification based on vehicle U-turn maneuvers.

The feature extraction is based on LDA, a supervised feature extraction technique. Its goal is to train the linear data projection $Y=U^T X$ such that the ratio of the between-class variance to the within-class variance is maximized, where X is an n-by-L matrix and U is an n-by-n matrix. Accordingly, $Y=[y_1\ y_2\ \ldots\ y_L]$ is an n-by-L matrix, where the new feature vector $y_i$ still consists of n features. Commercial or open-source algorithms that compute the matrix U are available and well-known to those skilled in the art. The inputs to those algorithms include the training matrix X and the corresponding class labels. In one embodiment, the class labels can be 1-5 with 1 indicating a conservative driver, 3 indicating a typical driver and 5 being a sporty driver. In addition, a class label 0 can be added to represent those hard-to-decide patterns. The class labels are determined based on expert opinions by observing the test data. The outputs of the LDA algorithms include the matrix U and the new feature matrix Y.

The feature selection is conducted on the feature matrix Y. In this particular application, because the dimension of the extracted features is relatively small, an Exhaustive Search can be used to evaluate the classification performance of each possibly combination of the extracted features. The new features still consist of n features, and there are $\Sigma_{i-1}{}^n C^i_n$ possible combinations of the n features. The Exhaust Search evaluates the classification performance of each possible combination by designing an SVM based on the combination and deriving the corresponding classification error. The combination that yields the smallest classification error is regarded as the best combination where the corresponding features $\{i_1\ i_2\ \ldots\ i_m\}$ determine the matrix $[u_{i1}\ u_{i2}\ \ldots\ u_{im}]$. Conveniently, the SVM corresponding to the best feature combination is the SVM classifier. Since commercial or open-source algorithms for SVM designs are well-known to those skilled in the art, a detailed discussion is not necessary herein.

It is noted that although SVM is used as the classification technique in this embodiment, the present invention can easily employ other techniques, such as fuzzy logic, clustering or simple threshold-based logics for classifying U-turn maneuvers. Similarly, other feature extraction and feature selection techniques can be easily employed instead of the LDA and Exhaustive Search.

According to another embodiment of the present invention, the maneuver identification processor 46 identifies a vehicle passing maneuver. At the beginning of a vehicle passing maneuver, the subject vehicle (SV), or passing vehicle, approaches and follows a slower preceding object vehicle (OV), which later becomes the vehicle being passed. If the driver of the SV decides to pass the slower OV and an adjacent lane is available for passing, the driver initiates the first lane change to the adjacent lane and then passes the OV in the adjacent lane. If there is enough clearance between the SV and the OV, the driver of the SV may initiate a second lane change back to the original lane. Because the style characterization based on vehicle headway control behavior already includes the vehicle approaching maneuver, the vehicle approaching before the first lane change is not included as part of the passing maneuver. As a result, the passing maneuver starts with the first lane change and ends with the completion of the second lane change. Accordingly, a passing maneuver can be divided into three phases, namely, phase one consists of the first lane change to an adjacent lane, phase two is passing in the adjacent lane and phase three is the second lane change back to the original lane. In some cases, the second phase may be too short to be regarded as an independent phase, and in other cases, the second phase may last so long that it may be more appropriate to regard the passing maneuver as two independent lane changes. This embodiment focuses on those passing maneuvers where a second phase is not too long, such as less than $T_{th}$ seconds.

The detection of a passing maneuver then starts with the detection of a first lane change. The lane changes can be detected using vehicle steering angle or yaw rate together with vehicle heading angle from GPS as described above for the embodiment identifying lane-change maneuvers. Alternatively, a lane change can be detected based on image processing from a forward-looking camera, well-known to those skilled in the art.

The end of the first lane change is the start of the second phase, i.e., passing in the adjacent lane. The second phase ends when a second lane change is detected. If the SV changes back to its original lane within a certain time period, such as $T_{th}$ seconds, the complete maneuver including all three of the phases is regarded as a vehicle passing maneuver. If the SV changes to a lane other than its original lane, the complete maneuver may be divided and marked as individual lane-change maneuvers for the first and third phases. If a certain time passes and the SV does not initiate a second lane change, the maneuver is regarded as uncompleted, however, the first phase may still be used as an individual lane-change maneuver.

Based on the discussion above, FIG. 20 is a flow chart diagram 220 showing a process for identifying a vehicle passing maneuver, according to an embodiment of the present invention. To keep the integrity of the data associated with an identified maneuver, the system keeps recording and refreshing at a certain period, such as T=2 s, of data.

The maneuver identifying algorithm begins with reading the filtered vehicle speed signal v and the filtered vehicle yaw rate signal ω from the signal processor 44 at box 222. The maneuver identifying algorithm then proceeds using the Boolean variables Start_flag and End_flag, where Start_flag is initialized to zero and End_flag is initialized to one. The algorithm then determines whether Start_flag is zero at block 224 to determine whether the vehicle 10 is in a passing maneuver. If Start_flag is zero at the block 224, then the algorithm determines whether a lane change has started at decision diamond 226 to determine whether the passing maneuver has started, and if not, returns at box 228 for collecting data. If the algorithm determines that a lane change has started at the decision diamond 226, which may be the first lane change in a passing maneuver, the algorithm sets Start_flag to one, End_flag to zero, the phase to one and timer $T_{start}$=t at box 470.

If Start_flag is not zero at the block 224 meaning that the maneuver has begun, then the algorithm determines whether the maneuver is in the first phase at decision diamond 472. If the maneuver is in the first passing phase at the decision diamond 472, then the algorithm determines whether a lane change has been aborted at block 474. If the lane change has not been aborted at the block 474, the algorithm determines whether the lane change has been completed at block 476, and if not returns to the block 228 for collecting data. If the lane change has been completed at the block 476, the algorithm sets the phase to two, the time $t_{1end}$=t and the time $t_{2start}$=t+Δt at box 478. If the lane change has been aborted at the block 474, meaning that the passing maneuver has been aborted, then the algorithm sets the maneuver identifier value $M_{id}$ to zero at box 480, and sets Start_flag to zero, End_flag to one and the phase to zero at box 482.

If the passing maneuver is not in the first phase at the decision diamond 472, then the algorithm determines whether the passing maneuver is in the second phase at decision diamond 484. If the passing maneuver is not in the second phase at the decision diamond 484, the passing maneuver is already in its third phase, i.e., the lane change back to the original lane. Therefore, the algorithm determines whether this lane change has been aborted at the decision diamond 486, and if so, sets the maneuver identifier value $M_{id}$ to zero at the box 480, and Start_flag to zero, End_flag to one and phase to zero at the box 482.

If the lane change back has not been aborted at the decision diamond 486, the algorithm determines whether the lane change has been completed at decision diamond 488, and if not, returns to box 228 for collecting data. If the lane change has been completed at the decision diamond 488, the algorithm sets the maneuver identifier value $M_{id}$ to one, time $t_{3end}=t$, time $t_{start}=t_{1start}$ and time $t_{end}=t_{3end}$ at box 490, and sets Start_flag to zero, End_flag to one and the phase to zero at the box 482.

If the passing maneuver is in the second phase at the decision diamond 44, the algorithm determines whether there has been a lane change back to the original lane at decision diamond 492, and if so, sets the passing maneuver phase to three, time $t_{2end}=t$ and time $t_{3start}=t+\Delta t$ at box 494. If a lane change back has not started at the decision diamond 492, then the algorithm determines whether the condition time $t-t_{2start}>T_{th}$ has been met at decision diamond 496, and if not, returns to the box 228. If the condition of the decision diamond 492 has been met, then too much time has passed for a passing maneuver, and the algorithm sets the maneuver identifier value $M_{id}$ to zero at box 498, and sets Start_flag to zero, End_flag to one and the phase to zero at the box 482.

As the maneuver identifier value $M_{id}$ determines the beginning and the end of a maneuver, the data selector 48 stores that data corresponding to the maneuver based on the variables Start_flag, End_flag, $M_{id}$, $t_{start}$ and $t_{end}$. When the maneuver identifier value $M_{id}$ is set for a vehicle passing maneuver, the data collected is sent to the style characterization processor 52, and the driver's driving style for that maneuver is classified. The first and third phases of a vehicle passing maneuver are lane changes. During a lane change, the sportier driver is more likely to exhibit larger values in vehicle steering angle, yaw rate, lateral acceleration and lateral jerk. Similarly, from the perspective of a longitudinal motion, a sportier driver usually completes a lane change in a shorter distance and exhibits a larger speed variation and deceleration/acceleration, a shorter distance to its preceding vehicle before the lane change, and a shorter distance to the following vehicle after the lane change. The second phase of a vehicle passing maneuver, passing in the adjacent lane, involves mostly longitudinal control. A driver's driving style can be revealed by how fast he/she accelerates, the distance the vehicle traveled during the second phase or the time duration, and the speed difference between the subject vehicle and the object vehicle.

Accordingly, a number of discriminants for classifying a passing maneuver can be selected based on this information. For the first phase, i.e., the first lane change, the original discriminant features can be defined as:

1. The maximum value of the yaw rate: $\max(|w(t_{1start}:t_{1end})|)$;
2. The maximum value of lateral acceleration $\max(|a_y(t_{1start}:t_{1end})|)$;
3. The maximum value of lateral jerk $\max(|\dot{a}_y(t_{1start}:t_{1end})|)$;
4. The distance for the lane change to be completed $\int_{t_{1start}}^{t_{1end}} v_x(t)dt$;
5. The average speed $\text{mean}(|v_x(t_{1start}:t_{1end})|)$;
6. The maximum speed variation $\max(|v_x(t_{1start}:t_{1end})|)-\min(|v_x(t_{1start}:t_{1end})|)$;
7. The maximum braking pedal force/position (or the maximum deceleration);
8. The maximum throttle percentage (or the maximum acceleration);
9. The minimum distance (or headway time) to its preceding vehicle, i.e., from a forward-looking radar/lidar or camera, or from GPS together with V2V communications;
10. The maximum range rate to its preceding vehicle if available, i.e., from a forward-looking radar/lidar or camera, or from GPS together with V2V communications; and
11. The minimum distance (or distance over speed) to the following vehicle at the lane the vehicle changes to, if it is available, i.e., from side radar/camera, or GPS with V2V communications.

For the second phase, the original discriminant features can be:

1. The maximum throttle percentage $\max(|\text{throttle}(t_{2start}:t_{2end})|)$ (or longitudinal acceleration $\max(|a_x(t_{2start}:t_{2end})|)$;
2. The average throttle percentage;
3. The distance traveled $$\int_{t_{2start}}^{t_{2end}} v_x(t)d\tau; \text{ and}$$

4. The maximum speed variation $\max(|v_x(t_{2start}:t_{2end})|)-\min(|v_x(t_{2start}:t_{2end})|)$.

For the third phase, i.e., the second lane change, the original features are similar to those for the first phase with $t_{1start}$ and $t_{1end}$ replaced with $t_{3start}$ and $t_{3end}$. In addition, the total distance the subject vehicle traveled during a passing maneuver can also be added as a discriminant. In summary, the total number of discriminants for one passing maneuver can be n=10+4+10+1=25 or n=11+4+11+1=27 if the distance to the following vehicle is available.

For each recognized vehicle passing maneuver, one set of the original features is derived. This set of original features can be represented as an original feature vector x, an n-dimension vector with each dimension representing one specific feature. This original feature vector serves as the input for further feature extraction and feature selection processing.

As mentioned above, various feature extraction methods can be used for classifying a passing maneuver, such as Principle Component Analysis (PCA), Linear Discriminant Analysis (LDA), Kernel PCA, Generalized Discriminant Analysis (GDA), etc. In one non-limiting embodiment, LDA is used, which is a linear transformation where $y=U^T x$, and where U is an n-by-n matrix and y is an n-by-1 vector with each row representing the value of the new feature. The matrix U is determined off-line during the design phase.

To further reduce the feature dimension for improved classification efficiency and effectiveness, feature selection techniques are applied to find the subset that yields the best performance is chosen as the final features to be used for classification. For example, the resulting subset may consist of m features corresponding to the $\{i_1\ i_2\ \ldots\ i_m\}$ ($1 \leq i_1 \leq i_2 \leq \ldots \leq i_m \leq n$) row of the feature vector y. By writing the matrix U as $u=[u_1\ u_2\ \ldots\ u_n]$ with each vector being an n-by-1 vector, and then selecting only the vectors corresponding to the best subset, yields $W=[u_{i1}\ u_{i2}\ \ldots\ u_{im}]$, an m-by-n matrix. Combining the feature extraction and feature selection, the final features corresponding to the original feature vector x can be derived as $z=W^T x$.

The style characterization processor 52 then classifies the driver's driving style based on the discriminant feature vector z. Classification techniques, such as fuzzy logic, clustering, neural networks (NN), support vector machines (SVM), and simple threshold-based logic can be used for style classification. In one embodiment, an SVM-based classifier is used. Because the style classification involves more than two classes, a multi-class SVM can be employed to design the classifier. A K-class SVM consists of K hyper-planes: $f_k(z)=w_k z+b_k$, $k=1,2,\ldots,k$ where $w_k$ and $b_k$ are determined during the design phase based on the test data. The class label c for any testing data is the class whose decision function yields the largest output as:

$$c = \underset{k}{\operatorname{argmax}} f x(z) = \underset{k}{\operatorname{argmax}}(w_k z + b_k), \qquad (35)$$

$$k = 1, 2, \ldots, K$$

The feature extraction, feature selection and the K-class SVM are designed off-line based on vehicle test data. A number of drivers were asked to drive several instrumented vehicles under various traffic conditions and the sensor measurements were collected for the classification design. For every vehicle passing maneuver, an original feature vector x can be constructed. All of the feature vectors corresponding to vehicle passing maneuvers are put together to form a training matrix $X=[x_1\ x_2\ \ldots\ x_L]$, where L is the total number of vehicle passing maneuvers. Each row of the matrix X represents the values of one feature variable while each column represents the feature vector of a training pattern. The training matrix X is then used for the design of the style classification based on vehicle passing maneuvers.

The feature extraction is based on LDA, a supervised feature extraction technique, Its goal is to train the linear data projection $Y=U^T X$ such that the ratio of the between-class variance to the within-class variance is maximized, where X is an N-by-L matrix and U is an N-by-N matrix. Accordingly, $Y=[y_1\ y_2\ \ldots\ y_L]$ is an N-by-L matrix, where the new feature vector $y_i$ still consists of n features. Commercial or open-source algorithms that compute the matrix U are available and well-known to those skilled in the art. The inputs to those algorithms include the training matrix X and the corresponding class labels. In one embodiment, the class labels can be 1-5 with 1 indicating a conservative driver, 3 indicating a typical driver and 5 being a sporty driver. In addition, a class label 0 can be added to represent those hard-to-decide patterns. The class labels are determined based on expert opinions by observing the test data The outputs of the LDA algorithms include the matrix U and the new feature matrix Y.

The feature selection is conducted on the feature matrix Y. In this particular application, because the dimension of the extracted features is relatively small, an Exhaustive Search can be used to evaluate the classification performance of each possibly combination of the extracted features. The new features still consist of n features, and there are $\Sigma_{i=1}^n C_n^i$ possible combinations of the n features. The Exhaust Search evaluates the classification performance of each possible combination by designing an SVM based on the combination and deriving the corresponding classification error. The combination that yields the smallest classification error is regarded as the best combination where the corresponding features $\{i_1\ i_2\ \ldots\ i_m\}$ determine the matrix $[u_{i1}\ u_{i2}\ \ldots\ u_{im}]$. Conveniently, the SVM corresponding to the best feature combination is the SVM classifier. Since commercial or open-source algorithms for SVM designs are well-known to those skilled in the art, a detailed discussion is not necessary herein.

It is noted that although SVM is used as the classification technique in this embodiment for classifying passing maneuvers, the present invention can easily employ other techniques, such as fuzzy logic, clustering or simple threshold-based logic. Similarly, other feature extraction and feature selection techniques can be easily employed instead of the LDA and Exhaustive Search.

According to another embodiment of the present invention, the maneuver identification processor 46 also identifies characteristic maneuvers of vehicles at highway on/off ramps. Typical highway on-ramps start with a short straight entry, continue to a relatively tight curve, and then end with a lane merging. Typical highway off-ramps start with a lane split as the entry portion, continue to a relatively tight curve, and then a short straight road portion and end at a traffic light or a stop sign. Although highway on/off ramps without a curve portion do exist, most maneuvers at highway on/off ramps involve both curve-handling and a relatively long period of acceleration or deceleration. Consequently, maneuvers at highway on/off ramps can be identified based on steering activities, or vehicle yaw motion, and the corresponding change in the vehicle speed.

Figure 21A:
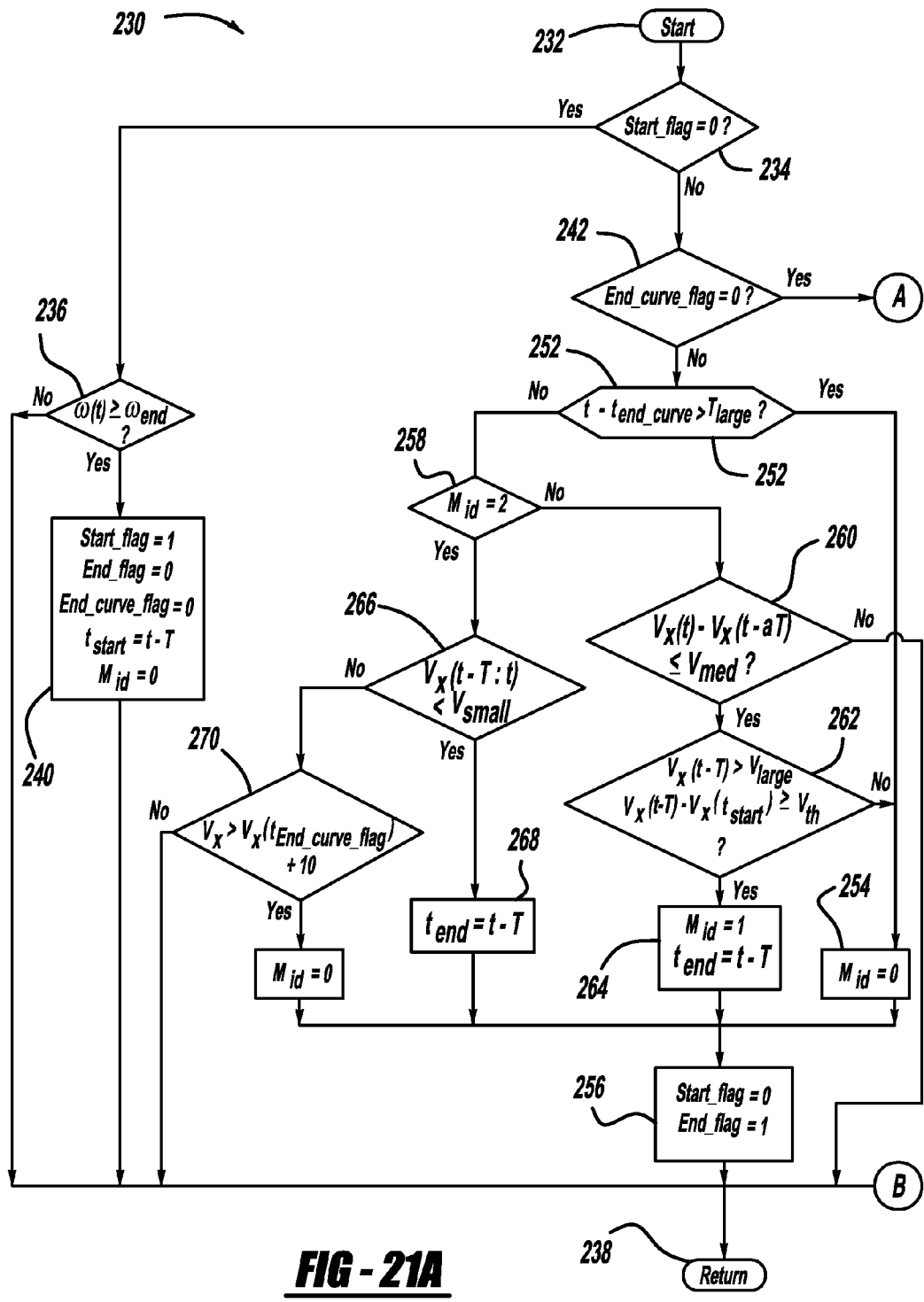
FIGS. 21A and 21B are a flow chart diagram showing a process that can be used by the maneuver identification processor in the system of FIGS. 2, 3 and 4 for identifying a highway on/off ramp maneuver, according to an embodiment of the present invention.
Figure 21B:
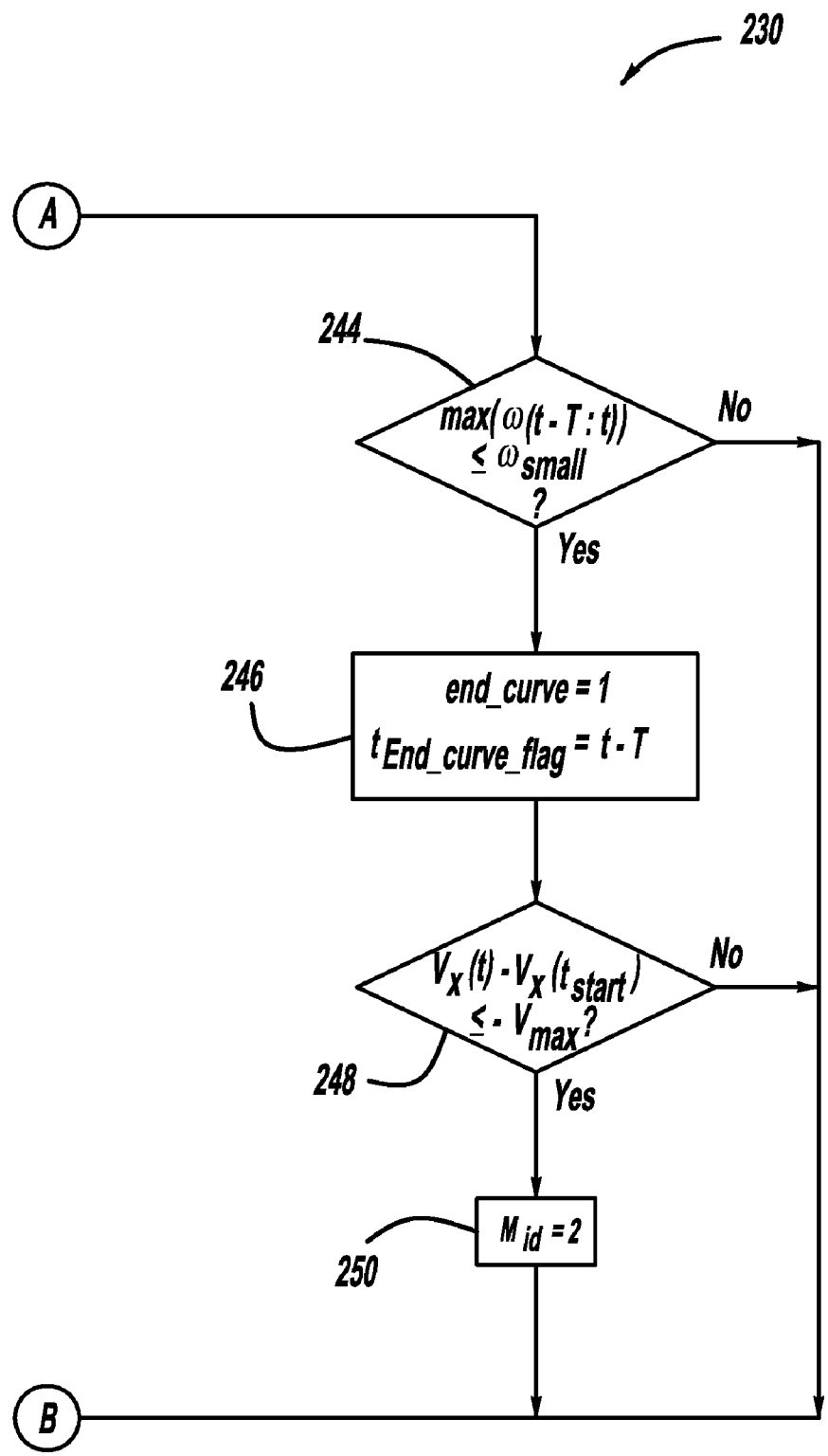

An example of a process for identifying highway on/off-ramp maneuvers is shown by flow chart diagram 230 in FIGS. 21A and 21B, according to an embodiment of the present invention. In this example, the entry portion of the on/off ramp is ignored. That is, on/off ramp maneuvers start with curve handling and vehicle yaw motion, or other steering activities, to determine the start of the maneuver. The on-ramps are determined based on the speed variation after the curve portion and the off-ramps are determined based on the speed variation during and after the curve portion. To keep the integrity of the data associated with an identified maneuver, the process keeps recording and refreshing at certain periods, such as T=2 s, of data. Alternately, if the vehicle is equipped with a forward-looking camera or a DGPS with an enhanced digital map, the information can be incorporated or used independently to determine when the vehicle is at a highway on/off ramp. Usage of that information for the determination of highway on/off ramps is straight forward and well-known to those skilled in the art.

Returning to FIGS. 21A and 21B, the maneuver identifier processor 46 begins by reading the filtered vehicle speed signal v and the filtered vehicle yaw rate signal ω from the signal processor 44 at box 232. The maneuver identifier algorithm then proceeds using the Boolean variables Start_flag, End_flag and End_curve_flag, where Start_flag is initialized to zero, End_flag is initialized to one and End_curve_flag is initialized to one. The algorithm determines whether Start_flag is zero at decision diamond 234 to determine whether the vehicle 10 is in a highway on/off ramp maneuver. If Start_flag is zero at the decision diamond 234, then the algorithm determines whether the condition $\omega(t) \geq \omega_{med}$ has been met at decision diamond 236, where $\omega_{med}$ can be 2° per second in one non-limiting embodiment to determine whether the vehicle 10 is likely entering the curve or starting to turn. If the condition of the decision diamond 236 is not met, then the algorithm returns at block 238 to collecting the data. If the condition of the decision diamond 236 is met, meaning that the vehicle is entering a curve or starting a turn, the algorithm sets Start_flag to one, End_flag to zero, End_curve_flag to zero, timer $t_{start}=t-T$, and the maneuver identifier value $M_{id}$ to zero at block 240. The algorithm then returns at the block 238 to collecting data.

If Start_flag is not zero at the decision diamond 234, meaning that the vehicle 10 is in a potential highway on/off ramp maneuver, then the algorithm determines whether End_curve_flag is zero at decision diamond 242. If End_curve_flag is zero at the decision diamond 242, meaning that the vehicle 10 is in the curve portion of the potential on/off ramp maneuver, the algorithm then determines whether the curve portion maneuver has been completed. Particularly, the algorithm determines whether the condition $\max(\omega(t-T:t)) \leq \omega_{small}$ has been met at decision diamond 244, and if so, meaning that the curve portion maneuver has been completed, sets End_curve_flag to one and time $t_{end\_curve} = t-T$ at block 246. In one non-limiting embodiment, $\omega_{small}$ is 1° per second.

The algorithm also determines vehicle speed information, particularly, whether the condition $v_x(t) - v_x(t_{start}) \leq -v_{max}$ is met at decision diamond 248, and if so, meaning that the curve portion is possibly part of an off-ramp maneuver, sets the maneuver identifier value $M_{id}$ to 2 at box 250. If the conditions of the decision diamonds 244 and 248 are not met, then the algorithm returns to collecting data at block 238 where the vehicle 10 is still in the middle of a relatively large yaw motion and thus, the processor 46 waits for the next data reading. If the condition of the decision diamond 248 is not met, the curve-handling maneuver might be part of an on-ramp maneuver, where the maneuver identifier value $M_{id}$ stays at zero. In one non-limiting example, the speed $v_{max}$ can be 25 mph.

If End_curve_flag is one at the decision diamond 242, meaning that the curve portion has been completed, the algorithm determines whether time $t - t_{end\_curve} > T_{large}$ at block 252, for example, $T_{large} = 30$ s. If this condition is met, the potential on/off ramp maneuver has not ended after a relatively long time, so the maneuver is discarded by setting the maneuver identifier value $M_{id}$ to zero at box 254 and setting Start_flag to zero and End_flag to one at box 256.

If the condition of the block 252 is not met, the algorithm determines whether the maneuver has been identified as an off-ramp maneuver by determining whether the maneuver identifier value $M_{id}$ is two at decision diamond 258. If the maneuver identifier value $M_{id}$ is one or zero, the on-ramp maneuver ends when the increase in the vehicle speed becomes smaller. Therefore, if the maneuver identifier value $M_{id}$ is not two at the decision diamond 258, the algorithm determines whether the speed condition $v_x(t) - v_x(t-aT) \leq v_{med}$ is met at decision diamond 260, where aT is 10 s and $v_{med}$ is 5 mph in one non-limiting example. If this condition is not met, meaning the on-ramp maneuver has not ended, then the algorithm returns to the block 238.

If the condition of the decision diamond 260 has been met, the algorithm determines whether the speed conditions $v_x(t-T) \geq V_{large}$ and $v_x(t-T) - v_x(t_{start}) \geq v_{th}$ have been met at decision diamond 262. In one non-limiting embodiment, $V_{large}$ is 55 mph and $v_{th}$ is 20 mph. If both of the conditions of the decision diamond 262 have been met, then the maneuver is truly an on-ramp maneuver. The algorithm sets the maneuver identifier value $M_{id}$ to one identifying an on-ramp maneuver and sets time $t_{end} = t-T$ at box 264, and Start_flag to zero and End_flag to one at the box 256 and returns at the block 238. If the condition of the decision diamond 262 has not been met, the maneuver is not an on-ramp maneuver, so the maneuver is discarded by setting the maneuver identifier value $M_{id}$ to zero at the box 254, and Start_flag to zero and End_flag to one at the box 256, and returning at the block 238.

If the maneuver identifier value $M_{id}$ is two at the decision diamond 258, the off-ramp maneuver ends if the vehicle speed v is very small. Therefore, the algorithm determines whether the speed condition $v_x(t-T:t) \leq v_{small}$ is met at decision diamond 266, where $v_{small}$ is 3 mph in one non-limiting example. If this condition of the decision diamond 266 has been met, meaning that the off-ramp maneuver has ended, then the algorithm sets time $t_{end} = t-T$ at box 268, Start_flag to zero and End_flag to one at box 256, and returns at the block 238.

If the condition of the decision diamond 266 has not been met, the algorithm determines whether the speed has not gone down enough to indicate that the maneuver is not an off-ramp maneuver by determining whether the speed condition $v_x(t) > v_x(t_{end\_curve}) + 10$ mph has been met at decision diamond 270. If this condition is met, meaning that the speed is too high for the maneuver to be an off-ramp maneuver, the maneuver identifier value $M_{id}$ is set to zero at box 272, and Start_flag is set to zero and End_flag is set to one at the box 256, and the algorithm returns at the block 238. If the condition of the decision diamond 270 has not been met, meaning that the potential off-ramp maneuver has not been completed, then the algorithm returns at the block 238.

As the maneuver identifier processor 46 determines the beginning and the end of a maneuver, the data selection processor 48 stores the corresponding data segment based on the variables Start_flag, End_flag, $t_{start}$ and $t_{end}$.

Highway on/off-ramp maneuvers involve both curve-handling and a relatively large speed increase/decrease. In general, the sportier a driver is, the larger the lateral acceleration and the yaw rate are on the curves. Similarly, the sportier a driver is, the faster the speed increases at an on-ramp. However, at an off-ramp, a conservative driver may decelerate fast at the beginning to have a lower speed while a sportier driver may postpone the deceleration to enjoy a higher speed at the off-ramp and then decelerate fast at the end of the off-ramp. In addition, a sportier driver may even engage throttle at an off-ramp to maintain the desired vehicle speed. Thus, the steering angle, yaw rate and the lateral acceleration can be used to assess sportiness of the curve-handling behavior at an on/off-ramp, and vehicle speed, longitudinal acceleration, throttle opening and brake pedal force/position can be used to assess the drivers longitudinal control.

However, the data collected consists of the time trace of the signals, which usually results in a fair amount of data. For example, a typical on/off-ramp maneuver lasts more than 20 seconds. Therefore, with a 10 Hz sampling rate, more than 200 samples of each signal would be recorded. Thus, data reduction is necessary in order to keep the classification efficient. Further, the complete time trace of the signals is usually not affective for the classification. In fact, a critical design issue in classification problems is to extract discriminate features, which best represent individual classes. As a result, the style characterization processor 52 may include a feature processor and a style classifier, as discussed above.

As discussed above, the feature processor involves three processing steps, namely, original feature derivation, feature extraction and feature selection The original features are usually derived using various techniques, such as time-series analysis and frequency-domain analysis, which are well understood to those skilled in the art. The present invention proposes a non-limiting technique to derive the original features based on engineering insights.

For on-ramp maneuvers, the original features include the maximum lateral acceleration, the maximum yaw rate, the average acceleration, the maximum throttle opening and an array of throttle indexes $TI_{throttle} = [TI_1 \ldots TI_i \ldots TI_N]$ based on the distribution of the throttle opening. Each throttle index $TI_i$ is defined as the percentage at the time when the throttle opening $\alpha$ is greater than a threshold $a_{thi}$. That is, if the on-ramp maneuver takes $T_{total}$ seconds and during that time period the throttle opening is greater than $a_{thi}$ ($0<a_{thi}<100\%$) for $T_i$ seconds, then the throttle index $TI_i=T_i/T_{total}$. Examples of the thresholds $[a_{th1} \ldots a_{thi} \ldots a_{thN}]$ can include $[20\%\ 30\%\ 40\%\ 50\%\ 60\%]$ or from 10% to 90% with a 10% interval in between. Alternatively, $T_{total}$ can be defined as the time when $\alpha > a_{th}$, where $a_{th}$ should be smaller than $a_{thi}$ or i=1, 2, ..., N.

For off-ramp maneuvers, the original features include the maximum lateral acceleration, the maximum yaw rate, the average deceleration, the maximum braking pedal position/force and an array of braking indexes $BI_{braking}=[BI_1 \ldots BI_i \ldots BI_N]$ based on the distribution of the brake pedal position/force. Similar to the throttle index $TI_i$, the braking index $BI_i$ is defined as the percentage of the time when the braking pedal position/force b is greater than a threshold $b_{thi}$.

For each recognized on/off-ramp maneuver, one set of the original features is derived. This set of original features can be represented as an original feature vector x, an n-dimension vector with each dimension representing one specific feature. This original feature vector serves as the input for further feature extraction and feature selection processing. Feature extraction tries to create new features based on transformations or combination of the original features (discriminants), while feature selection selects the best subset of the new features derived through feature extraction.

Various feature extraction methods can be used, such as Principle Component Analysis (PCA), Linear Discriminant Analysis (LDA), Kernel PCA, Generalized Discriminant Analysis (GDA), etc. In one non-limiting embodiment, LDA is used, which is a linear transformation where $y=U^Tx$, and where U is an n-by-n matrix and y is an n-by-1 vector with each row representing the value of the new feature. The matrix U is determined off-line during the design phase. Because the original features for highway on-ramp and off-ramp maneuvers are different, the feature extraction would also be different. That is, the matrix U for on-ramp maneuvers would be different from the matrix U for off-ramp maneuvers.

To further reduce the feature dimension for improved classification efficiency and effectiveness, feature selection techniques, such as Exhaustive Search, can be used. The subset that yields the best performance is chosen as the final features to be used for classification. For example, the resulting subset may consist of m features corresponding to the $\{i_1\ i_2 \ldots i_m\}$ ($1 \leq i_1 \leq i_2 \leq \ldots \leq i_m \leq n$) row of the feature vectory. By writing the matrix U as $u=[u_1\ u_2 \ldots u_n]$ with each vector being an n-by-1 vector, and then selecting only the vectors corresponding to the best subset, yields $W=[u_{i1}\ u_{i2} \ldots u_{im}]$, an M-by-N matrix. Combining the feature extraction and feature selection, the final features corresponding to the original feature vector x can be derived as $z=W^Tx$. Once again, the matrix W for on-ramp maneuvers would be different from that for off-ramp maneuvers.

The style characterization processor 52 then classifies the driver's driving style based on the discriminant feature vector z. Classification techniques, such as fuzzy logic, clustering, neural networks (NN), support vector machines (SVM), and simple threshold-based logic can be used for style classification. In one embodiment, an SVM-based classifier is used. A K-class SVM consists of K hyper-planes: $f_k(z)=w_kz+b_k$, k=1, 2, ..., k where $w_k$ and $b_k$ are determined during the design phase based on the test data. The class label c for any testing data is the class whose decision function yields the largest output as:

$$c = \underset{k}{\arg\max} f_k(z) = \underset{k}{\arg\max}(w_k z + b_k), \quad (36)$$
$$k = 1, 2, \ldots, K$$

The SVM parameters for on-ramp maneuvers are different from those for off-ramp maneuvers.

The feature extraction, feature selection and the K-class SVM are designed off-line based on vehicle test data. A number of drivers were asked to drive several instrumented vehicles under various traffic conditions and the sensor measurements were collected for the classification design. Highway on/off-ramp maneuvers are recognized using the maneuver identification algorithm discussed above. For every on/off-ramp maneuver, an original feature vector x can be constructed. The feature vector corresponding to all the on-ramp maneuvers are put together to form a training matrix $X_{on}=[x_{1on}x_{2on} \ldots x_{Lon}]$, where $L_{on}$ is the total number of on-ramp maneuvers. Each row of the matrix $X_{on}$ represents the values of one feature variable while each column represents the feature vector of a training pattern. Similarly, the feature vectors corresponding to all of the off-ramp maneuvers form the training matrix $X_{off}=[x_{1off}x_{2off} \ldots x_{Loff}]$. The training matrix $X_{on}$ is used for the design of the style classification based on on-ramp maneuvers while the training matrix $X_{off}$ is for the design based on the off-ramp maneuvers. Because the design process is the same for both maneuvers, $X=[x_1 x_2 \ldots x_L]$ is used to represent the training matrix.

For the design of the LDA-based feature extraction, the goal is to train the linear data projection $Y=U^TX$ such that the ratio of the between-class variance to the within-class variance is maximized, where X is an N-by-L training matrix, i.e., $X_{on}$ for the on-ramp maneuver and $X_{off}$ for the off-ramp maneuvers, and the transform matrix U is the result of the training. Commercial or open-source algorithms that compute the matrix U are available and well-known to those skilled in the art. The inputs to those algorithms include the training matrix X and the corresponding class labels. In one embodiment, the class labels can be 1-5 with 1 indicating a conservative driver, 3 indicating a typical driver and 5 being a sporty driver. In addition, a class label 0 can be added to represent those hard-to-decide patterns. The class labels are determined based on expert opinions by observing the test data. The outputs of the LDA algorithms include the matrix U and the new feature matrix Y.

The feature selection is conducted on the feature matrix Y. In one embodiment, an Exhaustive Search is used to evaluate the classification performance of each possibly combination of the extracted features. The new features still consist of n features, and there are $\Sigma_{i-1}{}^nC^i{}_n$ possible combinations of the n features. The Exhaustive Search evaluates the classification performance of each possible combination by designing an SVM based on the combination and deriving the corresponding classification error. The combination that yields the smallest classification error is regarded as the best combination where the corresponding features $\{i_1\ i_2 \ldots i_m\}$ determine the matrix $[u_{i1}\ u_{i2} \ldots u_{im}]$. Conveniently, the SVM corresponding to the best feature combination is the SVM classifier. Since commercial or open-source algorithms for SVM designs are well-known to those skilled in the art, a detailed discussion is not necessary herein.

It is noted that although SVM is used as the classification technique, the present invention can easily employ other techniques, such as fuzzy logic, clustering or simple threshold-based logics. Similarly, other feature extraction and feature selection techniques can be easily employed in lieu of the LDA and Exhaustive Search.

According to another embodiment of the present invention, the maneuver identification processor 46 identifies a vehicle launching maneuver, which is the maneuver where a vehicle starts from a near-zero speed. Reliable indicators of vehicle launching maneuvers include an increasing vehicle speed and a persistently positive longitudinal acceleration. Therefore, measurements of vehicle speed and/or vehicle longitudinal acceleration can be used to detect or identify a vehicle launching maneuver. If vehicle longitudinal acceleration is not directly measured, the acceleration can be computed by differentiating vehicle speed measurements. The maneuver identification processor 46 is only activated to detect a vehicle launching maneuver when the gear is shifted to drive.

Figure 22:
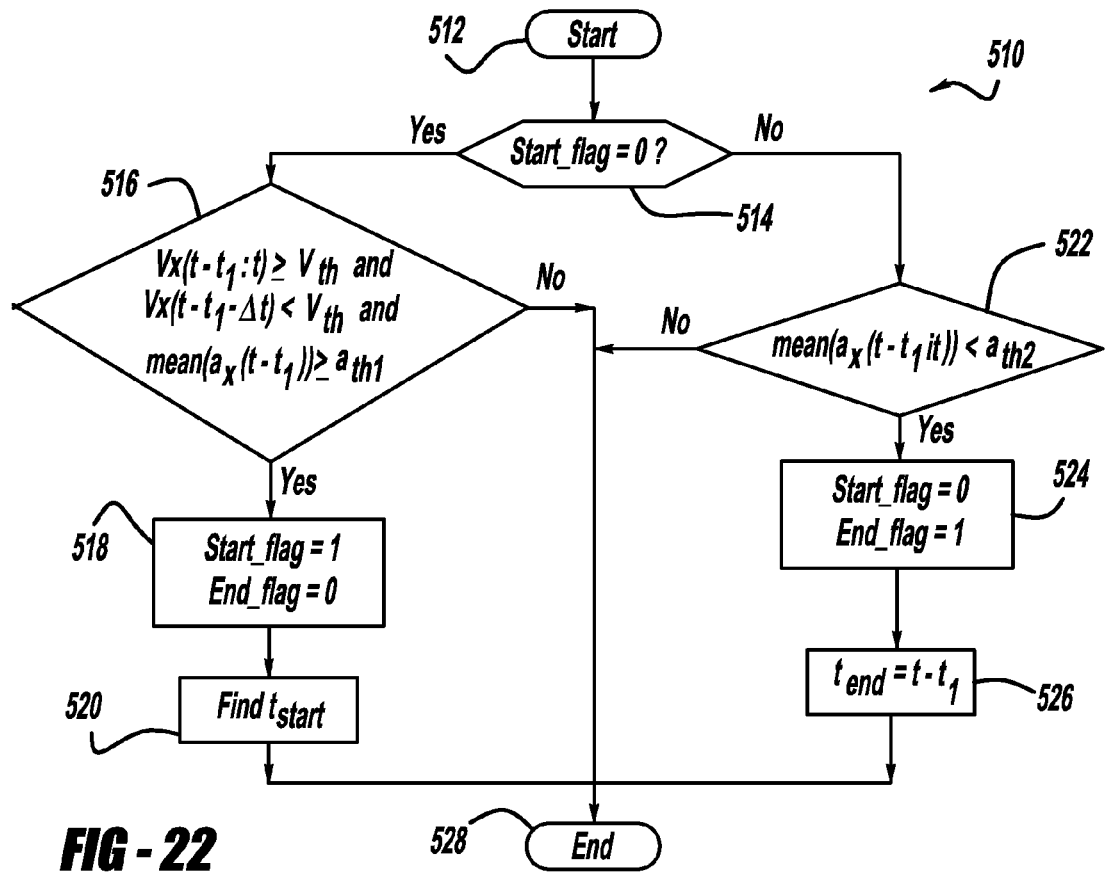
FIG. 22 is a flow chart diagram showing a process that can be used by the maneuver identification processor in the systems of FIG. 2, 3 and 4 for identifying a vehicle launching maneuver, according to an embodiment of the present invention.

FIG. 22 is a flow chart diagram 510 showing a process for identifying a vehicle launching maneuver, according to an embodiment of the present invention. To keep the integrity of the data associated with an identified maneuver, the system keeps recording and refreshing at a certain period, such as T=2 s, of data.

The maneuver identifying algorithm begins by reading the filtered vehicle speed signal $v_x$ and the vehicle longitudinal acceleration signal $a_x$ from a longitudinal accelerometer or by differentiating vehicle speed measurements at box 512. The maneuver identifying algorithm then proceeds according to its operational states denoted by the Boolean variable Start_flag and End_flag, where Start_flag is initialized to zero and End_flag is initialized to one. The algorithm then determines whether Start_flag is zero at block 514 to determine whether the vehicle is in a vehicle launching maneuver. If Start_flag i zero, then the vehicle 10 is not in a vehicle launching maneuver.

The algorithm then determines if the vehicle has started a vehicle launching maneuver by determining whether the conditions of decision diamond 516 have been met, namely, $v_x(t-t_1-\Delta t) < v_{th}$, $v_x(t-t_1:t) \geq v_{th}$ and mean($a_x(t-t_1:t)) \geq a_{th1}$. In one non-limiting embodiment, $t_1$ is a time window of about 1 s, $\Delta t$ is the sampling time of the speed measurements, and $v_{th}$ and $a_{th1}$ are predetermined thresholds, such as $v_{th}$=2 m/s and $a_{th1}$=0.05 m/s². If all of the conditions of the decision diamond 516 have been met, then the vehicle 10 has started launching, so the algorithm sets Start_flag to one and End_flag to zero at box 518. The algorithm then determines a starting time $t_{start}$ at box 520, and proceeds to collect further data at box 528. If the conditions of the decision diamond 516 are not met, the vehicle 10 is not in a launching maneuver, and the process goes to the box 528 for collecting data.

If the Start_flag is not zero at the block 514 where the vehicle 10 has been identified to be in a vehicle launching maneuver, the algorithm determines whether the vehicle launching maneuver has been completed by determining whether the longitudinal acceleration is within a small threshold, such as $a_{th2}$=0.02 m/s² during the last time $t_1$ s. To determine this, the algorithm determines whether mean($a_x(t-t_1:t)$) < $a_{th2}$ at decision diamond 522. If this condition is met at the decision diamond 522, then the vehicle launching maneuver has been completed, and the algorithm sets Start_flag equal to zero and End_flag equal to one at box 524, and sets the time $t_{end}$=t-$t_1$ at box 526. If the condition of the decision diamond 522 has not been met, the vehicle 10 is still in the vehicle launching maneuver, so the algorithm proceeds to the block 528 to collect more data. As the maneuver algorithm determines the beginning and the end of the vehicle launching maneuver, the data selection processor 48 stores a corresponding data segment based on Start_flag, End_flag, $t_{start}$ and $t_{end}$.

Figure 23:
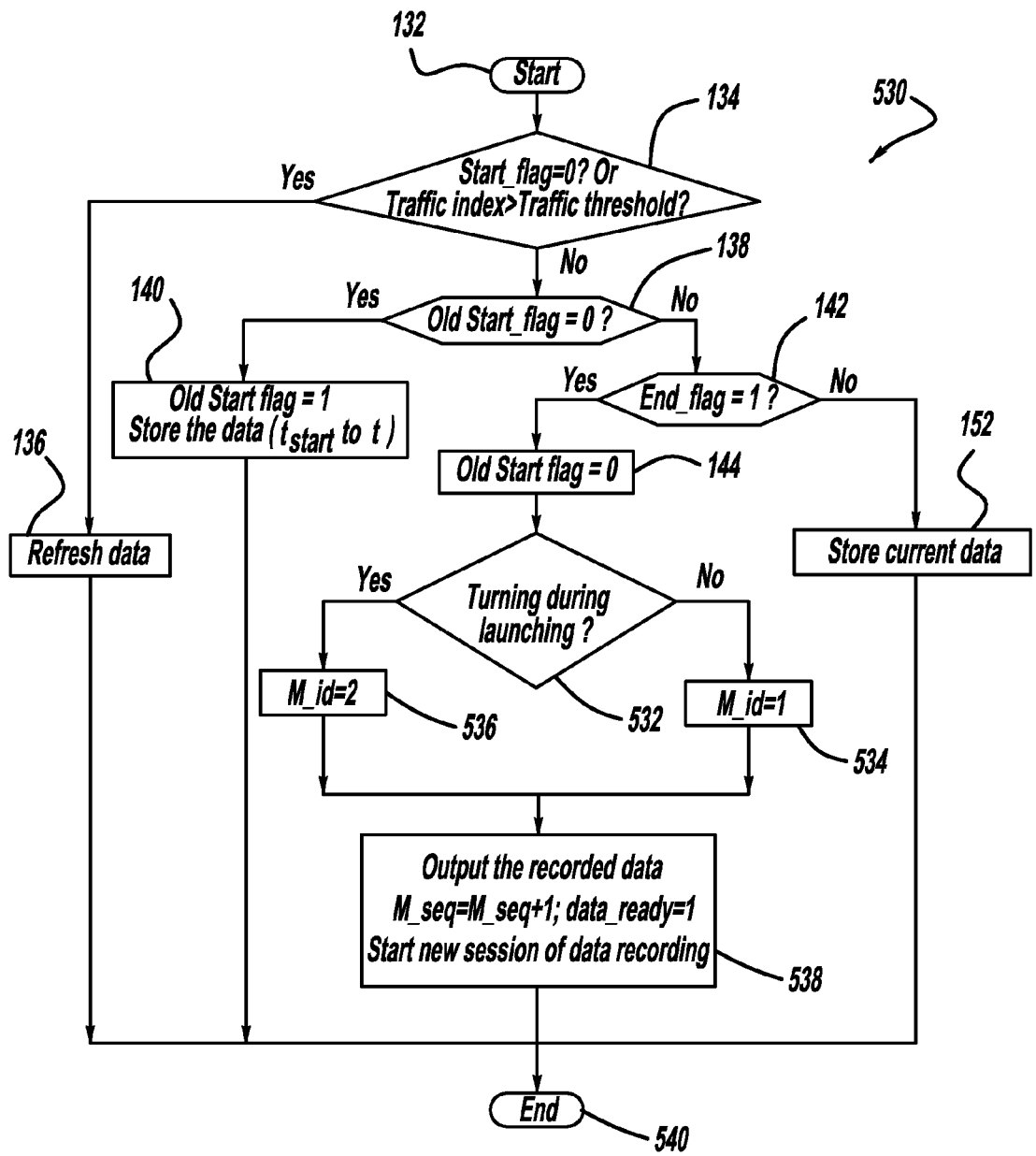
FIG. 23 is a flow chart diagram showing a process for providing data selection in the data selection processor in the systems shown in FIGS. 2, 3 and 4, according to an embodiment of the present invention.

FIG. 23 is a flow chart diagram 530 showing a process used by the data selection processor 48 for storing the data corresponding to a particular vehicle launching maneuver. The flow chart diagram 530 is similar to the flow chart diagram 130 discussed above, where like steps are identified by the same reference numeral. In this embodiment for the vehicle launching maneuver, if the End_flag is one at the block 142 because the vehicle launching maneuver has been completed, and the variable old_Start_flag is set to zero at the box 144, the algorithm determines whether the launching maneuver was a straight-line launching maneuver or a launching maneuver accompanied by a relatively sharp turn at decision diamond 532. In one embodiment, the algorithm determines if the launching maneuver is also a left or right turn based on the yaw rate signal ω and its integration $$\varphi = \int_{t_{start}}^{t_{end}} \omega(t)\,dt.$$

If max($\omega(t_{start}:t_{end})$) < $\omega_{th}$ or $\phi < \phi_{th}$, where $\phi_{th}$ is a predetermined threshold, such as 60°, the maneuver is regarded as a straight-line launching maneuver, and the maneuver identifier value $M_{id}$ is set to one at box 534. If these conditions have not been met at the decision diamond 532, the vehicle 10 is traveling around a relatively sharp turn during the launching maneuver, where the maneuver identifier value $M_{id}$ is set to two at box 536. The algorithm then outputs the recorded data at box 538 including the maneuver identifier value $M_{id}$, $M_{seq}$=$M_{seq+1}$ and data_ready=1. The algorithm ends at box 540.

In general, the sportier a driver is, the larger the throttle input and the faster the vehicle accelerates during vehicle launching. Therefore, vehicle speed, longitudinal accelerating and throttle percentage should be able to reveal a driver's driving style. Acceleration pedal force or position can also be included if available. The collected data is, however, not suitable to be used directly for the classification because of the following two reasons. First, the collected data consists of the time trace of the signals, which usually results in a fair amount of data. For example, a typical launching maneuver generally lasts more than 5 seconds. Therefore, with a 10 Hz sampling rate, more than 50 sample of each signal would be recorded for a typical vehicle launching maneuver. Data reduction is necessary to keep the classification efficient. Second, the complete time trace of those signals is usually not effective for the classification. In fact, a critical design issue in classification problems is to derive discriminative features that best represent individual classes. As a result, the style classification processor 52 includes a feature processor and a style classifier, as discussed above.

The following original discriminant features are chosen based on engineering insights, and include vehicle final speed at the end of the vehicle launching, the average acceleration, and an array of throttle indexes $I_{throttle}$=[$I_1 \ldots I_i \ldots I_N$] based on the distribution of the throttle opening α. Each throttle index $I_i$ is defined as the percentage of the time when the throttle opening α is greater than a threshold $a_{thi}$. That is, if the launching maneuver takes $T_{total}$ seconds and during the period of time, the throttle opening α is greater than $a_{thi}$ (0<$a_{thi}$<100%) for $T_i$ seconds, then the throttle index $I_i$=$T_i$/$T_{total}$. Examples of the thresholds [$a_{th1} \ldots a_{thi} \ldots a_{thN}$] can be [20% 30% 40% 50% 60%] or from 10% to 90% with a 10% interval in between. Alternatively, time $T_{total}$ can be defined as the time when α>$a_{th}$ and $T_i$ is defined with $\alpha_{thi}$>$a_{th}$.

These original features are input to the feature extraction and subsequently feature selection processors. In one embodiment, feature extraction and feature selection processes are removed for simplicity. The style classification processor 52 then classifies a driver's driving style directly based on those original discriminants. Classification techniques, such as fuzzy logic, clustering, neural networks, self-organizing map and threshold-based logic can be used for the style classification.

Figure 24:
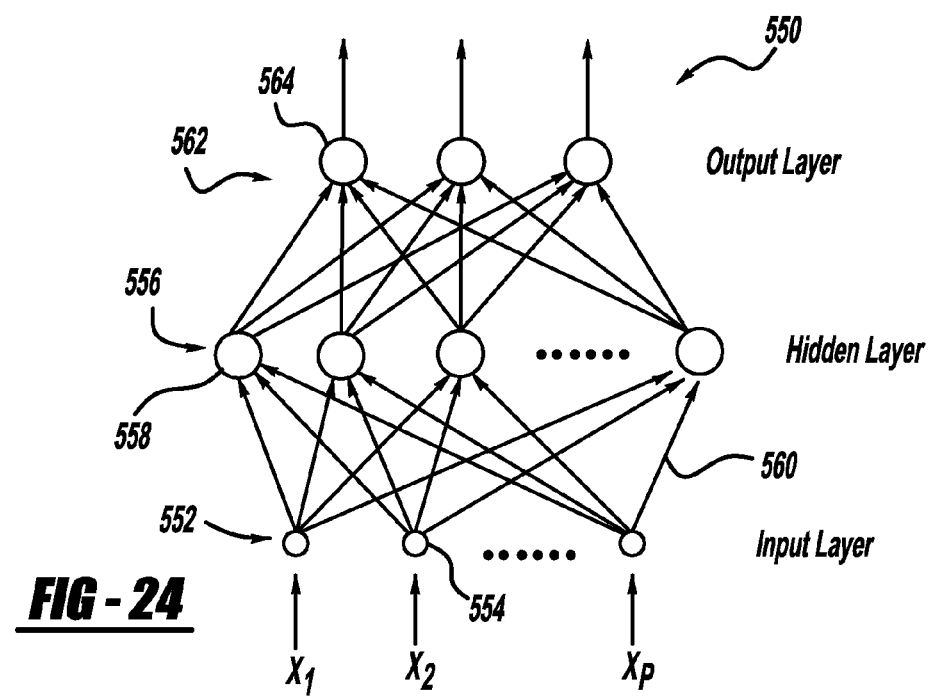
FIG. 24 is a plan view of a neural network that can be used in the style characterization processor of the systems shown in FIGS. 2, 3 and 4, according to an embodiment of the present invention.

A neural network based classifier 550 suitable for this purpose is shown in FIG. 24. The neural network classifier 550 includes an input layer 552 having seven input neurons 554 corresponding to the seven discriminants, namely, vehicle final speed, average accelerate and a 5-dimension throttle index array. The neural network classifier 550 also includes a hidden layer 556 including neurons 558, and an output layer 562 including three neurons 564, one for a conservative driver, one for a typical driver and one for a sporty driver, where branches 560 connect the neurons 554 and 558. Alternatively, the output layer 562 of the neural network classifier 550 may have five neurons, each corresponding to one of the five levels ranging from conservative to sporty. The design and training of a neural network classifier 550 is based on vehicle test data with a number of drivers driving under various traffic and road conditions.

The embodiment discussed above provides launching maneuvers for both straight-line launching and launching and turning without differentiating between the two. Alternatively, classifiers can be designed specifically for these two type of maneuvers, and discriminants derived from the vehicle yaw rate and lateral acceleration can be included for the classification based on launching and turning maneuvers.

According to another embodiment of the invention, the decision fusion in the decision fusion processor 56 can be divided into three levels, namely a level-1 combination, a level-2 combination and a level-3 combination. The level-1 combination combines the classification results from different classifiers that classify different maneuvers based on a single maneuver, and is not necessary for maneuvers that have only one corresponding classifier. The level-2 combination combines the classification results based on multiple maneuvers that are of the same type. For example, combining the classification results of the most recent curve-handling maneuver with those of previous curve-handling maneuvers. The level-3 combination combines the classification results based on different types of maneuvers, particularly, combines the results from the individual level-2 combiners. The level-2 combination and the level-3 combination can be integrated into a single step, or can be separate steps. The level-1 combination resides in the style characterization processor 52 and the level-2 combination and the level-3 combination are provided in the decision fusion processor 56.

Figure 25:
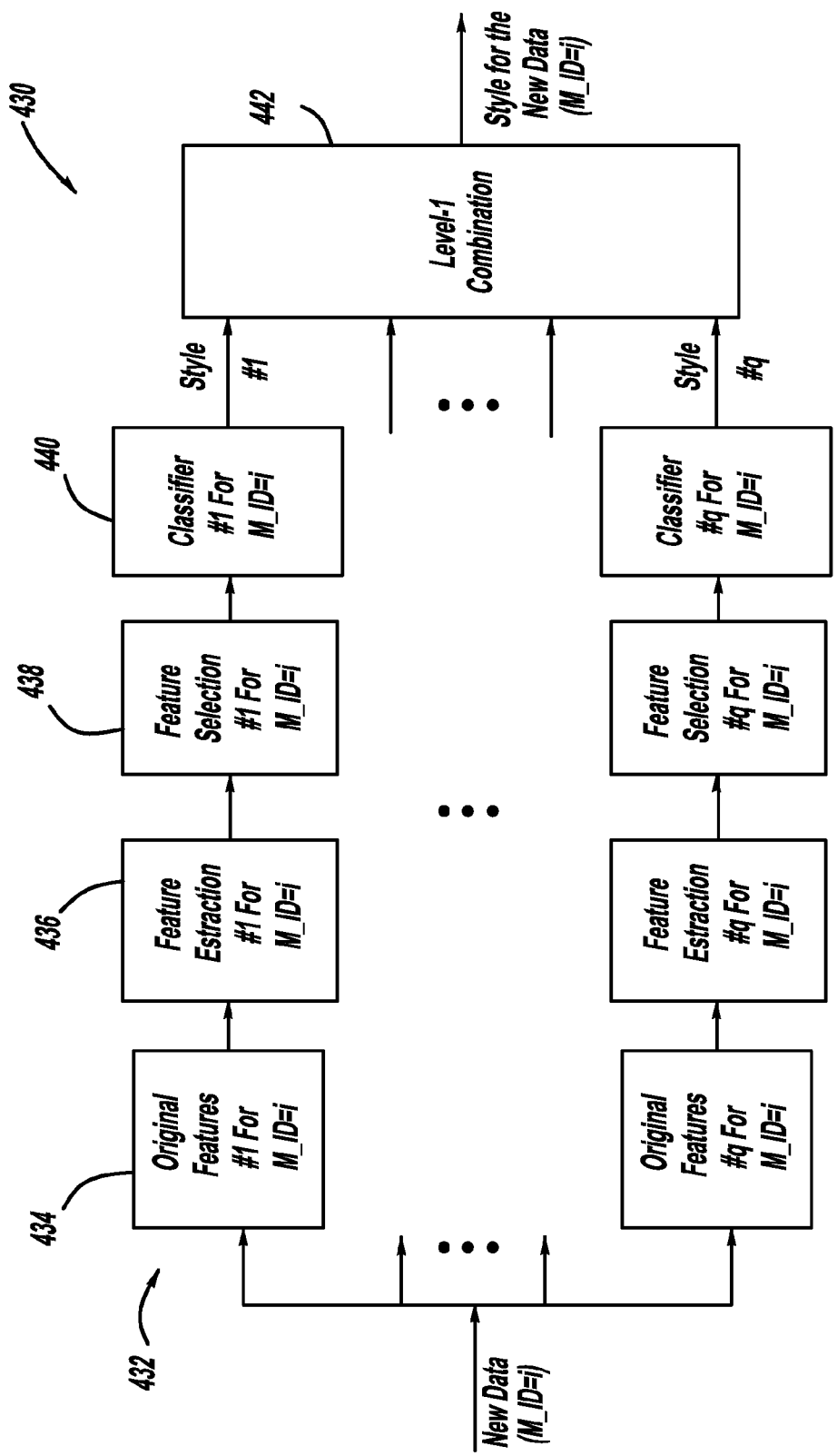
FIG. 25 is a block diagram of a style characterization processor that can be used in the systems of FIGS. 2, 3 and 4 that includes a level-1 combination, according to an embodiment of the present invention.

FIG. 25 is a block diagram of a style characterization processor 430 that can be used as the style characterization processor 52, and includes the level-1 combination. The information from the maneuver identification processor 46, the data selection processor 48 and the traffic/road condition recognition processor 50 are provided to a plurality of channels 432 in the processor 430, where each channel 432 is an independent classification for the same specific maneuver. In each channel 432, original features of the maneuver are identified in an original features processor 434, features are extracted in a features extraction processor 436, the features are selected in a feature selection processor 438 and the selected features are classified in a classier 440. A level-1 combination processor 442 combines all of the styles for different maneuvers and outputs a single style classification. For example, assume two classification channels are designed for the curve-handling maneuvers. Once a new curve-handling maneuver is identified and the data associated with this specific maneuver is collected, the data is input to both channels at the same time and each channel outputs a style classification result. The level-one combination then combines the two results and outputs a single style classification.

The level-1 combination is a standard classifier combination problem that can be solved by various classifier combination techniques, such as voting, sum, mean, median, product, max/min, fuzzy integral, Dempster-Shafter, mixture of local experts (MLE), neural networks, etc. One criterion for selecting combination techniques is based on the output type of the classifiers 440. Typically, there are three type of classifier outputs, namely, confidence, rank and abstract. At the confidence level, the classifier outputs a numerical value for each class indicating their belief of probability that the given input pattern belongs to that class. At the rank level, the classifier assigns a rank to each class with the highest rank being the first choice. At the abstract level, the classifier only outputs the class label as a result. Combination techniques, such as fuzzy integral, MLEs and neural networks require outputs at the confidence level, while voting and associative switch only requires abstract-level outputs. In one embodiment, the level-1 combination of the invention is based on majority voting and Dempster-Shafter techniques.

Majority voting is one of the most popular decision fusion methods. It assumes all votes, i.e., classification results from different classifiers, are equally accurate. The majority-voting based combiner calculates and compares the number of votes for each class and the class that has the largest number of votes becomes the combined decision. For example, assume the classes of the driving style are labeled as i=1, 2, ..., k, with a larger number representing a more aggressive driving style. In addition, a class "0" is added to represent the hard-to-decide patterns. The number of votes $V_i$ for each class i=0, 1, ..., k is:

$$V_i = \sum_{j=1}^{N} v_{ij}, \text{ with } v_{ij} = \begin{cases} 1, & \text{if } c_j = i \\ 0, & \text{if } c_j \neq i \end{cases} \quad (37)$$

Where $c_j$ is the output from classifier j and N is the total number of classifiers.

The combined decision is $c = \arg_{i=0,1,\ldots,k}^{max} V_i$. In addition, the combiner may also generate a confidential level based on the normalized votes, $$conf(i) = \frac{V_i}{\sum_{i=0}^{K} V_i},$$

and provides a confidence vector [conf(0) conf(1) ... conf(K)]$^T$.

Alternatively, weighted voting can be used to combine abstract-level outputs as:

$$V_i = \sum_{j=1}^{N} \alpha_{ij} v_{ij} \quad (38)$$

Where the weightings $a_{ij}$ represent the correct rate of classifier j in classifying patterns belonging to class i. These weights can be pre-determined based on the test performance (generalization performance) of the corresponding classifiers. Deriving the correct rate from the test performance is well-known to those skilled in the art.

If the classifiers provide outputs at the confidence level, the Dempster-Shafter method can be used to design the combiner. The details of the Dempster-Shafter theory and algorithms are well-known to those skilled in the art. Given the class labels as i=0,1, . . . , k, each classifier outputs an K-by-1 vector $[b_j(0)\ b_j(1)\ \ldots\ b_j(K)]^T$, where $b_j(i)$ is the confidence (i.e., the belief) classifier j has in that the input pattern belongs to class i. The confidence values should satisfy $0 \leq b_j(i) \leq 1$ and $$\sum_{i=0}^{K} b_j(i) = 1.$$

Applying the Dempster-Shafter theory to the level-1 combiner results in the following combination rule:

$$conf(i) = \frac{bel(i)}{\sum_{i=0}^{K} bel(i)}, \text{ with } bel(i) = \sum_{j=1}^{N} b_j(i) \quad (39)$$

$$(\prod_{m=1,\ldots N, m \neq j} b_m(0))$$

As a result, the combiner also outputs a K-by-1 vector $[conf(0)\ conf(1) \ldots conf(k)]^T$, where $conf(i)$ is the confidence in that the pattern belongs to class i. Similarly, $conf(i)$ satisfy $0 \leq conf(i) \leq 1$ and $$\sum_{i=0}^{K} conf(i) = 1.$$

The output of the combiner is treated as the classification results based on a single maneuver, which is to be combined with results based on previous maneuvers of the same type in the level-2 combination.

The results stored in the trip-logger 54 can be used to enhance the accuracy and robustness of the characterization. To fulfill this task, the decision fusion processor 56 is incorporated. Whenever a new classification result is available, the decision fusion processor 56 integrates the new result with previous results in the trip-logger 54 by the level-2 and level-3 combinations.

Different from the level-1 combination, where the pattern, i.e., any single maneuver, to be classified by different classifiers is the same pattern, the level-2 and the level-3 combinations deal with the issue of combining classification results corresponding to different patterns, i.e., multiple maneuvers of the same or different types. Strictly speaking, the level-1 combination is a standard classifier combination problem while the level-2 and the level-3 combinations are not. However, if a driver's driving style is regarded as one pattern, the classification based on different maneuvers can be regarded as the classification of the same pattern with different classifiers using different features. Consequently, classifier combination techniques can still be applied. On the other hand, the different maneuvers can be treated as different observations at different time instances and the combination problem can be treated with data fusion techniques. To demonstrate how this works, the present invention shows one example for each of the two approaches, namely, a simple weight-average based decision fusion that ignores the maneuver type and time differences, and a Bayes-based level-2 and level-3 combinations that take those differences into consideration.

Figure 26:
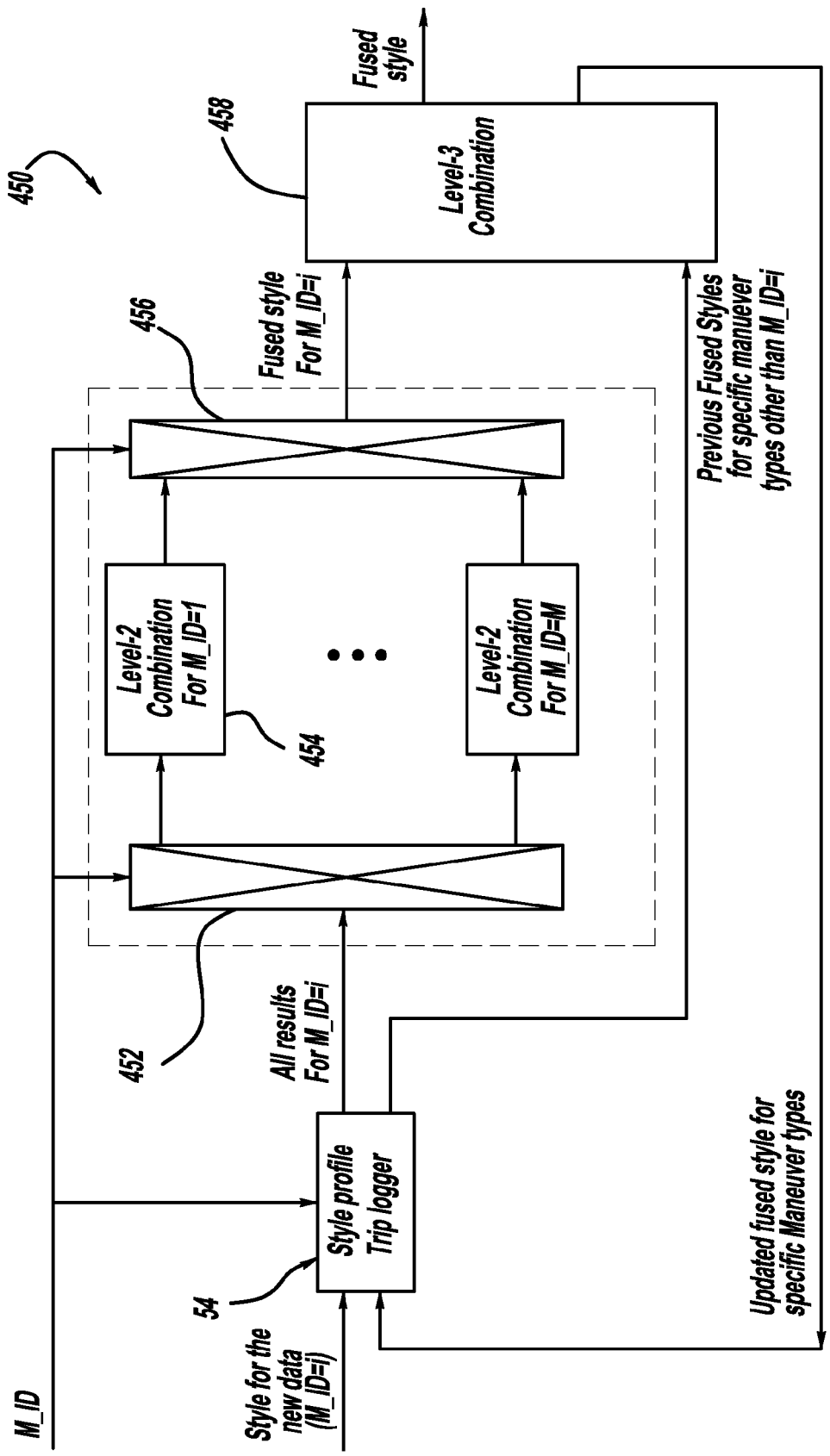
FIG. 26 is a block diagram of a decision fusion processor that can be used in the systems of FIGS. 2, 3 and 4, according to another embodiment of the present invention.

FIG. 26 is a block diagram of a decision fusion processor 450 that can be the decision fusion processor 56 that receives the style profile from the trip-logger 54. The style classification result for the most recent maneuver with $M_{id}$=i is stored in the style trip-logger 54. Based on the maneuver identifier value $M_{id}$, the style profile trip-logger 54 outputs all of the results of the maneuvers identified as $M_{id}$=1 for the level-2 combination and previous fused style result from maneuvers of other types, where $M_{id} \neq i$. A switch 452 selects a particular level-2 combination processor 545 depending on the type of the particular maneuver. An output processor 456 selects the level-2 combination from the particular channel and outputs it to a level-3 combination process or 458.

Since the Level-2 combination combines the classification results based on maneuvers of the same type, each type of maneuver that is used for style characterization should have its corresponding level-2 combiner. From the perspective of data fusion, a level-2 combination can be regarded as single sensor tracking, also known as filtering, which involves combining successive measurements or fusing of data from a single sensor over time as opposed to a sensor set. The level-2 combination problem is to find the driving style $x_n^m$ based on the classification results of a series of maneuvers that are of the same type: $Y_n^m = \{y_1^m\ y_2^m \ldots y_n^m\}$, where m represents the maneuver type and is the class label observed by the classifier (or the level-1 combiner if multiple classifiers are used) based on the ith maneuver of the maneuver type m.

Based on Bayes' theorem:

$$P(x_n^m | Y_n^m) = P(x_n^m | y_n^m, Y_{n-1}^m) = \frac{P(y_n^m | x_n^m, Y_{n-1}^m) P(x_n^m | Y_{n-1}^m)}{P(y_n^m | Y_{n-1}^m)} \quad (40)$$

Where P represents the probability of the event.
Further assuming that:
1. The classification results are independent of each other, i.e., $P(y_n^m | x_n^m, Y_{n-1}^m) = P(y_n^m | x_n^m)$, and
2. The driving style $x_n^m$ obeys a Markov evolution, i.e., $$P(x_n^m | Y_n^m) = \quad (41)$$

$$P(x_n^m | y_n^m, Y_{n-1}^m) = \frac{P(y_n^m | x_n^m) \left( \sum_{x_{n-1}^m=0}^{K} P(x_n^m | x_{n-1}^m) P(x_{n-1}^m | Y_{n-1}^m) \right)}{P(y_n^m | Y_{n-1}^m)}$$

Accordingly, $P(x_n^m | Y_n^m)$ can be simplified as:

$$P(x_n^m | Y_{n-1}^m) =$$

$$\sum_{x_{n-1}^m=0}^{K} P(x_n^m | x_{n-1}^m, Y_{n-1}^m) P(x_{n-1}^m | Y_{n-1}^m) = \sum_{x_{n-1}^m=0}^{K} P(x_n^m | x_{n-1}^m) P(x_{n-1}^m | Y_{n-1}^m),$$

In equation (41), $P(y_n^m | x_n^m)$ represents the probability of observing a class $y_n^m$ given the hypothesis that the maneuver is actually a class $x_n^m$ maneuver. Since $P(x_n^m = i)$ (with i=0,1, . . . K) is usually unknown, equal probability is usually assumed: $P(x_n^m = i) = 1/(K+1)$. Consequently, $P(y_n^m | x_n^m) \propto P(x_n^m, y_n^m) = P(y_n^m = x_n^m)$, where $conf(x_n^m)$ is the confidence level provided by the classifier (or the level-1 combiner).

$P(x_n^m|x_{n-1}^m)$ in equation (41) represents the probability of a class $x_n^m$ maneuver following a class $x_{n-1}^m$ maneuver.

In an ideal driving environment, a driver's driving style would be rather consistent as:

$$P(x_n^m | x_{n-1}^m) = \begin{cases} 1, & \text{if } x_n^m = x_{n-1}^m \\ 0, & \text{if } x_n^m \neq x_{n-1}^m \end{cases} \quad (42)$$

However, factors such as traffic/road conditions, fatigue, and inattention may cause a driver to deviate from his/her "normal" driving style. Such factors can be incorporated into $P(x_n^m|x_{n-1}^m)$ as:

$$P(x_n^m|x_{n-1}^m) = f(x_n^m, x_{n-1}^m, \text{Traffic}_{index}(n), \text{Road}_{index}(n), \text{driver}_{state}(n)) \quad (43)$$

If traffic/road conditions have already been considered in the classification, $P(x_n^m|x_{n-1}^m)$ can be simplified as:

$$P(x_n^m | x_{n-1}^m) = \begin{cases} 1-\varepsilon, & \text{if } x_n^m \in [\max(0, x_{n-1}^m - \beta), \\ & \min(x_{n-1}^m + \beta, K)] \\ \varepsilon, & \text{if } x_n^m \notin [\max(0, x_{n-1}^m - \beta), \\ & \min(x_{n-1}^m + \beta, K)] \end{cases} \quad (44)$$

Where $0 \leq \varepsilon \leq 0.5$ and $0 \leq \beta \leq K$ (e.g., $\beta=1$).

$P(x_{n-1}^m|Y_{n-1}^m)$ in equation (42) is the previous combination results. The initial condition $P(x_0^m|Y_0^m)$ can be set to be $1/(K+1)$ i.e. equal for any of the classes ($\{0, 1, 2, \ldots, K\}$). $P(y_n^m|Y_{n-1}^m)$ in the denominator is for normalization such that $$\sum_{x_n^m=0}^{K} P(x_n^m | Y_n^m) = 1.$$

In summary, the Bayes-based level-2 combination is executed as follows:

1. Initialization:

$$P(x_0^m | Y_0^m) = \frac{1}{K+1} \text{ for } x_0^m = 0, 1, 2, \ldots, K;$$

2. Upon the classification of the nth maneuver of the maneuver type m, calculate $P(x_n^m|Y_{n-1}^m)$ for $x_n^m=0,1,2,\ldots,K$ based on equation (41);
3. Calculate the nominator in equation (42): $(P(y_n^m|x_n^m)P(x_n^m|Y_{n-1}^m))$ for $x_n^m=0, 1, 2, \ldots, K$;
4. Calculate $$P(y_n^m | Y_{n-1}^m): P(y_n^m | Y_{n-1}^m) = \sum_{x_n^m=0}^{K} (P(y_n^m | x_n^m) P(x_n^m | Y_{n-1}^m));$$

and

5. Calculate the posterior probability $$P(x_n^m | Y_n^m) = \frac{P(y_n^m | x_n^m) P(x_n^m | Y_{n-1}^m)}{P(y_n^m | Y_{n-1}^m)}$$

for $x_n^m=0,1,2,\ldots,K$.

The output of the level-2 combiner is a vector $[P(0|Y_n^m) P(1|Y_n^m) P(2|Y_n^m) \ldots P(K|Y_n^m)]$. The class corresponding to the largest $P(x_n^m|Y_n^m)$ is regarded as the current driving style:

$$c_n^m \underset{x_n^m=0,1,\ldots K}{\text{argmax}} P(x_n^m | Y_n^m) \quad (45)$$

Similarly, Bayes' theorem can be applied to develop the level-3 combiner. Upon the onset of a new maneuver, the level-2 combiner outputs $[P(0|Y_n^m) P(1|Y_n^m) P(2|Y_n^m) \ldots P(K|Y_n^m)]$. The level-3 combiner then calculates $P(x_n|\bar{Y}_n)$, where $\bar{Y}_n = \{Y_n^1 Y_n^2 \ldots Y_n^j \ldots Y_n^M\}$ with $Y_n^m = \{y_n^m Y_{n-1}^m\}$, $Y_n^j = \{Y_{n-1}^j\}$ for $j \neq m$, and $M$ is the number of maneuver types used for the classification.

Correspondingly, the rule to calculate $P(x_n|\bar{Y}_n)$ is:

$$P(x_n | \bar{Y}_n) = \frac{\left(\prod_{j=1}^{M} P(x_n^j | Y_n^j)\right) P(x_{n-1} | \bar{Y}_{n-1})}{\prod_{j=1}^{M} P(x_{n-1}^j | Y_{n-1}^j)} \times \text{normalization\_scaler} \quad (46)$$

Where $P(x_{n-1}|\bar{Y}_{n-1})$ is the previous results of the level-3 combiner.

For $j \neq m$, $Y_n^j = Y_{n-1}^j$:

$$P(x_n^j | Y_n^j) = \sum_{x_{n-1}^j=0}^{K} P(x_n^j | x_{n-1}^j, Y_n^j) P(x_{n-1}^j | Y_n^j) = \sum_{x_{n-1}^j=0}^{K} P(x_n^j | x_{n-1}^j) P(x_{n-1}^j | Y_{n-1}^j), \quad (47)$$

Where $P(x_{n-1}^j|Y_{n-1}^j)$ is based on the previous results from each individual level-2 Combiner and $P(x_n^j|x_{n-1}^j)$ is based on equation (43).

In summary, the level-3 combination can be executed as follows:

1. Update $P(x_n^j|Y_n^j)$ based on equation (47) for $\neq m$, that is, for all the maneuver types other than the type corresponding to the latest maneuver, $P(x_n^m|Y_n^m)$ is provided by the level-2 combiner corresponding to maneuver type m.
2. Calculate $$B(x_n | \bar{Y}_n) = \frac{\left(\prod_{j=1}^{M} P(x_n^j | Y_n^j)\right) P(x_{n-1} | \bar{Y}_{n-1})}{\prod_{j=1}^{M} P(x_n^j | Y_{n-1}^j)}$$

based on the pervious results from individual level-2 combiners $P(x_{n-1}^j|\bar{Y}_{n-1}^j)$, and the previous result from the level-3 combiner $P(x_{n-1}|\bar{Y}_{n-1})$;

3. Calculate the normalization scaler:

$$\text{normalization\_scaler} = \frac{1}{\sum_{x_n=0}^{K} B(x_n | \overline{Y}_n)} \quad (48)$$

4. Calculate the posterior probability:

$$P(x_n|\overline{Y}_n) = B(x_n|\overline{Y}_n) \times \text{normalization\_scaler} \quad (49)$$

The output of the level-3 combiner is also a vector $[P(0|\overline{Y}_n) P(1|\overline{Y}_n) P(2|\overline{Y}_n) \ldots P(K|\overline{Y}_n)]$. The class corresponding to the largest $P(x_n|\overline{Y}_n)$ is regarded as the current driving style:

$$c_n = \underset{x_n=0,1,\ldots K}{\mathrm{argmax}} P(x_n | \overline{Y}_n) \quad (50)$$

Bayes' theorem can also be used to design an integrated level-2 and level-3 combination by following steps similar to those described above. Therefore, the details of the design and implementation are not included in this invention.

It is worth noting that though the combination disclosed in one embodiment of the invention is based on Bayes' theorem, other classifier combination and data fusion techniques, including voting, sum, mean, median, product, max/min, fuzzy integrals, Dempster-Shafter, Mixture of Local Experts (MLEs), and neural networks, can also be employed in lieu of Bayes' theorem.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for classifying a driver's driving style of a vehicle, said system comprising:
   a plurality of vehicle sensors providing sensor measurement signals;
   a maneuver identification processor responsive to the sensor signals from the plurality of vehicle sensors, said maneuver identification processor identifying different characteristic maneuvers of the vehicle and providing maneuver identifier signals identifying the characteristic maneuvers; and
   a style characterization processor responsive to the maneuver identifier signals and the sensor measurement signals, said style characterization processor including separate classifiers for each different type of maneuver, said classifiers being selected based on the maneuver identifier signal to classify driving style using sensor signals corresponding to a particular maneuver, each classifier providing a driver style classification signal that identifies the type of driver driving the vehicle for the particular maneuver, said style characterization processor further including a first combiner that receives and combines the style classification signals from each of the selected classifiers and provides a combined style classification signal for a single one of several different maneuvers.

2. The system according to claim 1 further comprising a decision fusion processor responsive to the driver style classification signals from the different classifiers in the style characterization processor.

3. The system according to claim 2 wherein the decision fusion processor includes a second combiner that combines the style classification signals for multiple maneuvers that are of the same type.

4. The system according to claim 3 wherein the decision fusion processor further includes a third combiner that combines style classification signals from the second combiner for different types of maneuvers.

5. The system according to claim 1 wherein the first combiner employs a combination process selected from a group comprising voting, sum, mean, median, product, maximum/minimum, fuzzy integral, Dempster-Shafer, mixture of local experts and neural networks.

6. The system according to claim 1 wherein the first combiner employs a Dempster-Shafer process.

7. The system according to claim 1 further comprising a traffic and road condition recognition processor responsive to the sensor signals, said traffic and road condition recognition processor providing traffic and road condition signals to the style characterization processor.

8. The system according to claim 1 further comprising a style profile trip-logger responsive to the maneuver identifier signals and the style classification signals, said trip-logger storing the style classification signals.

9. The system according to claim 1 wherein the characteristic maneuvers include vehicle following maneuvers, lane-change maneuvers, U-turn maneuvers, left/right-turn maneuvers, highway on/off ramp maneuvers, passing maneuvers, vehicle launching maneuvers and curve-handling maneuvers.

10. The system according to claim 1 wherein the style characterization processor includes an original features processor for deriving original features in the maneuver identifier signals, a feature extraction processor for extracting features from the original features, a feature selection processor for selecting certain ones of the extracted features and a classifier for classifying the maneuver using the selected features.

11. The system according to claim 1 wherein the classifiers employ a process of feature extraction and feature selection to classify the driving style.

12. The system according to claim 1 wherein the classifiers use discriminant features to classify the driving style.

13. A system for classifying a driver's driving style of a vehicle, said system comprising:
   a plurality of vehicle sensors providing sensor measurement signals;
   a maneuver identification processor responsive to the sensor signals from the plurality of vehicle sensors, said maneuver identification processor identifying different characteristic maneuvers of the vehicle and providing maneuver identifier signals identifying the characteristic maneuvers;
   a style characterization processor responsive to the maneuver identifier signals and the sensor measurement signals, said style characterization processor classifying driving style based on the identifier and sensor signals and providing driving style classification signals that identify the type of driver driving the vehicle; and
   a plurality of combiners that combine the classification signals for different maneuvers, where the plurality of combiners includes a first combiner that combines the style classification signals for multiple maneuvers that are of the same type, and a second combiner that combines style classification signals from the first combiner for different types of maneuvers.

14. The system according to claim 13 wherein the style characterization processor includes a plurality of classifiers where a separate classifier classifies driving style for each different maneuver.

15. The system according to claim 14 wherein the style characterization processor includes a combiner that receives and combines the style classification signals from each of the classifiers and provides a combined style classification signal for a single one of several different maneuvers.

16. The system according to claim 13 wherein the style characterization processor includes an original features processor for identifying original features from the maneuver identifier signals, a feature extraction processor for extracting features from the original features, a feature selection processor for selecting certain ones of the extracted features and a classifier for classifying the maneuver using the selected features.

17. The system according to claim 13 wherein the classifiers use discriminant features to classify the driving style.

* * * * *